(12) United States Patent
Ahmed et al.

(10) Patent No.: US 12,533,394 B2
(45) Date of Patent: Jan. 27, 2026

(54) COMPOSITIONS AND METHODS FOR TREATING METABOLIC DISORDERS

(71) Applicant: GlycoMantra Inc., Baltimore, MD (US)

(72) Inventors: Hafiz Ahmed, Leesburg, VA (US); Khairul Anam, Gaithersburg, MD (US)

(73) Assignee: GLYCOMANTRA INC., Baltimore, MD (US)

( * ) Notice: Subject to any disclaimer, the term of this patent is extended or adjusted under 35 U.S.C. 154(b) by 0 days.

(21) Appl. No.: 18/929,081

(22) Filed: Oct. 28, 2024

(65) Prior Publication Data

US 2025/0152664 A1     May 15, 2025

Related U.S. Application Data

(60) Provisional application No. 63/599,342, filed on Nov. 15, 2023.

(51) Int. Cl.

| | |
|---|---|
| *A61P 3/10* | (2006.01) |
| *A61K 38/17* | (2006.01) |
| *A61K 38/26* | (2006.01) |
| *A61K 47/54* | (2017.01) |
| *A61P 1/04* | (2006.01) |
| *A61P 1/16* | (2006.01) |
| *A61P 11/00* | (2006.01) |

(52) U.S. Cl.
CPC .......... *A61K 38/1709* (2013.01); *A61K 38/26* (2013.01); *A61K 47/549* (2017.08); *A61P 1/04* (2018.01); *A61P 1/16* (2018.01); *A61P 3/10* (2018.01); *A61P 11/00* (2018.01)

(58) Field of Classification Search
CPC .............................. A61P 3/10; A61K 38/1709
See application file for complete search history.

(56) References Cited

U.S. PATENT DOCUMENTS

| | | | | |
|---|---|---|---|---|
| 5,539,011 | A | * 7/1996 | Hilker | C08G 18/1808 521/170 |
| RE36,233 | E | * 6/1999 | Hilker | C08G 18/1816 521/137 |
| 9,180,175 | B2 | 11/2015 | Ahmed et al. | |
| 11,484,517 | B2 | 11/2022 | Walczak | |
| 11,676,269 | B2 | 6/2023 | Brozek | |
| 2006/0094352 | A1 | 5/2006 | Levy et al. | |
| 2012/0251580 | A1 | 10/2012 | Ahmed et al. | |
| 2021/0093698 | A1 | 4/2021 | Niemöller et al. | |

FOREIGN PATENT DOCUMENTS

| | | |
|---|---|---|
| WO | 2017/152062 A1 | 9/2017 |
| WO | 2022/263565 A1 | 12/2022 |
| WO | 2023/280150 A1 | 1/2023 |

OTHER PUBLICATIONS

Salvatore Sciacchitano et al.; "Galectin-3: One Molecule for an Alphabet of Diseases, from A to Z"; Date: Dec. 31, 2017.
Yanhua Li et al.; "Emerging roles of Galectin-3 in diabetes and diabetes complications: A snapshot"; Date: Dec. 13, 2021.
Rakin Ahmed et al.; "Development of Galectin-3 Targeting Drugs for Therapeutic Applications in Various Diseases"; Date: Apr. 5, 2023.
Grazyna Sygitowicz et al.; "The Diagnostic and Therapeutic Potential of Galectin-3 in Cardiovascular Diseases"; Date: Nov. 30, 2021.
Amy Vora et al.; "Association of Galectin-3 With Diabetes Mellitus in the Dallas Heart Study"; Date: Feb. 15, 2019.
John L. Caniglia et al.; "A potential role for Galectin-3 inhibitors in the treatment of COVID-19"; Date: May 14, 2020.
Prasun Guha et al.; "Cod glycopeptide with picomolar affinity to galectin-3 suppresses T-cell apoptosis and prostate cancer metastasis"; Date: Feb. 14, 2012.
Barchi et al., The effect of a methyl group on structure and function: Serine vs. threonine glycosylation and phosphorylation. Front Mol Biosci. Feb. 2023, vol. 10: 1117850. PDF File: p. 1-14.
Sotozono et al., The Thomsen-Friedenreich Antigen-related Carbohydrate Antigens in Human Gastric Intestinal Metaplasia and Cancer. J Histochem Cytochem. 1994, vol. 42(12), p. 1575-84.
Campbell et al., Direct demonstration of increased expression of Thomsen-Friedenreich (TF) antigen in colonic adenocarcinoma and ulcerative colitis mucin and its concealment in normal mucin. J Clin Invest. 1995, vol. 95(2), p. 571-6.
Dragon et al., CAR-Ts redirected against the Thomsen-Friedenreich antigen CD 176 mediate specific elimination of malignant cells from leukemia and solid tumors. Front Immunol. Oct. 17, 2023, vol. 14:1219165. PDF File: p. 1-16.
Ou et al., Synthesis, binding affinity, and inhibitory capacity of cyclodextrin-based multivalent glycan ligands for human galectin-3. Bioorg Med Chem. 2022, vol. 72:116974. PDF File: p. 1-19.
Liu et al., Alteration of glycosylation in serum proteins: a new potential indicator to distinguish non-diabetic renal diseases from diabetic nephropathy. RSC Adv. 2018, vol. 8(68), p. 38872-38882.
International Search Report; PCT/US2024/055938; By: Authorized Officer Kari Rodriquez.
Croset, Amelie, et al. "Differences in the glycosylation of recombinant proteins expressed in HEK and CHO cells." Journal of biotechnology 161.3 (2012): 336-348.

\* cited by examiner

*Primary Examiner* — Gyan Chandra
(74) *Attorney, Agent, or Firm* — Wiggin and Dana LLP

(57) ABSTRACT

A method of treating a metabolic disorder includes identifying a subject having a metabolic disorder and administering to the subject a therapeutically effective amount of GM201, wherein the therapeutically effective amount is between 0.1 mg/kg and 500 mg/kg with respect to a body weight of the subject.

20 Claims, 40 Drawing Sheets

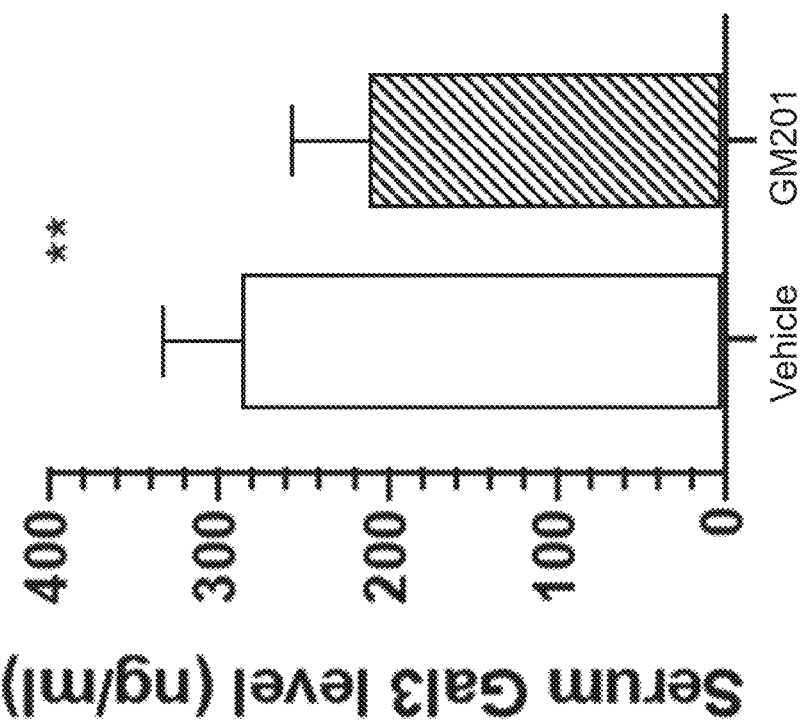

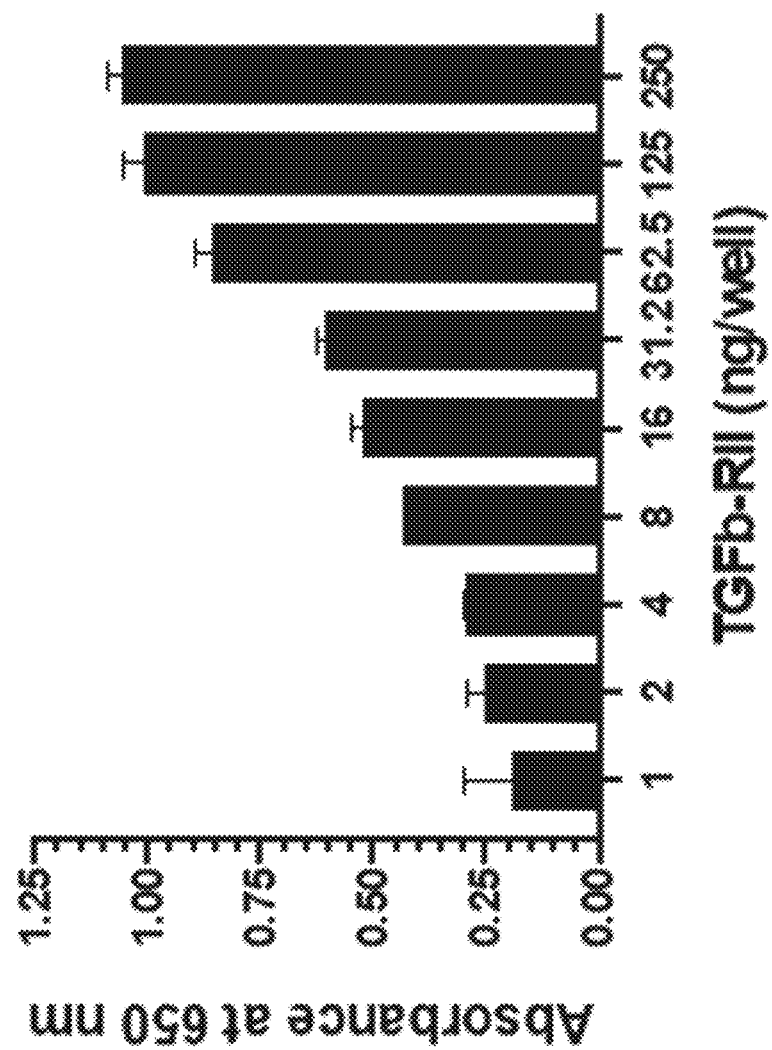

COMPOSITIONS AND METHODS FOR TREATING METABOLIC DISORDERS

CROSS-REFERENCE TO RELATED APPLICATIONS

This application claims the benefit of priority of U.S. Provisional Application Ser. No. 63/599,342, filed on Nov. 15, 2023, and entitled "COMPOSITIONS AND METHODS FOR TREATING METABOLIC DISORDERS", the entirety of which is incorporated herein by reference.

FIELD OF THE INVENTION

The present invention generally relates to the field of metabolic disease therapy. In particular, the present invention is directed to compositions and methods for treating metabolic disorders.

BACKGROUND

Type-2-diabetes (T2D) and metabolic dysfunction-associated steatohepatitis (MASH)—both metabolic disorders—are major health problems globally. Obesity-mediated insulin resistance is a hallmark of T2D, which accounts for ~90% of all diabetes. Despite many drugs available to treat T2D, no FDA-approved drugs directly work on the insulin receptor (IR) to overcome insulin resistance. For the treatment of Metabolic dysfunction-associated steatohepatitis (MASH), resmetirom (an agonist of thyroid hormone receptor, THR-β) has recently received conditional approval, however, drugs that treat MASH by other pathways do not yet exist.

SUMMARY OF THE DISCLOSURE

In an aspect, a method of treating a subject is described. The method includes identifying a subject having a metabolic disorder and administering to the subject a therapeutically effective amount of GM201. Therapeutically effective amount may be between 0.1 mg/kg and 500 mg/kg with respect to the body weight of the subject. In one or more embodiments, a disorder may include a metabolic disorder and/or a condition associated with a metabolic disorder. Conditions which may be treated include, for example and without limitation, type 2 diabetes (T2D), Metabolic dysfunction-associated steatohepatitis (MASH, previously known as non-alcoholic steatohepatitis, NASH), fibrosis, and ulcerative colitis (UC), among others.

In an aspect, another method of treating a subject is described. The method includes administering to the subject a therapeutically effective amount of a pharmaceutical composition including GM201, wherein the subject has a metabolic disorder. Therapeutically effective amount may be between 0.1 mg GM201/kg and 500 mg GM201/kg with respect to the body weight of the subject.

These and other aspects and features of nonlimiting embodiments of the present invention will become apparent to those skilled in the art upon review of the following description of specific nonlimiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7D is a chart with exemplary experimental data containing serum Gal3 levels of HFD-fed mice treated with GM201 and a PBS vehicle, respectively; the serum Gal3 level in GM201-treated mice was significantly lower than the PBS vehicle-treated mice;

FIG. 8A is a chart with exemplary experimental data showing an increasing absorbance at 650 nanometers as a function of increasing concentrations of transforming growth factor β receptor II (TGFβ-RII); the increasing absorbance at 650 nanometers is a result of an increasing interaction between Gal3 and TGFβ-RII;

Figure 1:
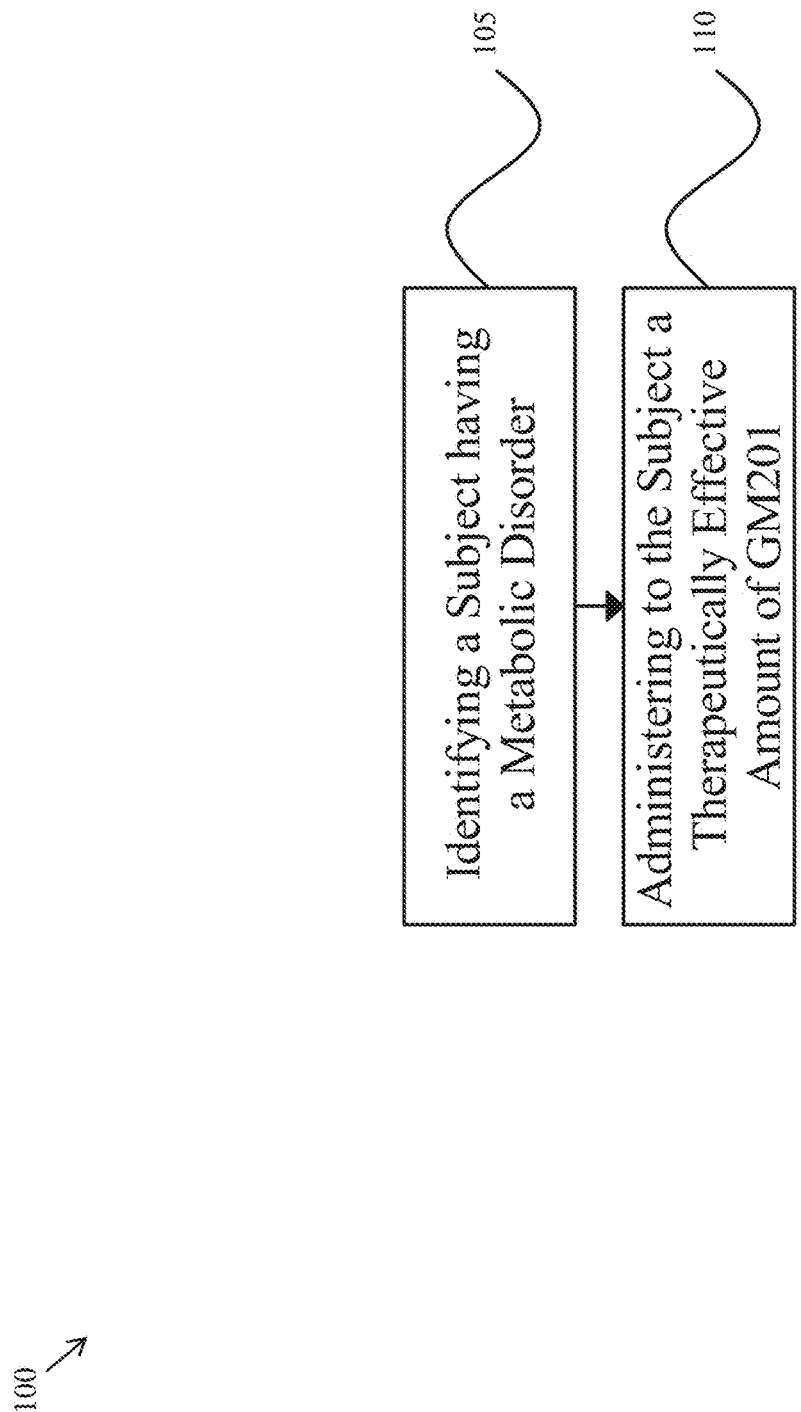
FIG. 1 is a diagram depicting an exemplary method of treating a subject.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to compositions and methods for treating a subject with a disorder associated with Galectin-3 (Gal3). In one or more embodiments, a disorder may include a metabolic disorder and/or a condition associated with a metabolic disorder. In one or more embodiments, GM201 and/or a composition including GM201 may be used to treat a subject in need thereof. Conditions which may be treated include, for example and without limitation, type 2 diabetes (T2D), metabolic dysfunction-associated steatohepatitis (MASH), fibrosis, and ulcerative colitis (UC). Exemplary embodiments illustrating aspects of the present disclosure are described below in the context of several specific examples.

To facilitate the understanding of this invention, a number of terms are defined below and throughout the disclosure. Unless otherwise defined, all technical and scientific terms used herein have the same meaning as commonly understood by one of ordinary skill in the art to which this invention belongs. The terminology herein is used to describe specific embodiments of the invention, but their usage does not limit the invention, except as outlined in the claims.

It is understood that the acts described below are meant as a general overview and demonstration of an exemplary method, and that the method may include different and/or additional acts as described herein or otherwise.

While the present invention will be described as having particular configurations disclosed herein, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

It is to be understood that any aspect and/or element of any embodiment of the method(s) described herein or otherwise may be combined in any way to form additional embodiments of the method(s) all of which are within the scope of the method(s).

Where a process is described herein, those of ordinary skill in the art will appreciate that the process may operate without any user intervention. In another embodiment, the process includes some human intervention (e.g., a step is performed by or with the assistance of a human).

For the purposes of this disclosure, including the claims, the phrase "at least some" means "one or more" and includes the case of only one. Thus, e.g., the phrase "at least some ABCs" means "one or more ABCs" and includes the case of only one ABC.

For the purposes of this disclosure, including the claims, the term "at least one" should be understood as meaning "one or more" and therefore includes both embodiments that include one or multiple components. Furthermore, dependent claims that refer to independent claims that describe features with "at least one" have the same meaning, both when the feature is referred to as "the" and "the at least one".

For the purposes of this disclosure, the term "portion" means some or all. Therefore, for example, "A portion of X" may include some of "X" or all of "X". In the context of a conversation, the term "portion" means some or all of the conversation.

For the purposes of this disclosure, including the claims, the phrase "using" means "using at least" and is not exclusive. Thus, e.g., the phrase "using X" means "using at least X". Unless specifically stated by use of the word "only", the phrase "using X" does not mean "using only X".

For the purposes of this disclosure, including the claims, the phrase "based on" means "based in part on" or "based, at least in part, on" and is not exclusive. Thus, e.g., the phrase "based on factor X" means "based in part on factor X" or "based, at least in part, on factor X". Unless specifically stated by use of the word "only", the phrase "based on X" does not mean "based only on X".

In general, for the purposes of this disclosure, including the claims, unless the word "only" is specifically used in a phrase, it should not be read into that phrase.

For the purposes of this disclosure, including the claims, the phrase "distinct" means "at least partially distinct". Unless specifically stated, distinct does not mean fully distinct. Thus, e.g., the phrase "X is distinct from Y" means that "X is at least partially distinct from Y" and does not mean that "X is fully distinct from Y". Thus, for the purposes of this disclosure, including the claims, the phrase "X is distinct from Y" means that X differs from Y in at least some way.

It should be appreciated that the words "first", "second", and so on, in the description and claims, are used to distinguish or identify, and not to show a serial or numerical limitation.

Similarly, letter labels (e.g., "(A)", "(B)", "(C)", and so on, or "(a)", "(b)", and so on) and/or numbers (e.g., "(i)", "(ii)", and so on) are used to assist in readability and to help distinguish or identify, and are not intended to be otherwise limiting or to impose or imply any serial or numerical limitations or orderings. Similarly, words such as "particular", "specific", "certain", and "given", in the description and claims, if used, are to distinguish or identify, and are not intended to be otherwise limiting.

For the purposes of this disclosure, including the claims, the terms "multiple" and "plurality" mean "two or more," and include the case of "two". Thus, e.g., the phrase "multiple ABCs" means "two or more ABCs" and includes "two ABCs". Similarly, e.g., the phrase "multiple PQRs" means "two or more PQRs" and includes "two PQRs".

The present invention also covers the exact terms, features, values, and ranges, etc., in case these terms, features, values, and ranges, etc., are used in conjunction with terms such as "about", "around", "generally", "substantially", "essentially", "at least", etc. Thus, e.g., "about 3" or "approximately 3" shall also cover exactly 3, and "substantially constant" shall also cover exactly constant.

For the purposes of this disclosure, unless stated otherwise, the terms "about" or "approximately" refer to a value that is within 10% above or below the value being described.

For the purposes of this disclosure, including the claims, singular forms of terms are to be construed as also including the plural form and vice versa, unless the context indicates otherwise. Thus, it should be noted that for the purposes of this disclosure, the singular forms "a", "an", and "the" include plural references unless the context clearly dictates otherwise. In other words, terms such as "a", "an", and "the" are not intended to refer to only a singular entity but include the general class of which a specific example may be used for illustration.

Throughout the description and claims, the terms "comprise", "including", "having", "contain", and their variations should be understood as meaning "including but not limited to" and are not intended to exclude other components unless specifically so stated.

For the purposes of this disclosure, the terms "administration" or "administering" refer to a method of giving a dosage of a compound or pharmaceutical composition to a subject. A composition described herein may be administered to a subject by any one of a variety of manners or a combination of varieties of manners. For example, a composition may be administered orally, nasally, intraperitoneally, or parenterally, by intravenous, intramuscular, topical, or subcutaneous routes, or by injection into tissue.

For the purposes of this disclosure, an "effective amount" or "therapeutically effective amount" is the amount of a composition of this disclosure which, when administered to a subject, is sufficient to effect treatment of a disease or condition in the subject. The amount of a composition of this disclosure which constitutes a "therapeutically effective amount" may vary depending on the composition, the condition and its severity, the manner of administration, and the age of the subject to be treated.

For the purposes of this disclosure, the terms "treat", "treating", or "treatment" refer to administration of a compound or pharmaceutical composition for a therapeutic purpose. To "treat a disorder" or use for "therapeutic treatment" refers to administering treatment to a patient already suffering from a disease to ameliorate the disease or one or more symptoms thereof to improve the patient's condition (e.g., by reducing one or more symptoms of a neurological disorder). The term "therapeutic" includes the effect of mitigating deleterious clinical effects of certain processes (i.e., consequences of the process, rather than the symptoms of processes). As nonlimiting examples, a treatment may include (i) preventing a disease or condition from occurring in a subject, in particular, when such subject is predisposed to the condition but has not yet been diagnosed as having it; (ii) inhibiting a disease or condition, i.e., arresting its development; (iii) relieving a disease or condition, i.e., causing regression of the disease or condition; or (iv) relieving the symptoms resulting from a disease or condition, i.e., relieving pain without addressing the underlying disease or condition.

It will be appreciated that variations to the embodiments of the invention can be made while still falling within the scope of the invention. Alternative features serving the same, equivalent, or similar purpose can replace features disclosed in the specification, unless stated otherwise. Thus, unless stated otherwise, each feature disclosed represents one example of a generic series of equivalent or similar features.

Use of exemplary language, such as "for instance", "such as", "for example" ("e.g.,"), and the like, is merely intended to better illustrate the invention and does not indicate a limitation on the scope of the invention unless specifically so claimed.

While the invention has been described in connection with what is presently considered to be the most practical and embodiments thereof are further described in the examples below, it is to be understood that the invention is not to be limited to the disclosed embodiment, but on the contrary, is intended to cover various modifications and equivalent arrangements included within the spirit and scope of the appended claims.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, and/or components have not been described in detail in order to avoid unnecessarily obscuring claimed subject matter. The illustrative embodiments described in the detailed description and claims are not meant to be limiting. Other embodiments may be utilized, and other changes may be made, without departing from the spirit or scope of the subject matter presented here. It will be readily understood that the aspects of the present disclosure, as generally described herein, can be arranged, substituted, combined, and designed in a wide variety of different configurations, all of which are explicitly contemplated and make part of this disclosure.

Referring now to FIG. 1, an exemplary embodiment of a method 100 for treating a subject is illustrated. At step 105, method 100 includes identifying a subject having a metabolic disorder. For the purposes of this disclosure, a "subject" is a human or any individual organism, on whom or on which a procedure, study, or otherwise experiment, may be conducted. A subject may include a subject having a metabolic disease or a subject at risk for developing a metabolic disease. As nonlimiting examples, a subject may include a human patient with symptoms of type 2 diabetes, an individual diagnosed with metabolic dysfunction-associated steatohepatitis (MASH), a participant in a clinical trial, an individual receiving follow-up care after a surgery, a healthy volunteer, an individual with rheumatoid arthritis, or the like. Additionally, or alternatively, a subject may include an animal model (i.e., an animal used to model certain medical conditions such as a laboratory rat). The subject may include a non-human primate, a bird, a horse, a cow, a goat, a sheep, a companion animal such as a dog, cat or rodent, or another mammal.

With continued reference to FIG. 1, for the purposes of this disclosure, a "metabolic disorder" is a medical condition resulting from abnormal chemical reactions that disrupt the normal metabolic processes within the body. Metabolism encompasses the biochemical reactions that convert nutrients into energy and the building blocks needed for cellular function, growth, and repair. In metabolic disorders, these processes are impaired due to genetic mutations, enzyme deficiencies, or imbalances in hormonal regulation, among other factors, leading to the accumulation of toxic substances, insufficient production of essential compounds, or improper energy utilization. Metabolic disorders may be classified into different types. In some cases, metabolic disorders may include without limitation inborn errors of metabolism, which are typically genetic and involve enzyme deficiencies that affect specific metabolic pathways (e.g., phenylketonuria, where the enzyme phenylalanine hydroxylase is deficient). In some cases, metabolic disorders may include acquired metabolic disorders, such as without limitation diabetes mellitus, where there is a dysregulation of glucose metabolism due to insulin deficiency or resistance. These disorders may affect the metabolism of carbohydrates, lipids, proteins, or nucleic acids, potentially leading to a wide range of symptoms that may include without limitation developmental delays, neurological issues, growth abnormalities, or organ dysfunction, depending on the metabolic pathway involved. Additional details regarding metabolic disorders will be provided below in this disclosure.

With continued reference to FIG. 1, at step 110, method 100 includes administering to the subject a therapeutically effective amount of GM201. In some cases, a therapeutically effective amount of GM201 may be administered as a composition or formulation that contains GM201, consistent with details described below in this disclosure. For the purposes of this disclosure, GM201 is an O-glycosylated protein with a molecular weight of approximately 100 kDa and includes tripeptide repeats of alanine-alanine-threonine, in which the threonine of each triplet is glycosidically linked to a Thomsen-Friedenreich disaccharide. In one or more embodiments, GM201 may include $TFD_{100}$. In one or more embodiments, GM201 may have a molecular weight of 84 kDa to 88 kDa. In one or more embodiments, GM201 may include 120-132 copies of Thomsen-Friedenreich disaccharide. For the purposes of this disclosure, Thomsen-Friedenreich disaccharide is a specific carbohydrate structure, also known as the T-antigen, that includes two sugar units: galactose (Gal) and N-acetylgalactosamine (GalNAc). This disaccharide may be structurally written as Galβ1-3GalNAc. Thomsen-Friedenreich disaccharide is a core component of the O-linked glycan structures found on glycoproteins and glycolipids on the surface of human cells, particularly on red blood cells. In normal physiological conditions, Thomsen-Friedenreich disaccharide may be masked by additional sugars, but in certain pathological states, such as without limitation cancer, Thomsen-Friedenreich disaccharide may be exposed and act as a tumor-associated carbohydrate antigen (TACA). The exposure of Thomsen-Friedenreich disaccharide on the surface of cancer cells or during bacterial infections may trigger immune responses. Thomsen-Friedenreich disaccharide has been implicated in various cancers, including without limitation colorectal and breast cancer, as a potential marker for tumor cells due to its abnormal expression. Additionally, in some cases, bacterial toxins may bind to Thomsen-Friedenreich disaccharide, leading to potential pathogenic processes.

With continued reference to FIG. 1, GM201 may function as a Galectin-3 antagonist. For the purposes of this disclosure, an "antagonist" is a substance that binds to a receptor without activating it, thereby inhibiting the receptor's normal biological function. Antagonists may be used to block the action of agonists or endogenous molecules, such as without limitation neurotransmitters or hormones, from exerting their effects. Antagonists may be useful in treating conditions where excessive activation of certain biological pathways is detrimental. In contrast, for the purposes of this disclosure, an agonist is a substance, typically a drug, that binds to a receptor and activates it, mimicking the action of a naturally occurring substance such as a neurotransmitter or hormone. When an agonist binds to the receptor, it may induce a biological response, often enhancing or replicating a natural effect. Agonists may be used therapeutically to stimulate certain physiological processes, such as without limitation pain relief (e.g., opioid agonists) or activating receptors in conditions where the body's natural ligand is deficient or absent.

With continued reference to FIG. 1, for the purposes of this disclosure, Galectin-3 or Gal3 is a type of protein that belongs to the family of galectins, which are characterized by their ability to bind specifically to β-galactoside sugars on the surface of cells. Gal3 is encoded by the LGALS3 gene and may be involved in a wide range of biological processes, including without limitation cell adhesion, immune responses, inflammation, and cancer progression, among others. Gal3 may mediate various biological processes including growth regulation, immune function, cancer metastasis, and apoptosis, among others. Gal3 is generally pro-inflammatory and may be involved in many diseases associated with chronic inflammation, such as without limitation cancer, metabolic disorders including type 2 diabetes (T2D), fibrosis, metabolic dysfunction-associated steatohepatitis (MASH), acute respiratory distress syndrome (ARDS), sepsis, and rheumatoid arthritis, among others.

With continued reference to FIG. 1, in one or more embodiments, GM201 may function as an inhibitor. For the purposes of this disclosure, an inhibitor is a substance that reduces or stops the activity of an enzyme or another biological process by interfering with its function. An inhibitor may bind to an enzyme to slow down or halt its catalytic activity and may often be used in drug design to block specific metabolic pathways. Common types of inhibitors may include without limitation competitive inhibitors, noncompetitive inhibitors, uncompetitive inhibitors, reversible inhibitors, irreversible inhibitors, allosteric inhibitors, and/or the like. Specifically, a competitive inhibitor may bind to an active site of an enzyme and directly compete with its substrate; a noncompetitive inhibitor may bind to an allosteric site of an enzyme (i.e., a site distinct from an active site where enzymatic catalysis occurs), thereby reducing the enzyme's activity regardless of the concentration of a substrate; an uncompetitive inhibitor may bind to an enzyme-substrate complex, thereby preventing the reaction from proceeding; a reversible inhibitor may easily dissociate or be readily displaced from an enzyme; an irreversible inhibitor may bind permanently to an enzyme, often covalently modifying its structure; and allosteric inhibitors may bind to sites other than an active site, thereby changing an enzyme's activity. In some cases, an inhibitor may be a mixed inhibitor. For the purposes of this disclosure, a mixed inhibitor is an inhibitor that can bind to both a free enzyme and an enzyme-substrate complex, regardless of whether the enzyme has already bound to a substrate. A mixed inhibitor may bind to an enzyme at a site distinct from its active site. In other words, a mixed inhibitor may be a combination of competitive inhibition and uncompetitive inhibition, as described above. Such binding may affect both the binding of the substrate and the catalytic activity of the enzyme. In some cases, a mixed inhibitor may decrease an enzyme's activity by reducing the efficiency of substrate binding and/or reducing the enzyme's turnover rate. A mixed inhibition may be partially overcome by increasing the substrate concentration, depending on the inhibitor's affinity for the enzyme and enzyme-substrate complex. The working principle of an inhibitor resembles an antagonist in several ways, consistent with details described above; typically, inhibitors target enzymes or biochemical reactions, whereas antagonists target receptors instead. For the purposes of this disclosure, an allosteric site is a specific region on an enzyme or protein that is distinct from its active site, where the substrate typically binds. Molecules that bind to an allosteric site, which are called allosteric modulators, may induce conformational changes in the enzyme or protein and thereby alter its activity, shape, and/or dynamics. These modulators may either enhance or inhibit an enzyme's function, such as without limitation by increasing or decreasing the enzyme's affinity for its substrate. Allosteric modulation may allow for fine regulation of enzyme activity and may be crucial in various physiological processes, such as without limitation metabolic pathways and signal transduction. As a nonlimiting example, allosteric regulation is often used by cells to control complex biochemical pathways, as the binding of modulators to allosteric sites may either upregulate (i.e., positive modulation) or downregulate (i.e., negative modulation) enzyme activity based on the needs of the cell.

With continued reference to FIG. 1, as described below, GM201 may bind to Gal3 with a high (picomolar) affinity, potentially allowing it to be an effective means of treatment where other Gal3 antagonists have failed. The binding affinity of Gal3 with most intrinsic ligands, including insulin receptor (IR), is in the range of nanomolar ($K_d \sim 10^{-8}$ to $10^{-9}$). This means that the Gal3-GM201 interaction is 10-100-fold stronger than the interactions between Gal3 and other ligands such as IR, allowing GM201 to outcompete these ligands and preferentially bind to Gal3. Other Gal3 antagonists also tend to bind to other galectin-family members (such as Gal1, Gal4, and Gal9), potentially leading to off-target effects. In contrast, GM201 is more specific to Gal3 and may cause fewer off-target effects. Details pertaining to GM201 may be consistent with any detail disclosed in U.S. Pat. No. 9,180,175, issued on Nov. 10, 2015, and titled "METHODS OF USE FOR A NATURAL THOMSEN-FRIEDENREICH DISACCARAID COMPOUND", the entirety of which is incorporated herein by reference. For the purposes of this disclosure, a "ligand" is a chemical species that is capable of binding to another chemical species via either chemical bonds or intermolecular interactions. Ligands may include small molecules, ions, or even larger macromolecules. The association between a ligand and its target typically induces a functional response in the target, thereby influencing its biological activity and/or regulating one or more of its downstream biochemical/physiological processes. In one or more embodiments, a ligand may be a molecule that binds specifically to another molecule, which may be a larger molecule such as without limitation a protein, enzyme, or receptor. In one or more embodiments, a ligand may interact with its target molecule through noncovalent interactions such as without limitation hydrogen bonds, electrostatic interactions, and/or van der Waals forces, among others. The specificity of such interaction may be crucial for processes such as without limitation enzyme-substrate reactions, signal transduction, and receptor activation. As a nonlimiting example, in receptor-ligand interactions, ligands such as without limitation hormones, neurotransmitters, or drugs may bind to cell surface or intracellular receptors, triggering a biological response. As another nonlimiting example, in enzyme-ligand interactions, substrates may be considered ligands that bind to an enzyme's active site to undergo one or more chemical reactions. In one or more embodiments, a ligand may bind to its target via one or more coordinate covalent bonds, wherein lone-pair electrons/electron density is typically donated by the ligand to an electron-deficient species such as without limitation a metal atom or ion. A person or ordinary skill in the art, upon reviewing the entirety of this disclosure, will be able to recognize the role of ligands pertaining to the invention disclosed herein.

With continued reference to FIG. 1, for the purposes of this disclosure, a dissociation constant or $K_d$ is the equilibrium constant of a dissociation chemical reaction. $K_d$ is a measure of the affinity between two or more chemical species, such as without limitation between a ligand and a receptor or between an enzyme and a substrate. A larger $K_d$ may indicate a more complete dissociation process and/or indicate a weaker binding affinity between two or more chemical species, whereas a smaller $K_d$ may indicate a less complete dissociation process and/or indicate a stronger binding affinity between two or more chemical species. For the purposes of this disclosure, a chemical equilibrium constant or $K_{eq}$ is a numerical value that expresses the ratio of concentrations between products and reactants at equilibrium for a reversible chemical reaction. It provides a measure of the extent to which a reaction proceeds. For a general reaction:

$$aA + bB \rightleftharpoons cC + dD$$

Its equilibrium constant is given by:

$$K_{eq} = \frac{[C]^c[D]^d}{[A]^a[B]^b}$$

where [A], [B], [C], and [D] represent the molar concentrations of the reactants and products, and a, b, c, and d are their respective stoichiometric coefficients. Since a typical dissociation chemical reaction includes one reactant and two products:

$$X-Y \rightleftharpoons X+Y$$

Accordingly, $$K_d = \frac{[X][Y]}{[XY]}$$

Therefore, $K_d$ may in some cases be described using concentrations as its unit, such as without limitation mM, μM, or pM.

With continued reference to FIG. 1, in one or more embodiments, a subject with a metabolic disorder and/or a condition associated with a metabolic disorder may be treated using GM201, consistent with details described above. In one or more embodiments, a metabolic disorder may include type 2 diabetes (T2D). For the purposes of this disclosure, type 2 diabetes (T2D) is a chronic metabolic disorder characterized by high blood sugar levels due to a body's inability to use insulin properly, known as insulin resistance. In such a condition, a pancreas may still produce insulin, but the body's cells may fail to respond to it effectively. Over time, insulin production may decrease, worsening the condition. Type 2 diabetes is often associated with obesity, physical inactivity, and/or genetic factors. It may lead to complications such as without limitation heart disease, kidney damage, nerve damage, and vision problems, among others, if not managed properly through diet, exercise, and/or medication. In one or more embodiments, Gal3 may contribute to T2D and/or cause cellular and systemic insulin resistance. As a nonlimiting example, Gal3-knockout mice are resistant to diabetogenesis, which indicates that they may require Gal3 for diabetogenesis. In one or more embodiments, Gal3 may be linked to obesity-induced insulin resistance in insulin-targeted hepatocytes, adipocytes, and myocytes. In one or more embodiments, accordingly, specific inhibition of Gal3 using GM201 may restore insulin sensitivity.

With continued reference to FIG. 1, in one or more embodiments, a metabolic disorder may include metabolic dysfunction-associated steatohepatitis (MASH) or fibrosis. For the purposes of this disclosure, metabolic dysfunction-associated steatohepatitis (MASH), previously known as non-alcoholic steatohepatitis (NASH), is a severe form of metabolic dysfunction-associated fatty liver disease (MAFLD), characterized by inflammation and liver cell damage, in addition to fat accumulation in the liver. Unlike simple fatty liver, MASH may lead to fibrosis (scarring), cirrhosis, and/or liver failure, among other medical conditions. MASH may occur in people who drink little to no alcohol and may often be associated with conditions including without limitation obesity, type 2 diabetes, and metabolic syndrome, among others. If untreated, MASH may increase the risk of liver-related complications, including without limitation liver cancer. Management of MASH typically involves lifestyle changes, such as without limitation diet and exercise. MASH and MASH-mediated liver fibrosis may be driven by a heterogeneous population of hepatic myofibroblasts which are mainly derived from hepatic stellate cells (HSCs) and portal fibroblasts. These fibroblasts may facilitate hepatocyte interactions via inflammatory mediators. Gal3 may promote pro-fibrotic factor release, contribute to an activation of inflammatory cells (e.g., macrophages and others), lead to a proliferation of extracellular matrix-producing cells (fibroblasts and myofibroblasts), and/or cause tissue injury in the liver. In addition, it is speculated that Gal3 may cross-link with glycans of a transforming growth factor β (TGF-β) receptor, particularly TGF-β receptor II (TGFβ-RII), resulting in prolonged activation of the receptor. Additionally, Gal3 is overexpressed in MASH and fibrosis tissues in human and animal samples. Interaction between Gal3 and TGFβ-RII glycoprotein is believed to contribute to MASH and/or fibrosis, and such interaction may be inhibited by GM201. Cases of fibrosis that may be treated using GM201 may include without limitation pulmonary fibrosis, liver fibrosis, skin fibrosis, kidney fibrosis, and heart fibrosis, among others.

With continued reference to FIG. 1, in one or more embodiments, idiopathic pulmonary fibrosis (IPF) may be treated using GM201. For the purposes of this disclosure, idiopathic pulmonary fibrosis (IPF) is a medical condition of progressive lung scarring. IPF does not have a known etiology or a cure and is considered the most lethal interstitial lung disease. About 128,000 people in the United States suffer from IPF; about 48,000 new cases are diagnosed yearly, and about 40,000 deaths are recorded. Unfortunately, there is no cure for fibrotic diseases. Galectin-3 (Gal3) may be involved in fibrogenesis of various organs such as lung, skin, liver, kidney, and heart. During fibrosis, Gal3 promotes pro-fibrotic factor release, activation of inflammatory cells (macrophages), proliferation of extracellular matrix-producing cells (fibroblasts and myofibroblasts), and tissue injury in different organs.

With continued reference to FIG. 1, in one or more embodiments, GM201 may be used to treat ulcerative colitis (UC). For the purposes of this disclosure, ulcerative colitis (UC) is an idiopathic inflammatory bowel disease characterized by chronic recurrent inflammation restricted to the mucosa and submucosa of the colon. UC is a risk factor for colitis-associated colon cancer. UC patients frequently show submucosal edema, ulcer, bloody diarrhea, granulocyte infiltration, and/or other characteristics. The incidence of UC is 9 to 20 cases per 100,000 persons per year and its prevalence is 156 to 291 cases per 100,000 persons per year. UC is a lifelong disorder with a significant impact on both physical and mental health. Existing drugs have limited effectiveness against UC, and patients are prone to relapse pain and often burdened with high medical costs of treatment.

With continued reference to FIG. 1, in one or more embodiments, GM201 may be used to treat a condition associated with a metabolic disorder. In some cases, GM201 may be formulated for administration to a subject as an edible formulation. In some cases, GM201 may be also formulated as a pharmaceutical formulation, such as without limitation for oral, sublingual, intranasal, intraocular, rectal, transdermal, mucosal, pulmonary, topical, and/or parenteral administration. Parenteral modes of administration may include without limitation intradermal, subcutaneous (SC, SD, Sub Q. Hypo, etc.), intramuscular (IM), intravenous (IV), intraperitoneal (IP), intraarterial, intramedullary, intracardiac, intraarticular (joint), intrasynovial (joint fluid area), intracranial, intraspinal, and/or intrathecal (spinal fluids), among others. Any known device useful for parenteral injection or infusion of pharmaceutical formulations may be used to carry out such administration. In one or more embodiments, GM201 may be administered to a subject as an edible formulation or an IP pharmaceutical formulation. Additional details will be provided below in this disclosure.

With continued reference to FIG. 1, a composition containing GM201 may include a drug used to treat type 2 diabetes. A composition containing GM201 may include, in nonlimiting examples, metformin, a dipeptidyl peptidase 4 (DPP-4) inhibitor, a glucagon-like peptide 1 (GLP-1) receptor agonist, a dual GLP-1 gastric inhibitory peptide (GIP) receptor agonist, a sodium-glucose cotransporter 2 (SGLT2) inhibitor, sulfonylureas, thiazolidinediones (TZD), alpha glucosidase inhibitors, bile acid sequestrants, dopamine-2 agonists, and meglitinides. A DPP-4 inhibitor may include without limitation alogliptin, linagliptin, saxagliptin, and/or sitagliptin, among others. A GLP-1 and/or dual GLP-1/GIP receptor agonist may include without limitation dulaglutide, exenatide, liraglutide, lixisenatide, and/or semaglutide, among others. SGLT2 inhibitors may include without limitation bexagliflozin, canagliflozin, dapagliflozin, and/or empagliflozin, among others. Sulfonylureas may include without limitation glimepiride, glipizide, and/or glyburide, among others. TZDs may include without limitation rosiglitazone and pioglitazone, among others. Additionally, and/or alternatively, a composition containing GM201 may include a drug used to treat fibrosis such as without limitation IPF. Additionally, and/or alternatively, a composition including GM201 may include without limitation nintedanib and/or pirfenidone, among others.

With continued reference to FIG. 1, GM201 formulations may include one or more excipients, carriers, and/or diluents. For the purposes of this disclosure, an excipient is an inactive substance used as a carrier or medium for one or more active ingredients in a composition or formulation. Excipients themselves may not have any therapeutic effect, but they may serve various functional roles that are essential for the stability, efficacy, and/or manufacturability of a drug product. Excipients are often used to aid in a manufacturing process, enhance a product's stability, improve the taste or appearance of a product, facilitate drug absorption, or control the release of an active ingredient. Excipients relevant to GM201 formulations may serve different purposes depending, for example and without limitation, on the mode of administration. Accordingly, an excipient may be classified as a binder, a filler/diluent, a disintegrant, a lubricant, a coating, a preservative, a stabilizer, and/or the like, depending on its purpose or purposes. Specifically, a binder may help hold the ingredients of a formulation together; a filler/diluent may be said to add bulk to a formulation that contain very potent drugs, ensuring a proper size and dosage form of the formulation; a disintegrants may aid in the breakdown of a formulation when ingested to ensure an active ingredient is released and absorbed; a lubricant may prevent ingredients from aggregating together and improve the manufacturing process thereof; a coating may be applied to improve the appearance, taste, or swallowability of a formulation and/or to control the release of one or more active ingredients therein; a preservative may prevent microbial growth, ensuring that a formulation remains safe over its shelf life; a stabilizer may protect one or more active ingredients in a formulation from degradation due to factors such as without limitation heat, oxygen, light, or moisture, etc. Nonlimiting examples of excipients may include saline, buffered saline, dextrose, water-for-infection, glycerol, ethanol, polyethylene glycol (PEG), stabilizing agents, solubilizing agents and surfactants, buffers, preservatives, tonicity agents, bulking agents, lubricating agents (such as without limitation talc, silica, and/or fats including vegetable stearin, magnesium stearate, and/or stearic acid, among others), emulsifiers, suspending agents, viscosity agents, inert diluents, fillers (such as without limitation starch, cellulose including microcrystalline cellulose, silicon dioxide, dibasic calcium phosphate, vegetable fats and oils, lactose, sucrose, glucose, mannitol, sorbitol, calcium carbonate, and/or magnesium stearate, among others), disintegrating agents (such as without limitation crosslinked polyvinyl pyrrolidone, sodium starch glycolate, and/or cross-linked sodium carboxymethyl cellulose, among others), binding agents (such as without limitation starches, gelatin, cellulose, methyl cellulose, or modified cellulose including microcrystalline cellulose, hydroxypropyl cellulose, sugars including sucrose and lactose, sugar alcohols including xylitol, sorbitol, and/or maltitol, polyvinylpyrrolidone, and/or polyethylene glycol, among others), wetting agents, antibacterials, chelating agents, coatings (such as without limitation a cellulose film coating, synthetic polymers, shellac, corn protein Zein or other polysaccharides, and/or gelatin, among others), preservatives (such as without limitation Vitamin A, Vitamin E. Vitamin C, retinyl palmitate, selenium, cysteine, methionine, citric acid, sodium citrate, and/or synthetic preservatives including methyl paraben and/or propyl paraben, among others), sweeteners, perfuming agents, flavoring agents, coloring agents, administration aids, and/or combinations thereof, among others. Additional details pertaining to excipients, carriers, diluents, and buffers, among others, will be provided below in this disclosure.

With continued reference to FIG. 1, for the purposes of this disclosure, a carrier is a chemical composition that improves and/or prolongs the delivery of GM201 to a subject. In some cases, a carrier may be used in the context of an edible formulation or a pharmaceutical formulation. As a nonlimiting example, a carrier may serve to prolong the in vivo activity of GM201 and/or slow the release of GM201 in a subject using controlled-release technologies. As a nonlimiting example, a carrier may also suppress GM201 metabolism in a subject and/or reduce the toxicity of GM201. As a nonlimiting example, a carrier may also be used to target the delivery of GM201 to particular cells or tissues in a subject. A carrier may be hydrophilic, hydrophobic or amphiphilic. Nonlimiting examples of carriers may include without limitation fat emulsions, lipids, PEGylated phospholipids, PEGylated liposomes, PEGylated liposomes coated via a PEG spacer with a cyclic arginylglycylaspartic acid (RGD) peptide c (RGDYK), liposomes/lipospheres, microspheres (including those made of biodegradable polymers or albumin), polymer matrices, biocompatible polymers, protein-DNA complexes, protein conjugates, erythrocytes, vesicles, nanoparticles, and/or side chains for hydrocarbon stapling, among others. A carrier may also be used in formulations for other uses, such as without limitation research uses in vitro (e.g., for delivery to cultured cells) and/or in vivo. In one or more embodiments, a carrier may be used to deliver GM201 to a specific organ, set of organs, cell type, and/or set of cell types. Nonlimiting examples of target organs may include without limitation liver, lung, skin, heart, and/or kidney, among others. Nonlimiting examples of target cell types may include without limitation hepatocytes, adipocytes, and/or myocytes, among others. In one or more embodiments, a carrier and/or another element of a formulation may aid GM201 in entering a cell.

With continued reference to FIG. 1, for the purposes of this disclosure, a diluent is a is an inactive substance used to dilute or increase the volume of a formulation to make it easier to administer. Diluents are commonly used in solid dosage forms such as without limitation tablets or capsules, as well as in liquid formulations such as without limitation injections. Diluents may help ensure the proper dosage of one or more active ingredients in a formulation and may also aid in the drug's absorption, stability, or handling. Common pharmaceutical diluents may include without limitation lactose, starch, and saline, among others, depending on the form of a formulation.

With continued reference to FIG. 1, GM201 may be formulated as one or more edible formulations for oral administration. Such formulations may be presented as discrete units including without limitation capsules or tablets; as powders or granules; as solutions, syrups or suspensions (in aqueous or non-aqueous liquids; or as edible foams or whips; or as emulsions), among others. Suitable excipients for tablets or hard gelatine capsules may include without limitation lactose, maize starch or derivatives thereof, stearic acid or salts thereof, among others. Suitable excipients for use with soft gelatine capsules may include without limitation vegetable oils, waxes, fats, semi-solid, and/or liquid polyols, among others. For the preparation of solutions and syrups, potential excipients may include without limitation water, polyols, and/or sugars, among others. For the preparation of suspensions or emulsions, oils, such as without limitation vegetable oils, may be used to provide oil-in-water or water-in-oil suspensions or emulsion. Additional details pertaining to emulsions will be provided below in this disclosure. In certain situations, delayed release preparations may be advantageous, and compositions capable of delivering GM201 in a delayed or controlled-release manner may accordingly be prepared. Prolonged gastric residence of active substance for release lower down in the gastro-intestinal tract may lead to premature degradation by enzymes present in the stomach, and enteric-coated capsules may accordingly be prepared by following standard techniques, as recognized by a person of ordinary skill in the art, upon reviewing the entirety of this disclosure.

With continued reference to FIG. 1, in one or more embodiments, a composition containing GM201 may be in the form of a tablet, consistent with details described above. For the purposes of this disclosure, a "tablet" is a solid dosage form designed for oral administration, created by compressing one or more active ingredients with inactive ingredients like binders, disintegrants, fillers, lubricants, and coatings, among others. Tablets may come in various shapes and sizes, and may include coatings to mask taste, protect the stomach, or control release. Types of tablets may include without limitation immediate-release, extended-release, chewable, effervescent, sublingual, and buccal, among others. Tablets may offer convenience, stability, precise dosages, and improved patient compliance, making them a widely used and effective method for delivering medications.

With continued reference to FIG. 1, in one or more embodiments, a composition containing GM201 may be in the form of a capsule, consistent with details described above. For the purposes of this disclosure, a "capsule" is a pharmaceutical dosage form including a gelatin or polymer shell designed to encapsulate active ingredients and inactive ingredients. Capsules may contain powders, granules, liquids, or semi-solids and may be engineered for immediate, delayed, or sustained release. Capsules may offer precise dosing, protect contents from environmental factors, and enhance patient compliance by masking taste and odor. Capsules May be available in hard and soft forms, providing versatility in drug formulation and manufacturing, making them a widely used and effective method for delivering various therapeutic agents.

With continued reference to FIG. 1, in one or more embodiments, a composition containing GM201 may be in the form of an edible, consistent with details described above. For the purposes of this disclosure, an "edible" is a substance or product that is safe and suitable for human consumption. Edibles may provide essential nutrients or deliver therapeutic agents through oral ingestion. Edibles must meet safety standards. Edibles often offer nutritional value or therapeutic benefits and are usually palatable to ensure compliance. Common examples of edibles may include without limitation fruits, vegetables, nuts, seeds, meat, dairy products, processed foods, vitamin gummies, medicinal lozenges, cannabis-infused gummies, chocolates, and liquid supplements. Edibles may be designed to support overall health, provide necessary nutrients, or treat medical conditions effectively.

With continued reference to FIG. 1, in one or more embodiments, a composition containing GM201 may be in the form of an emulsion, consistent with details described above in this disclosure. For the purposes of this disclosure, an "emulsion" is a mixture of two or more liquids that are normally immiscible, usually with the help of a chemical additive, wherein a first liquid is suspended in a second liquid as microscale or nanoscale droplets. Accordingly, in one or more embodiments, a composition containing GM201 may include one or more emulsifiers, consistent with details described above. For the purposes of this disclosure, an "emulsifier" is a substance and/or analyte that stabilizes an emulsion. Emulsifiers may include either natural or synthetic emulsifiers. Natural emulsifiers may include without limitation proteins, polymers of amino acids, carbohydrates, and the like. Synthetic emulsifiers may include PEG45/dodecyl glycol copolymer, arachidyl alcohol, various Carbomers, cetearyl alcohol, Cosmedia® Gel CC (from BASF), and/or the like. In some cases, and without limitation, an emulsifier may stabilize an emulsion by increasing its kinetic stability. In another embodiment, and without limitation, an emulsifier may include or more amphiphilic surfactants. For the purposes of this disclosure, an "amphiphilic surfactant" is a compound that has a polar hydrophilic portion and a non-polar hydrophobic portion. In some cases, and without limitation, an amphiphilic surfactant may produce one or more oil-in-water emulsions and/or water-in-oil emulsions. In some cases, and without limitation, an emulsifier may include lecithin, soy lecithin, mucilage, sodium phosphate, monoglyceride, diglyceride, sodium stearoyl lactylate, diacetyl tartaric acid ester monoglyceride, diacetyl tartaric acid ester diglyceride, cellulose, sodium caseinate, and/or the like thereof. In some cases, and without limitation, an emulsifier may comprise polysorbate 20, ceteareth 20, detergents, and/or the like thereof.

With continued reference to FIG. 1, in one or more embodiments, GM201 may be included in a composition or formulation adapted for parenteral administration. In some cases, such composition or formulation may include a pharmaceutical formulation. Pharmaceutical formulations adapted for parenteral administration may include without limitation aqueous and/or non-aqueous sterile injection solutions. Such sterile injection solution may include without limitation antioxidants, buffers, bacteriostats, and/or solutes which may render a formulation substantially isotonic with the blood of an intended recipient. Additionally, and/or alternatively, such sterile injection solution may include without limitation suspending agents and/or thickening agents. Excipients for such injectable solutions may include without limitation water for injection, alcohols, polyols, glycerin, and/or vegetable oils, among others.

With continued reference to FIG. 1, a composition or formulation containing GM201 may include a buffer. For the purposes of this disclosure, a "buffer" is a solution or mixture that contains at least a pair of weak acid, HA, and its conjugate base, A⁻, (i.e., the weak acid minus one proton) in a molar ratio between 10:1 and 1:10, wherein the solution maintains a stable pH close to the $pK_a$ (i.e., the negative log of the acid dissociation constant, $K_a$) of the weak acid, against addition of acidic or basic chemical species. For simplicity, a buffer containing a pair of conjugate base and acid may be written as A/HA. Additional examples will be provided below. The pH of a buffer solution may be calculated using the Henderson Hasselbalch equation:

$$pH = pK_a + \log\left(\frac{[A^-]}{[HA]}\right)$$

With continued reference to FIG. 1, a buffer may include any type of buffer deemed suitable by a person of ordinary skill in the art upon reviewing the entirety of this disclosure. As another nonlimiting example, a buffer may include an acetate buffer (i.e., $CH_3COONa/CH_3COOH$). As another nonlimiting example, a buffer may include a borate buffer (i.e., $Na_2B_4O_7 \cdot 10H_2O/H_3BO_3$). As another nonlimiting example, a buffer may include a bicarbonate buffer (i.e., $NaHCO_3/H_2CO_3$ or $Na_2CO_3/NaHCO_3$, depending on the desired pH). As another nonlimiting example, a buffer may include a cacodylate buffer (i.e., $NaC_2H_6AsO_2/HC_2H_6AsO_2$). As another nonlimiting example, a buffer may include a Good's buffer. For the purposes of this disclosure, "Good's buffers" are a group of more than 20 conjugate acid/base pairs selected and described by Norman Good and colleagues for biochemical and biological research during 1966-1980. For simplicity, only the conjugate acid may be shown for each conjugate acid/base pair. Good's buffers include MES ($C_6H_{13}NO_4S$), ACES ($C_4H_9NO_4S$), PIPES ($C_8H_{18}N_2O_6S_2$), MOPS ($C_7H_{15}NO_4S$), TES ($C_6H_{15}NO_6S$), HEPES ($C_8H_{18}N_2O_4S$), Tricine ($C_6H_{13}NO_5$), TRIS ($C_4H_{11}NO_3$), Bicine ($C_6H_{13}NO_4$), TAPS ($C_7H_{17}NO_6S$), CHES ($C_8H_{17}NO_3S$), CAPS ($C_9H_{19}NO_3S$), AMPSO ($CH_{19}NO_4S$), Gly-Gly ($C_4H_8N_2O_3$), ADA ($C_4H_7NO_4$), BES ($C_6H_{15}NO_5S$), MOPSO ($C_7H_{15}NO_5S$), EPPS ($C_9H_{20}N_2O_4S$), HEPPS ($C_{11}H_{24}N_2O_4S$), CAPSO ($C_9H_{19}NO_4S$), HEPPSO ($C_9H_{20}N_2O_5S$), CABS ($C_{10}H_{19}NO_3S$), ACESO ($C_4H_9NO_5S$), TES-Na ($C_6H_{14}NO_6SNa$), BICINE-Na ($C_6H_{12}NO_4Na$), TRICINE-Na ($C_6H_{12}NO_5Na$), MES-Na ($C_6H_{12}NO_4SNa$), HEPES-Na ($C_8H_{17}N_2O_4SNa$), MOPS-Na ($C_7H_{14}NO_4SNa$), and PIPES-Na ($C_8H_{17}N_2O_6S_2Na$). As a nonlimiting example, a buffer may include a phosphate buffer (i.e., $NaH_2PO_4/H_3PO_4$, $Na_2HPO_4/NaH_2PO_4$, or $NasHPO_4/Na_2HPO_4$, depending on the desired pH). As another nonlimiting example, a buffer may include a phosphate-buffered saline (PBS) solution, a commonly used buffer in biological research and pharmaceutical formulations that typically contains 137 mM NaCl, 2.7 mM KCl, 10 mM $Na_2HPO_4$, and 1.8 mM $KH_2PO_4$. A person of ordinary skill in the art, upon reviewing the entirety of this disclosure, will be able to recognize suitable buffers for the invention described herein.

With continued reference to FIG. 1, in one or more embodiments, a composition or formulation containing GM201 may be stored in a unit-dose or multi-dose container, for example and without limitation, a sealed ampoule or vial. In one or more embodiments, a composition or formulation containing GM201 may be stored in a freeze-dried (lyophilized) condition requiring only an addition of a sterile liquid carrier (e.g., water or saline for injections) immediately prior to use. Extemporaneous injection solutions and suspensions may be prepared from sterile powders, granules, and/or tablets, among others. A pharmaceutical composition containing GM201 may also contain preserving agents, solubilizing agents, stabilizing agents, wetting agents, emulsifiers, sweeteners, colorants, odorants, salts (substances of the present invention may themselves be provided in the form of a pharmaceutically acceptable salt), buffers, coating agents, and/or antioxidants, consistent with details described elsewhere in this disclosure. A pharmaceutical composition may also contain one or more therapeutically active agents in addition to GM201.

With continued reference to FIG. 1, administration frequencies (i.e., doses) for GM201 may include any frequency of administration deemed suitable by a person of ordinary skill in the art, upon reviewing the entirety of this disclosure. Such administration frequency may include without limitation 4 times a day, 3 times a day, twice per day, once daily, every other day, every third day, every fourth day, every fifth day, every sixth day, once weekly, every eight days, every nine days, every ten days, bi-weekly, monthly, or bi-monthly, etc. The duration of administration may be based on a condition being treated, prevented or reduced, and may be determined by an attending physician. However, continuation of administration is contemplated to last for a number of days, weeks, months, or years. In some instances, administration may continue for the entire life of a subject.

With continued reference to FIG. 1, in one or more embodiments, depending on the means of administration, each dose of a composition or formulation containing GM201 may be administered all at once, such as without limitation via an oral formulation in a capsule or liquid, among others, or continuously over an extended period of time, such as without limitation via parenteral administration, e.g., IP administration, among others.

With continued reference to FIG. 1, in one or more embodiments, the amount of GM201 in each dose administered to a subject may vary depending on the physical characteristics of the formulation (e.g., edible formulation vs. an IP formulation), the means used to administer the formulation, and the purpose underlying the administration. However, when administered in an edible formulation, each dose may contain, for example and without limitation, from approximately 0.1 mg/kg to approximately 500 mg/kg of GM201 with respect to the body weight of a subject, including approximately 0.1 mg/kg to approximately 400 mg/kg, approximately 0.1 mg/kg to approximately 300 mg/kg, approximately 0.1 mg/kg to approximately 200 mg/kg, approximately 0.1 mg/kg to approximately 100 mg/kg, from approximately 5 mg/kg to approximately 50 mg/kg, from approximately 10 mg/kg to approximately 30 mg/kg, approximately 10 mg/kg, approximately 11 mg/kg, approximately 12 mg/kg, approximately 13 mg/kg, approximately 14 mg/kg, approximately 15 mg/kg, approximately 16 mg/kg, approximately 17 mg/kg, approximately 17.5 mg/kg, approximately 18 mg/kg, approximately 19 mg/kg, approximately 20 mg/kg, approximately 21 mg/kg, approximately 22 mg/kg, approximately 23 mg/kg, approximately 24 mg/kg, or approximately 25 mg/kg. When administered in an IP formulation, each dose may contain, for example and without limitation, from approximately 0.1 mg/kg to approximately 100 mg/kg, from approximately 5 mg/kg to approximately 50 mg/kg, from approximately 10 mg/kg to approximately 30 mg/kg, approximately 10 mg/kg, approximately 11 mg/kg, approximately 12 mg/kg, approximately 13 mg/kg, approximately 14 mg/kg, approximately 15 mg/kg, approximately 16 mg/kg, approximately 17 mg/kg, approximately 17.5 mg/kg, approximately 18 mg/kg, approximately 19 mg/kg, approximately 20 mg/kg, approxi- With continued reference to FIG. 1, GM201 may have certain advantages in its chemical properties. The binding affinity of Gal3 with most intrinsic ligands including IR is in the range of nanomolar ($K_d$=~$10^{-8}$ to $10^{-9}$). Therefore, the Gal3-GM201 interaction may be 10-100-fold stronger compared to Ga3's natural affinity with its intrinsic ligands such IR or the like. Other galectin antagonists may have a significantly lower affinity for Gal3 (e.g., 14 nM-10 µM) than GM201. These galectin antagonists may bind not only to Gal3 but also to other members of the galectin family, such as without limitation Gal1, Gal4, and Gal9, etc., which may potentially cause off-target effects. In contrast, GM201 is a natural Gal3 inhibitor that specifically targets Gal3 with a higher affinity. Its nearest comparable synthetic inhibitor, TD139, is about 144-times less potent (with a $K_d$ of 14 nM) and is not so Gal3-specific. An exemplary comparison between GM201 and other galectin antagonists is provided in Table 1.

TABLE 1

| Comparison of GM201 to Other Galectin Antagonists | | | | | | |
|---|---|---|---|---|---|---|
| | GM201 | TD139 | MCP | GCS-100 | GM-CT-01 | GR-MD-2 |
| Affinity to Gal3 ($K_d$) | 97 pM | 14 nM | 2.6 µM | 10 µM | 10 µM | 10 µM |
| Specificity to Gal3 | Yes | No | No | No | No | No | mately 21 mg/kg, approximately 22 mg/kg, approximately 23 mg/kg, approximately 24 mg/kg, or approximately 25 mg/kg.

With continued reference to FIG. 1, in one or more embodiments, similarly, a molecule related to or resembles GM201 may be administered to a subject. For example, a peptide component or fragment of GM201 may be administered to a subject. In another example, a polynucleotide encoding at least a peptide component or fragment of GM201 may be administered to a subject. In one or more embodiments, a molecule with peptide components that resembles GM201 by at least 50%, at least 60%, at least 70%, at least 80%, at least 90%, at least 95%, at least 99%, etc., may be administered to a subject.

With continued reference to FIG. 1, in one or more embodiments, administration of GM201 may reduce Gal3 activity, such as without limitation an interaction between Gal3 and a molecule with a binding affinity towards Gal3. As a nonlimiting example, administration of GM201 may reduce Gal3 interaction with TGFβ-RII and/or insulin receptor (IR). As another nonlimiting example, administration of GM201 may reduce the interaction between Gal3 and TGFβ-RII and/or between Gal3 and IR by 10%, 20%, 30%, 40%, 50%, 60%, 70%, 80%, 90%, 95%, 99%, or more.

With continued reference to FIG. 1, GM201 may be included in a kit. In one or more embodiments, GM201 may be provided in a prefilled cartridge. Accordingly, GM201 may be provided in the form of a solution in such a cartridge. Such a cartridge may allow for an administration by subcutaneous (SC) injection. A kit may include instructions for use. As a nonlimiting example, GM201 may be self-administered using a syringe.

With continued reference to FIG. 1, GM201 may bind specifically to Gal3 with a high (picomolar) affinity. Therefore, GM201 may have a competitive advantage over other known galectin antagonists, such as without limitation TD139, MCP, GCS-10, GM-CT-01, GR-MD-02, RG-I, and N-Lac, among others, in one or more ways.

With continued reference to FIG. 1, GM201 also has production advantages. In one or more embodiments, GM201 may be easier to produce than other galectin antagonists. In one or more embodiments, GM201 may be obtained from a natural dietary source. In one or more embodiments, GM201 may be purified from pacific cod. In one or more embodiments, GM201 and/or recombinant GM201 (rGM201) may be expressed in Chinese hamster ovary (CHO) cells. In contrast, MCP, GCS-100, GM-CT-01, and GR-MD-02 are polysaccharides with complex structures which may make them more difficult to produce.

With continued reference to FIG. 1, unless otherwise indicated, the practice of the present invention may employ conventional techniques of cell culturing, molecular biology (including recombinant techniques), microbiology, cell biology, biochemistry, and/or immunology, among others, as recognized by a person of ordinary skill in the art upon reviewing the entirety of this disclosure.

With continued reference to FIG. 1, in some cases, creating a recombinant GM201 (r GM201) may involve using recombinant DNA technology, CRISPR-Cas9, gene cloning, and/or other molecular biology techniques to achieve desired phenotypic changes. For the purposes of this disclosure, "recombinant DNA technology" is a type of technology that involves a manipulation of DNA sequences to create new genetic combinations not found in nature. Recombinant DNA technology may include techniques such as gene cloning, insertion of DNA fragments from one organism into another, and/or use of vectors such as plasmids to transfer a genetic material. Recombinant DNA technology may be used to express new traits or produce biological products such as proteins, enzymes, and hormones and may play a pivotal role in fields such as genetic engineering, biotechnology, and pharmaceutical development.

With continued reference to FIG. 1, for the purposes of this disclosure, a "plasmid" is a circular, double-stranded DNA molecule distinct from a cell's chromosomal DNA and capable of autonomous replication. A plasmid may be used as a vector for insertion, expression, and propagation of foreign genes within a host organism. Such vectors may include specific sequences for an origin of replication, selectable markers, and cloning sites, enabling manipulation and study of genetic material for applications in research, biotechnology, and therapeutic development.

With continued reference to FIG. 1, for the purposes of this disclosure, "CRISPR-Cas9" is a genetic engineering tool, derived from a bacterial immune defense mechanism, that includes Clustered Regularly Interspaced Short Palindromic Repeats (CRISPR) sequences and the CRISPR-associated protein 9 (Cas9) enzyme and allows for precise, targeted modification of DNA within an organism. CRISPR-Cas9 may be programmed with a guide RNA to target a specific DNA sequence, enabling Cas9 enzyme to create double-strand breaks at one or more precise locations, thereby facilitating insertion, deletion, or modification of genetic material.

Figure 2:
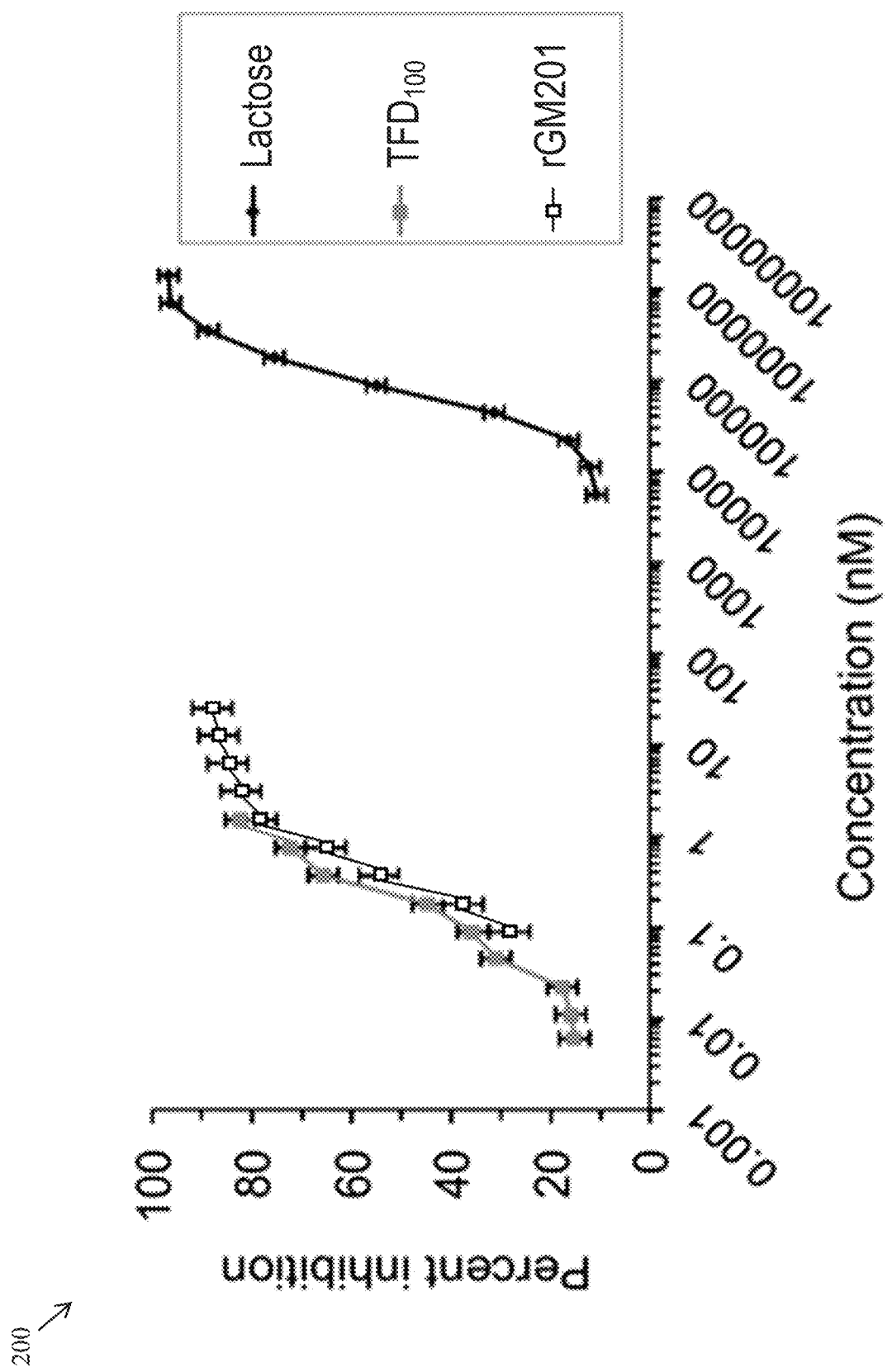
FIG. 2 is a chart of exemplary inhibition curves with a percent inhibition of galectin-3 (Gal3) plotted as a function of increasing concentrations of $TFD_{100}$, recombinant GM201 (rGM201), and lactose as a reference; the overlap between $TFD_{100}$ and rGM201 inhibition curves indicates a similarly binding affinity towards Gal3 between $TFD_{100}$ and rGM201.

Referring now to FIG. 2, FIG. 2 includes a chart of exemplary inhibition curves 200 with a percent inhibition of Gal3 plotted as a function of increasing concentrations of $TFD_{100}$, recombinant GM201 (rGM201), and lactose as a reference; the overlap between $TFD_{100}$ and rGM201 inhibition curves indicates a similarly binding affinity towards Gal3 between $TFD_{100}$ and rGM201. For the purposes of this disclosure, an "inhibition curve" is a graphical representation used in pharmacology and biochemistry to show how an inhibitor affects the activity of an enzyme, a biological process, or the like. Typically, an inhibition curve plots the concentration of an inhibitor on the x-axis and the corresponding reduction in an enzyme activity (or another measurable response) on the y-axis. An inhibition curve may help visualize the relationship between inhibitor concentration and its effectiveness. As a nonlimiting example, an inhibition curve may be used to determine a half-maximal inhibitory concentration or $IC_{50}$ value. For the purposes of this disclosure, half-maximal inhibitory concentration or $IC_{50}$ is the concentration of an inhibitor needed to reduce the activity of a receptor or an enzyme by 50%. A small $IC_{50}$ value typically indicates a stronger binding affinity between an inhibitor and its target, and vice versa. $IC_{50}$ is a commonly used indication regarding a drug's efficacy and potency and is often used in pharmacological research. For the purposes of this disclosure, drug potency is the amount of a drug needed to produce a given effect. A highly potent drug requires a lower dose to achieve the same effect compared to a less potent drug. It is often measured using the $EC_{50}$, i.e., the concentration at which 50% of the maximum effect is observed. For the purposes of this disclosure, drug efficacy, on the other hand, is the maximum effect a drug can produce, regardless of its dosage. A drug with a high efficacy may achieve a greater therapeutic effect compared to a drug with a lower efficacy, assuming a sufficient dosage.

With continued reference to FIG. 2, specifically, to generate the inhibition curves described herein, $TFD_{100}$ was affinity purified (>98%) from Pacific cod using sodium dodecyl sulfate polyacrylamide gel electrophoresis (SDS-PAGE). For the purposes of this disclosure, sodium dodecyl sulfate polyacrylamide gel electrophoresis or SDS-PAGE is a laboratory technique used to separate proteins based on their molecular weight. Sodium dodecyl sulfate, an anionic detergent, denatures proteins and gives them a uniform negative charge, allowing them to be separated solely by size when an electric field is applied across a polyacrylamide gel. As a result, smaller proteins migrate faster through the polyacrylamide gel, while larger proteins move more slowly. SDS-PAGE is widely used for protein analysis, including protein purification, identification, and molecular weight estimation. The purified $TFD_{100}$ product migrated as a single band, which indicated a satisfactory level of purity in $TFD_{100}$. On a solid-phase assay, $TFD_{100}$ was 800,000-fold more active in blocking Gal3 binding compared to a synthetic TFD, with an $IC_{50}$ of 0.25 nM vs. 200 µM. $TFD_{100}$'s O-glycan may be important in strengthening the Gal3-$TFD_{100}$ interaction, as aglyco-$TFD_{100}$ was not inhibitory. Surface Plasmon Resonance (SPR) assays revealed that $TFD_{100}$ bound Gal3 with ~6 orders of magnitude ($K_d$=97 pM) greater affinity than TFD. Due to their multiple (n=132) TFDs, $TFD_{100}$ binds Gal3 with a very high affinity.

With continued reference to FIG. 2, to scale up its production, full-length $TFD_{100}$ was expressed in CHO cells, named GM201. To purify recombinant GM201 (rGM201), the expressed glycoprotein was first purified on a jacalin-agarose, desialylated by mild acid hydrolysis. After dialysis, the product was purified over peanut lectin agarose. The purified GM201 (yield: 12-15 mg/L CHO culture) with Galβ1,3GalNAc was confirmed using SDS-PAGE and Glycan Differentiation kit. This GM201 bound Gal3 with a picomolar affinity similar to natural $TFD_{100}$. The quality of purified GM201 is consistent among batch-to-batch preparations. The amino acid (AA) sequence identity between human Gal3 and Gal3 from rodents and non-human primates (monkeys) is approximately 80-95%, but the amino acids responsible for carbohydrate binding are 100% identical. Thus, GM201 may exhibit cross-species activity. This characteristic of Gal3 may be essential for testing GM201's efficacy and toxicity studies in various animal models.

Figure 3:
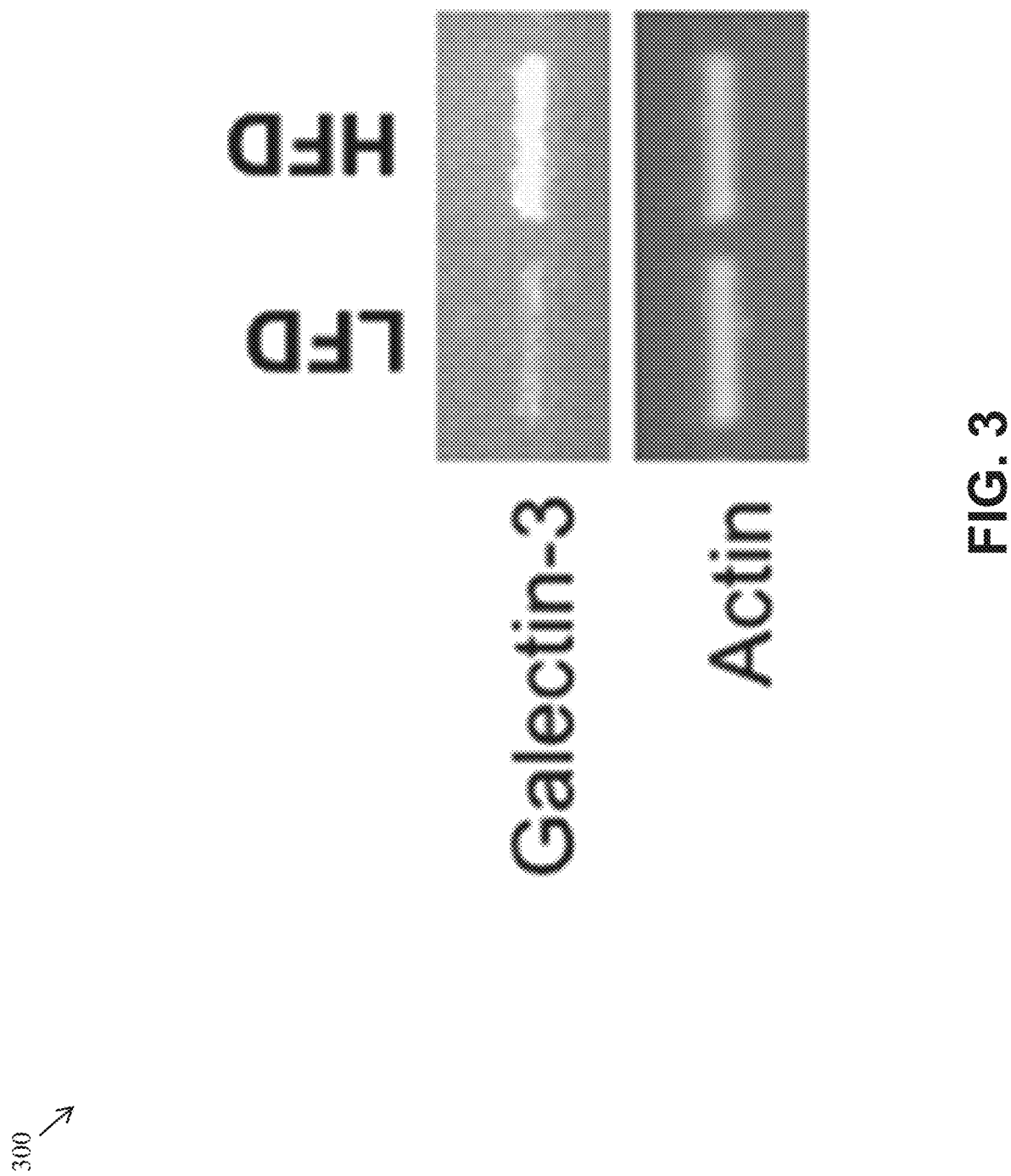
FIG. 3 is an exemplary result from a reverse transcription polymerase chain reaction (RT-PCR) showing increased expression of Gal3 in livers of HFD-fed mice compared to LFD-fed mice.

Referring now to FIG. 3, exemplary results 300 from a representative reverse transcription polymerase chain reaction (RT-PCR) are illustrated to show an increased expression of Gal3 in livers of HFD-fed mice compared to LFD-fed mice. The expression of actin protein was used as a reference or loading control. For the purposes of this disclosure, reverse transcription polymerase chain reaction (RT-PCR) is a laboratory technique used to detect and quantify RNA by first converting it into its complementary DNA (cDNA) using reverse transcriptase, then implementing a polymerase chain reaction (PCR) to amplify specific DNA sequences within the cDNA. This method is widely used in molecular biology, medical diagnostics including without limitation detecting RNA viruses such as SARS-CoV-2 or the like, and gene expression analysis. RT-PCR combines the processes of transcription and amplification, enabling the detection of even small amounts of RNA. Specifically, Gal3 was upregulated in high-fat diet (HFD)-fed mouse liver. C57BL/6 (B6) mice fed with a high-fat diet (HFD: 34.9% fat, 60% kcal) became obese with chronic inflammation and insulin resistance. Although the fat intake in this model (60% kcal) exceeds the fat intake in developed nations (34-47% kcal), it is by far the most suitable model for impaired glucose tolerance and early T2D. Importantly, this model recapitulates that metabolic syndrome (obesity) leading to T2D, including without limitation weight gain, hyperglycemia, hyperinsulinemia followed by hypoinsulinemia, insulin resistance, etc. As such, the model is useful for developing new treatments. HFD-fed mice showed an increased expression of Gal3 compared to age-matched low-fat diet (LFD)-fed mice. GM201 showed therapeutic potential for ameliorating insulin resistance in these animals.

Figure 4:
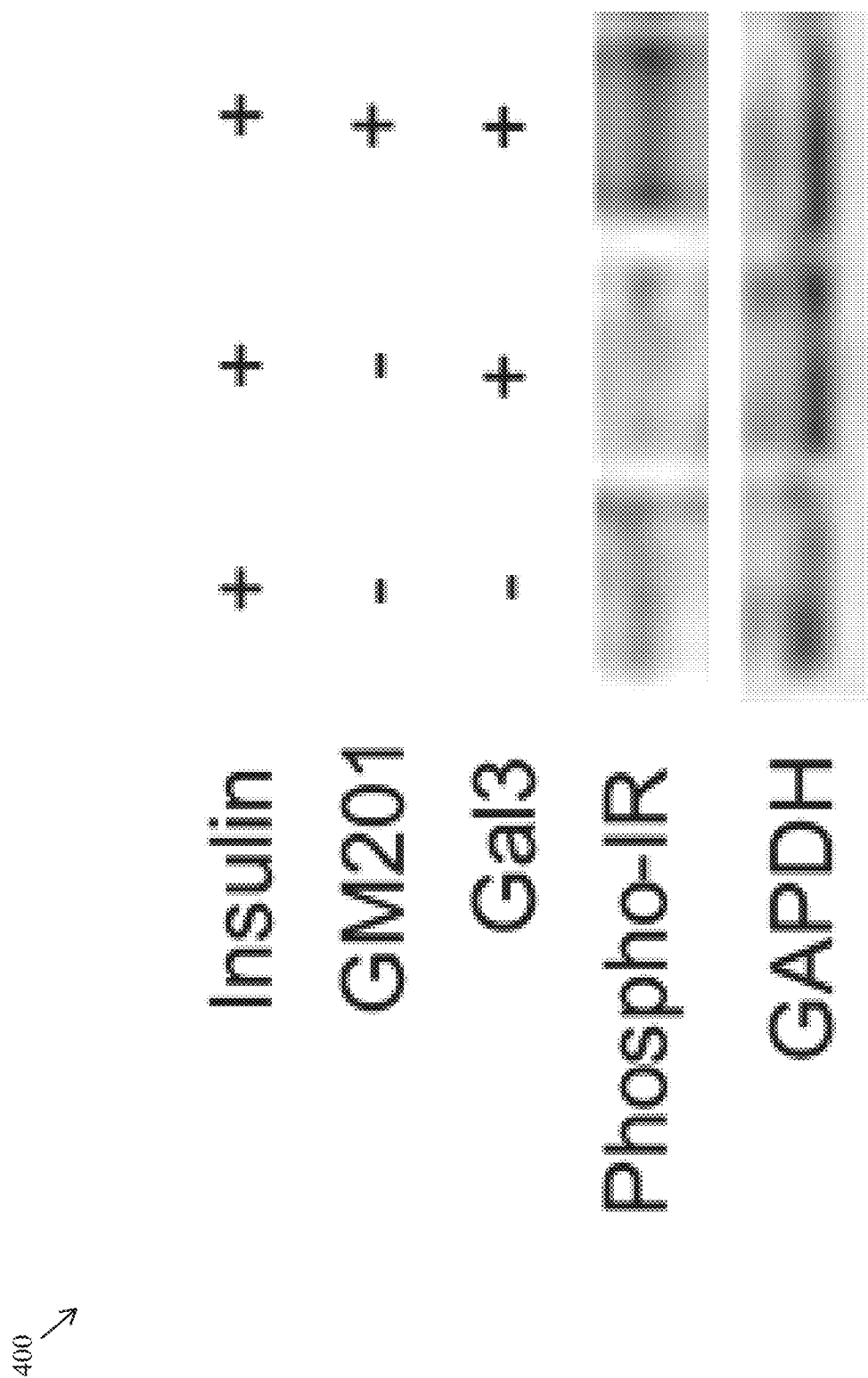
FIG. 4 is an exemplary western blot showing a Gal3-mediated suppression of insulin receptor (IR) activation and its reversal by GM201.

Referring now to FIG. 4, an exemplary embodiment of a western blot 400 is illustrated to show a Gal3-mediated suppression of IR activation and its reversal by GM201. For the purposes of this disclosure, western blotting is a widely used laboratory technique in molecular biology and biochemistry to detect and quantify specific proteins in a sample. Western blotting involves separating proteins based on their size through gel electrophoresis, transferring them to a membrane (usually nitrocellulose or PVDF), and using antibodies to specifically bind to a target protein. A secondary antibody, often linked to an enzyme or fluorescent tag, is then applied to produce a detectable signal, allowing visualization of a protein of interest. Western blot 400 demonstrates the ability of GM201 to impede Gal3-mediated cellular insulin resistance (IR) in vitro. Specifically, insulin may bind to the insulin receptor (IR), stimulating IR tyrosine auto-phosphorylation and kinase activity and leading to phosphorylation and recruitment of substrate adaptors such as insulin receptor substrate-1 (IRS1). IRS1 then may stimulate P13 kinase and PDK1, which may signal downstream to protein kinase B (PKB or Akt) and glucose transport. Additional details will be provided below in this disclosure. It is proposed that, in a case of obesity-mediated diabetes, Gal3 may bind to an insulin receptor (IR) and impair insulin signaling. This effect may be reversed by GM201, a high-affinity Gal3 inhibitor, consistent with details described above. The effect of Gal3 on IR activation was investigated in relevant cells (hepatocytes, CHO/IR/IRS-1, etc.). For such purpose, CHO/IR/IRS-1 cells were treated with Gal3 or Gal3+GM201 for 2 hours, at a dosage of 1 μg Gal3/well/1 mL culture medium. The cells were then treated with insulin, at a dosage of 10 nM, for 5 min and then examined for activation of IR and IRS-1 as assessed by western blotting with the respective phosphorylated antibodies. Results in western blot 400 showed that Gal3 inhibited activation of IR and IRS-1, and such activation was reversed by GM201.

Figure 5A:
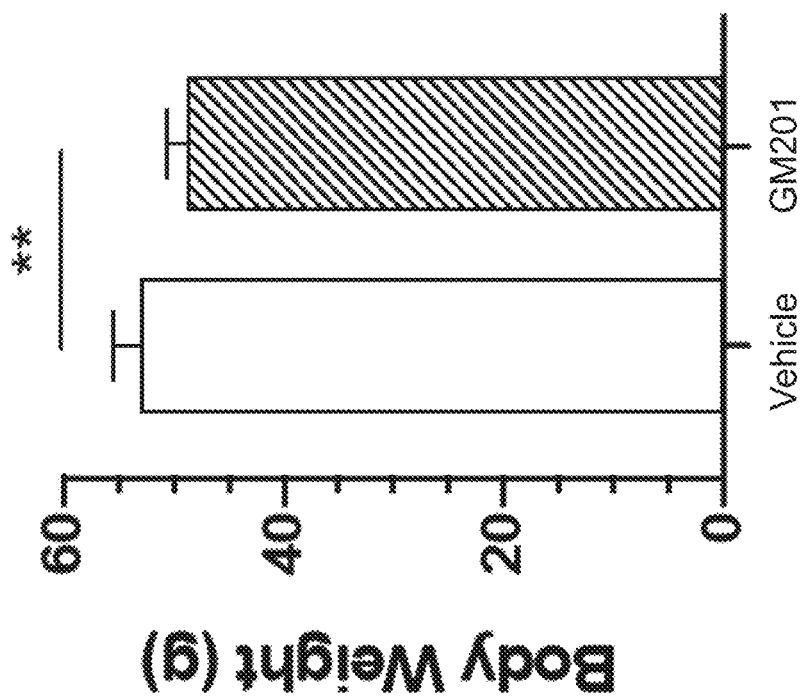
FIG. 5A is a chart with exemplary experimental data of the body weight of HFD-fed mice treated with GM201 and a phosphate-buffered saline (PBS) vehicle, respectively; GM201 treatment reduced the weight gain of HFD-fed mice.

Referring now to FIG. 5A, FIG. 5A includes a chart of exemplary experimental data 500a indicating that GM201 treatment may prevent a gain in body weight of HFD-fed mice. GM201's ability to treat high-fat diet (HFD)-induced obesity, insulin resistance, and T2D was evaluated. C57BL/6 mice were fed with HFD (Fat 34.9%, 60% kcal) for 14 weeks when each animal weighed approximately 50 g. The expression of Gal3 in HFD-fed mice livers was significantly higher than that in livers of LFD-fed mice (fat 4.3%, 10% kcal). The serum Gal3 level in HFD-fed mice was approximately 17-fold higher compared to LFD-fed mice. Animals were randomly divided into two groups, with 10 animals/group, and either GM201 at a dosage of 3 mg/kg body weight or a blank control of PBS vehicle was administered by intraperitoneal (IP) injection twice weekly for 5 weeks. All animals were fed with HFD during the therapy. All animals were weighed at least once a week throughout the study. All data were analyzed and plotted on Graphpad Prism 8, and the p-value was determined by the Mann-Whitney test. Only the PBS vehicle-treated group, not the GM201-treated group, gained additional weight. Therefore, the GM201 treatment significantly prevented a gain in body weight.

Figure 5B:
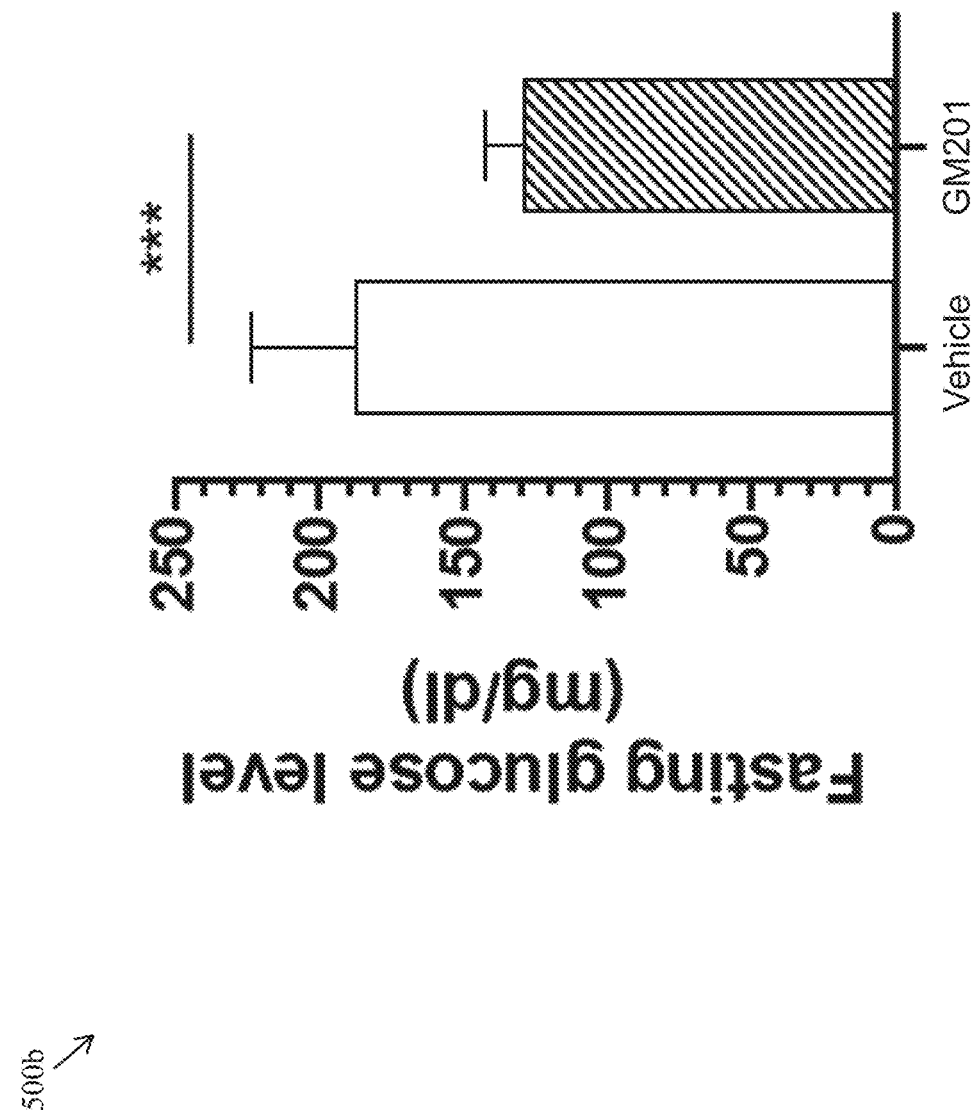
FIG. 5B is a chart with exemplary experimental data of the fasting glucose level of HFD-fed mice treated with GM201 and a PBS vehicle, respectively; GM201 decreased the fasting glucose level of the HFD-fed mice.

Referring now to FIG. 5B, FIG. 5B includes a chart of exemplary experimental data 500b indicating that GM201 decreased the fasting glucose level. Experimental details pertaining to FIG. 5B are consistent with details of FIG. 5A described above. Specifically, fasting blood glucose levels were measured before and after the treatment using GM201. Before GM201 was administered, the mean fasting blood glucose level for each group was approximately 190 mg/dL. However, while the control group treated with PBS vehicle showed a stable fasting blood glucose level throughout the study, the group treated with GM201 showed a significant (p<0.001) decrease the fasting blood glucose level, with a mean value of 125 mg/dL. The HbA1c level of the GM201-treated animals was also lower than the control group.

Figure 6A:
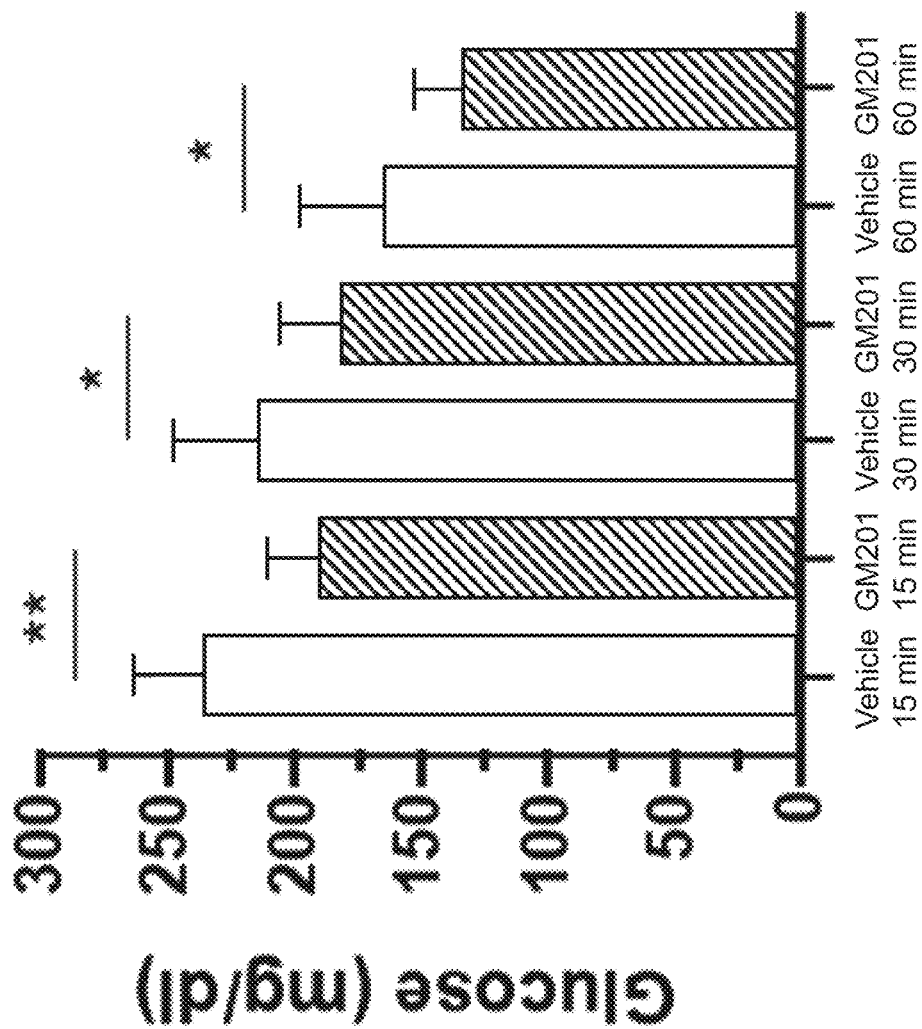
FIG. 6A is a chart with exemplary experimental data from an intraperitoneal glucose tolerance test (IPGTT) in HFD-fed mice treated with GM201 and a PBS vehicle, respectively; GM201 improved the IPGTT results of the HFD-fed mice.
Figure 6B:
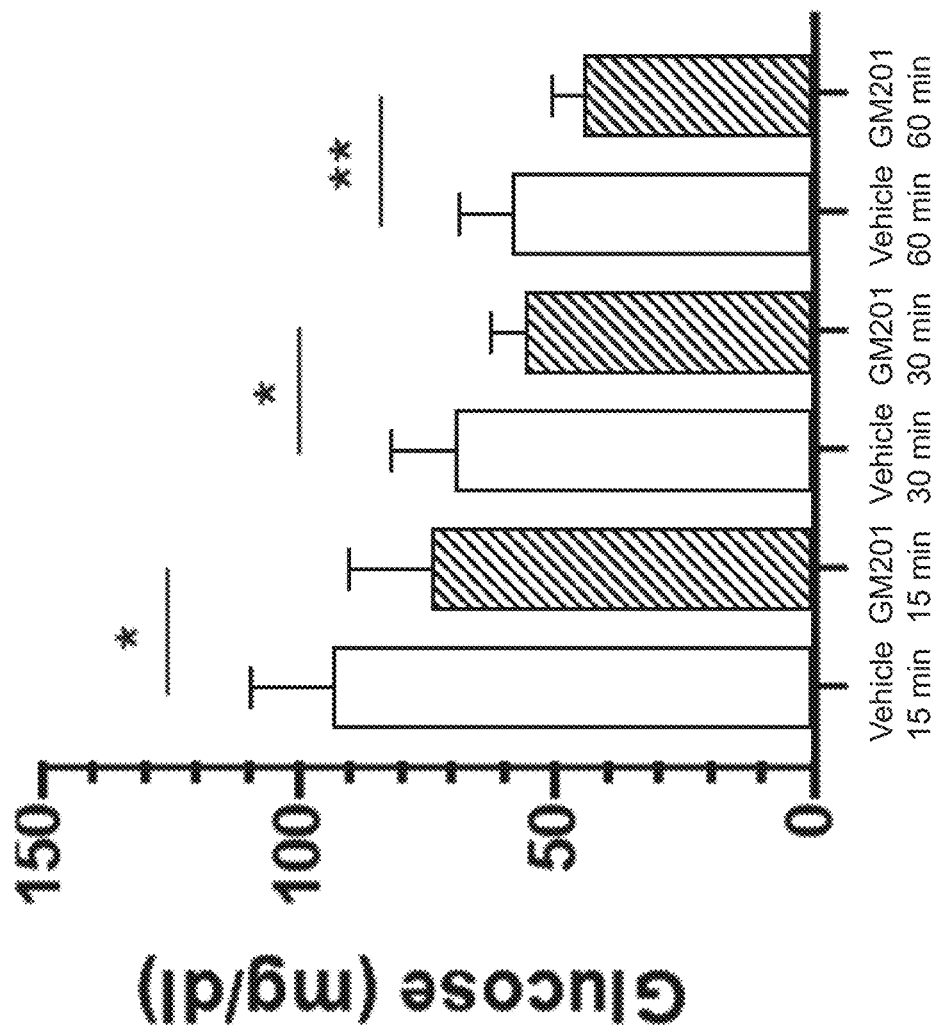
FIG. 6B is a chart with exemplary experimental data from an intraperitoneal insulin tolerance test (IPITT) in HFD-fed mice treated with GM201 and a PBS vehicle, respectively; GM201 improved the IPITT results of the HFD-fed mice.

Referring now to FIGS. 6A-B, FIG. 6A includes a chart with exemplary experimental data 600a from an intraperitoneal glucose tolerance test (IPGTT) in HFD-fed mice treated with GM201 and a PBS vehicle, respectively; Similarly, FIG. 6B includes a chart with exemplary experimental data 600b from an intraperitoneal insulin tolerance test (IPITT) in HFD-fed mice treated with GM201 and a PBS vehicle, respectively. For the purposes of this disclosure, an intraperitoneal glucose tolerance test (IPGTT) is a procedure used primarily in animal research to assess how efficiently an organism regulates blood glucose levels. In an IPGTT, glucose is injected directly into the peritoneal cavity (the space within the abdomen) of an animal, typically a mouse or rat. Blood glucose levels are then measured over time to evaluate how quickly the glucose is cleared from the bloodstream, providing insights into insulin sensitivity, glucose metabolism, and/or the potential development of conditions like diabetes, among others. For the purposes of this disclosure, intraperitoneal insulin tolerance test (IPITT) is a method used primarily in animal research to assess insulin sensitivity. In an IPITT, insulin is injected into the peritoneal cavity (abdomen) of an animal, typically a mouse or rat, and blood glucose levels are monitored over time. An IPITT measures how quickly an administered dosage of insulin reduces blood glucose levels, providing insights into the animal's ability to regulate blood sugar and its overall insulin sensitivity. It is often used to study diabetes and metabolic disorders.

With continued reference to FIGS. 6A-B, at the end of therapy described above for FIGS. 5A-B, mice were subjected to 5-hour fasting followed by IPGTT. Blood glucose level was measured over the course of 60 minutes following intraperitoneal administration of glucose at a dosage of 1 g/kg body weight. Mice were maintained on their research diet and allowed to recover for three days, after which time they were examined by IPITT. To perform IPITT, a dosage of 0.75 U/kg body weight insulin was administered intraperitoneally. The efficacy of GM201 to recover insulin resistance in GM201-treated mice was determined by measuring the level of glucose and insulin tolerance (primary endpoint) and compared with the PBS vehicle-treated mice (i.e., the control group). GM201 significantly improved IPGTT as the blood glucose level of the GM201-treated animals was significantly ($p<0.01$ or $p<0.05$) less (by 14-20%) over the course of 60 min compared to the PBS vehicle-treated animals (see FIG. 6A). Additionally, the GM201 significantly improved the results of IPITT as the blood glucose level of the GM201 treated animals was significantly ($p<0.01$ or $p<0.05$) less (by 20-24%) over the course of 60 min compared to the vehicle-treated animals (see FIG. 6B).

Figure 7A:
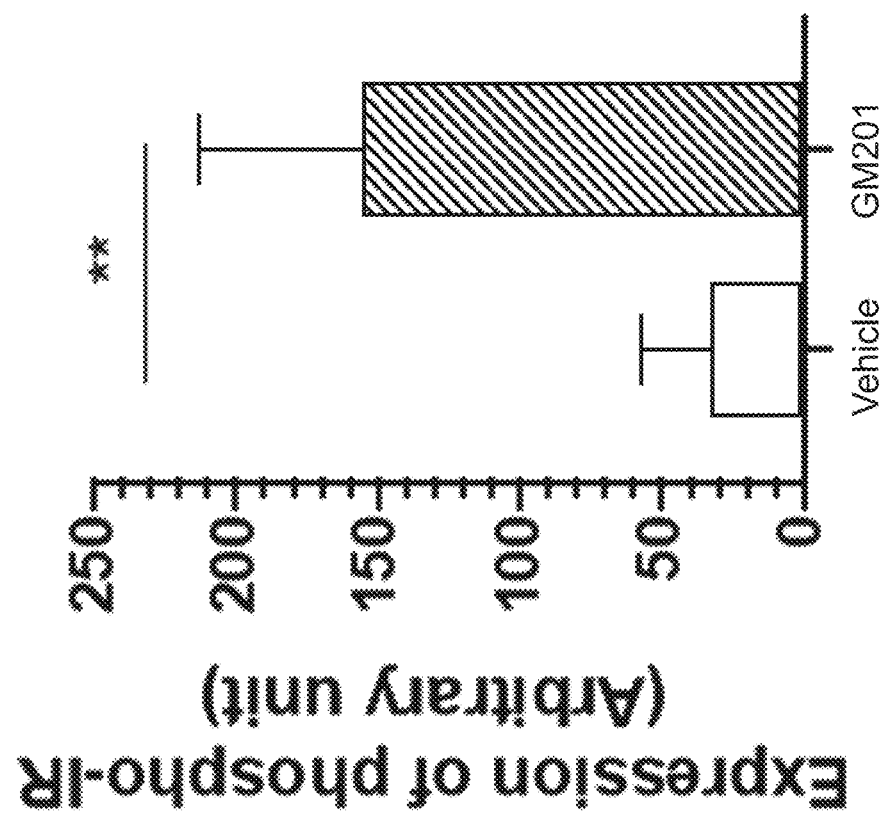
FIG. 7A is a chart with exemplary experimental data containing expression levels of phospho-insulin receptor (Phospho-IR) of HFD-fed mice treated with GM201 and a PBS vehicle, respectively; GM201 significantly promoted IR activation in the HFD-fed mice.
Figure 7B:
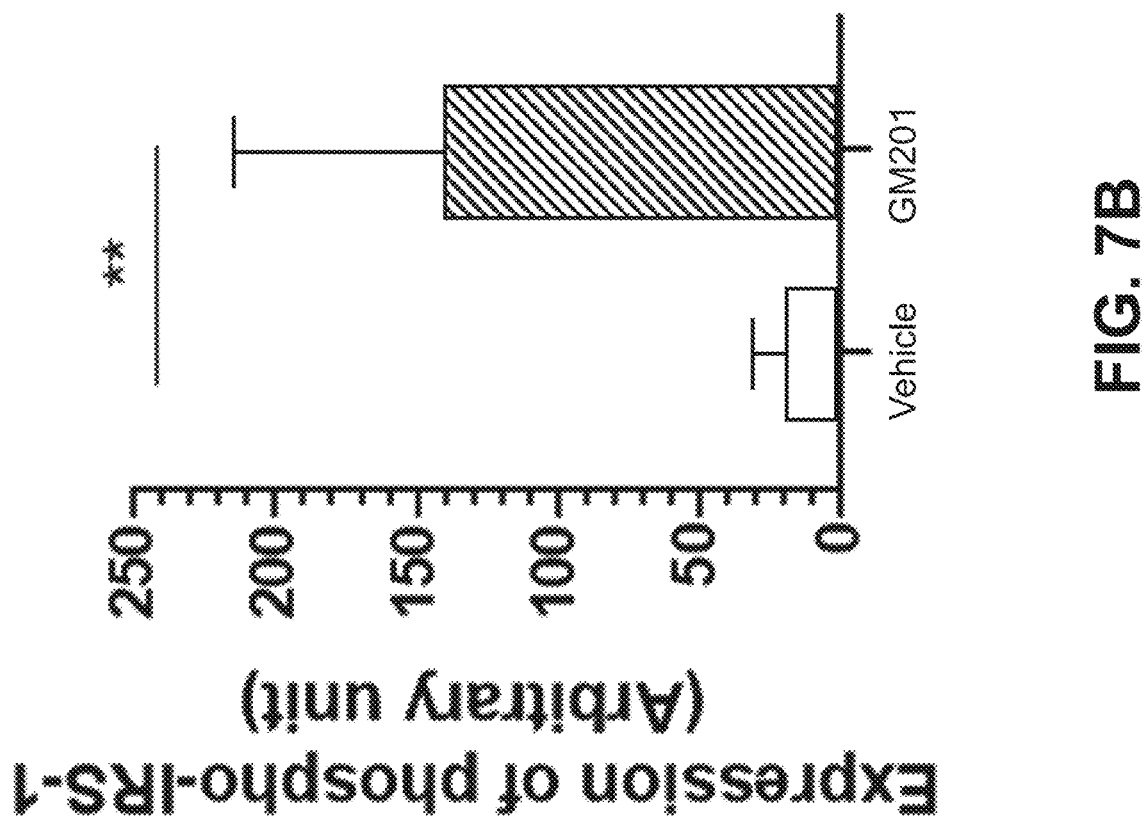
FIG. 7B is a chart with exemplary experimental data containing expression levels of phospho-insulin receptor substrate 1 (Phospho-IRS-1) of HFD-fed mice treated with GM201 and a PBS vehicle, respectively; GM201 significantly promoted IRS-1 activation in the HFD-fed mice.

Referring now to FIGS. 7A-D, changes in relevant biomarkers were determined after GM201 therapy. A treatment using PBS vehicle was used as the control group, consistent with details described above. FIG. 7A is a chart with exemplary experimental data 700a containing expression levels of phospho-insulin receptor (Phospho-IR) of HFD-fed mice treated with GM201 and a PBS vehicle, respectively. For the purposes of this disclosure, a phospho-insulin receptor is the insulin receptor under its phosphorylated state, which occurs when insulin binds to the receptor to trigger a series of intracellular signaling cascades. Phosphorylation activates an insulin receptor and is essential for initiating insulin's effects on glucose uptake and metabolism. The expression level of the phospho-insulin receptor is accordingly a key indicator of insulin signaling efficiency. A reduced expression of Phospho-IR and/or or an impaired phosphorylation of IR may lead to insulin resistance, contributing to metabolic disorders including without limitation type 2 diabetes. In contrast, a normal level of Phospho-IR may promote proper glucose regulation.

Figure 7C:
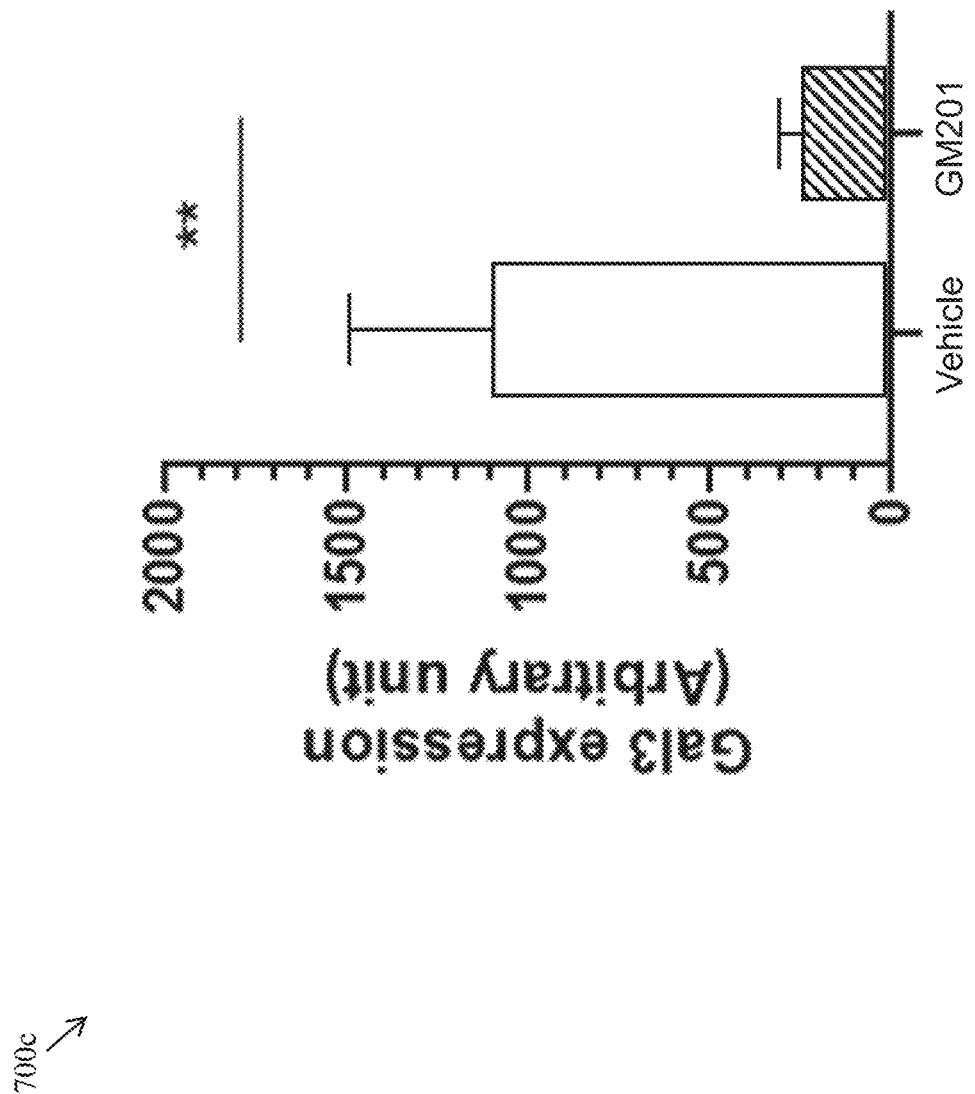
FIG. 7C a chart with exemplary experimental data containing expression levels of Gal3 of HFD-fed mice treated with GM201 and a PBS vehicle, respectively; GM201 treatment significantly reduced Gal3 expression in liver.

With continued reference to FIGS. 7A-D, FIG. 7B is a chart with exemplary experimental data 700b containing expression levels of phospho-insulin receptor substrate 1 (Phospho-IRS-1) of HFD-fed mice treated with GM201 and a PBS vehicle, respectively. For the purposes of this disclosure, insulin receptor substrate 1 (IRS-1) is a key signaling protein that acts as a mediator between an insulin receptor (IR) and its downstream cellular processes. Once insulin binds to its receptor (i.e., IR), the receptor gets phosphorylated and activates IRS-1 through phosphorylation at specific tyrosine residues. This activation may trigger signaling pathways including without limitation the PI3K-Akt pathway, which regulates glucose uptake, lipid metabolism, and protein synthesis. Dysregulation and/or a reduced function of IRS-1 may be associated with insulin resistance, contributing to conditions including without limitation type 2 diabetes and other metabolic disorders. FIG. 7C a chart with exemplary experimental data 700c containing expression levels of Gal3 of HFD-fed mice treated with GM201 and a PBS vehicle, respectively. FIG. 7D is a chart with exemplary experimental data 700d containing serum Gal3 levels of HFD-fed mice treated with GM201 and a PBS vehicle, respectively.

With continued reference to FIGS. 7A-D, gene expression from liver tissues of the drug-treated animals was determined by immunohistochemical staining with the respective specific antibodies. Activation of IR, IRS-1, and Akt in the GM201-treated animals was examined using an anti-phospho-IR antibody, an anti-phospho-IRS-1 antibody, and an anti-Akt antibody, respectively. The GM201 treatment activated the signaling of IR, IRS-1, and Akt, as evidenced by significantly higher expression of phosphorylated IR (see FIG. 7A), phosphorylated IRS-1 (see FIG. 7B), and phosphorylated Akt compared to the control group administered with a PBS vehicle only. Expression of Gal3 in the GM201 treated mice was found to be significantly ($p<0.05$) lower compared to the control group (see FIG. 7C). The absolute concentration of Gal3 in the blood serum was also measured by Enzyme-Linked Immunosorbent Assay (ELISA) using a Gal3 quantitation kit (R&D Systems) and Gal3 concentration in the GM201-treated animals was found to be significantly ($p<0.01$) lower compared to the control group (see FIG. 7D). For the purposes of this disclosure, Enzyme-Linked Immunosorbent Assay or ELISA is a widely used technique in immunology to detect and quantify specific antigens or antibodies in a sample. ELISA involves immobilizing a target molecule (e.g., an antigen) on a surface, adding a sample that potentially contains an analyte (e.g., an antibody), adding an enzyme-labeled ligand (e.g., an enzyme-labelled antibody) that competes with the analyte in binding with the immobilized target molecule, and then adding a substrate that reacts with the enzyme to produce a detectable signal, usually a color change. ELISA is commonly used in diagnostics including disease detection, vaccine development, and measuring immune responses. A person of ordinary skill in the art, upon reviewing the entirety of this disclosure, will be able to recognize how ELISA may be applied to the invention described herein.

With continued reference to FIGS. 7A-D, to investigate the effect of subcutaneous (SC) administered GM201, B6 mice (10 animals/group) were fed with a HFD and administered with either GM201, at a dosage of 3 mg/kg body weight, or a PBS vehicle. Such administration was performed via SC injection twice per week for 5 weeks. Similar to the IP-administered GM201 described above, the SC-administered GM201 decreased both serum Gal3 levels and the fasting glucose level and improved the results in both IPGTT and IPITT in HFD-fed mice compared to the control group. These results suggest that suggesting GM201 may be developed as a SC drug.

Figure 8B:
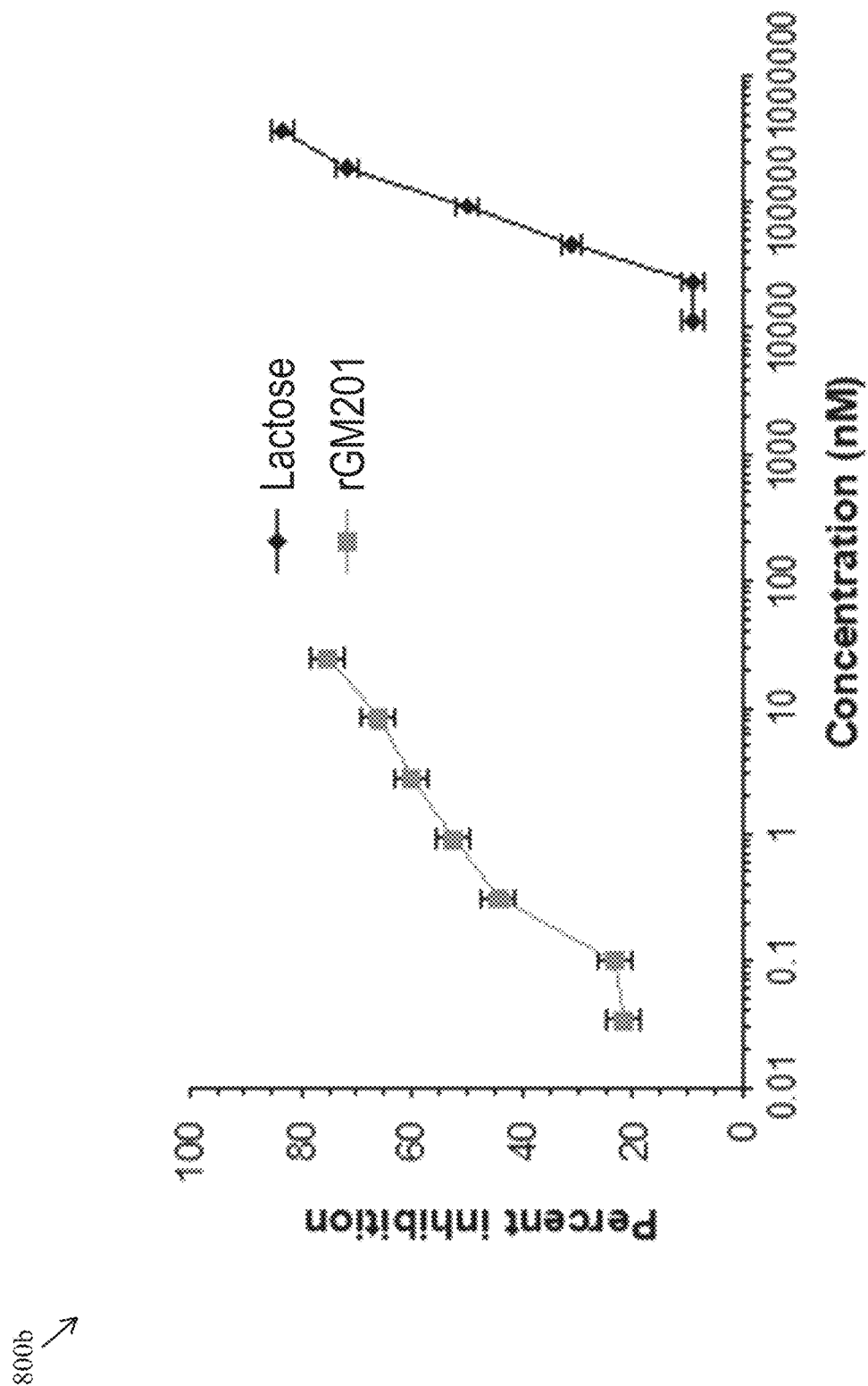
FIG. 8B is a chart with exemplary experimental data showing an increasing percent inhibition of Gal3-TGFβ-RII interaction as a function of increasing concentrations of r GM201; lactose was used as a reference.

Referring to FIGS. 8A-B, FIG. 8A is a chart with exemplary experimental data 800a showing an increasing absorbance at 650 nanometers as a function of increasing concentrations of transforming growth factor β receptor II (TGFβ-RII). FIG. 8B is a chart with exemplary experimental data 800b showing an increasing percent inhibition of Gal3-TGFβ-RII interaction as a function of increasing concentrations of GM201 and lactose as a reference. Gal3 may interact with TGFβ-RII, consistent with details described above, and such interaction may be inhibited by GM201 due to its large binding affinity towards Gal3. As Gal3 may interact with TGFβ-RII glycoprotein during fibrosis progression, Gal3 was combined with varying concentrations of TGFβ-RII, which were coated onto plastic wells (see FIG. 8A). On a solid-phase assay, it was shown that the interaction between Gal3 and a fixed amount (31.2 ng/well) of TGFβ-RII was effectively inhibited using GM201 (see FIG. 8B), with an $IC_{50}$ of approximately 0.5 nM. This $IC_{50}$ value is comparable to results shown in FIG. 2, within a 2-fold range.

Figure 9:
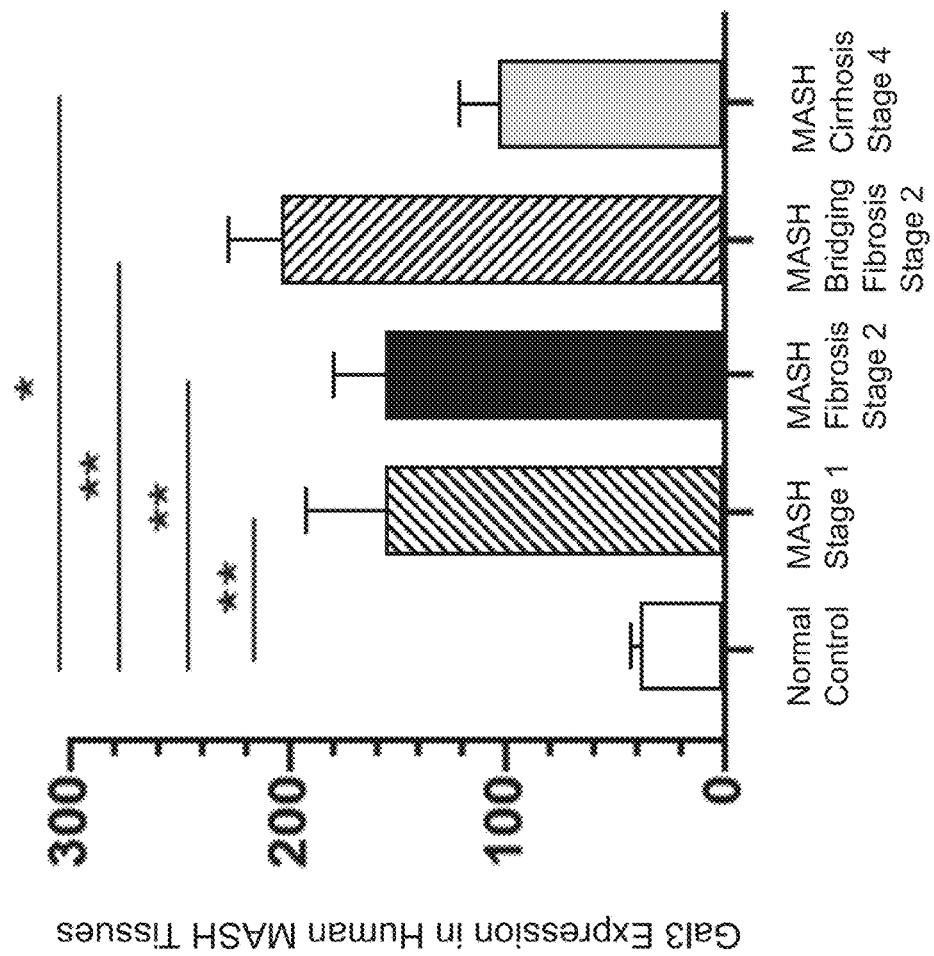
FIG. 9 is a chart with exemplary experimental data showing levels of Gal3 expression in human MASH and MASH fibrosis tissues.

Referring now to FIG. 9, upregulation of Gal3 in human MASH tissues and in an animal model of human MASH was assessed. FIG. 9 is a chart with exemplary experimental data 900 showing levels of Gal3 expression in human metabolic dysfunction-associated steatohepatitis (MASH) and MASH fibrosis tissues. Expression of Gal3 was investigated immunohistochemically on human MASH and MASH mediated fibrosis tissue microarray (TMA.FIB, Xenotech). Gal3 expression was approximately 4 times higher in MASH Stage 1 and remained high in MASH fibrosis, Stage 2, and MASH Bridging fibrosis, Stage 3. High expression of Gal3 in an early stage of MASH indicates that the preclinical efficacy of a Gal3-targeting drug, such as without limitation GM201, in an animal model of MASH may be translatable to humans.

Referring now to FIGS. 10A-G, GM201's ability to treat MASH fibrosis in a streptozotocin followed by high fat diet (STZ-HFD) model was evaluated. The use of a 'dual hit' streptozotocin (STZ)+high fat diet (HFD) mouse model became a common practice to expedite the hepatic injury and onset of fibrosis. The efficacy study was performed using 16 animals (8/sex) per group as follows: the GM201-treated mice with a dosage of treatment at 5 mg/kg body weight were used as the experimental group and the PBS vehicle-treated mice were used as the control group. As a baseline control, 8 STZ-HFD animals (4/sex) were sacrificed before the drug dosing. Animals with hyperglycemia (200-750 mg glucose/dL) were randomly enrolled into each group above and started on HFD at 4 weeks of age. Animals remained on the HFD for 5 weeks when treatments were initiated. HFD was continued throughout the experiment. An additional 8 animals (4/sex), which did not receive STZ, remained on standard rodent chow and were enrolled as age-matched naive controls. After 5 weeks of HFD, either drug or vehicle was administered intraperitoneally twice weekly for 6 weeks. All animals were weighed at least twice a week. Random blood glucose (RBG) levels were measured once every 2 weeks and at termination, using the Alpha-TRAK 2 handheld blood glucose monitoring system (Abbott).

With continued reference to FIGS. 10A-G, all data were analyzed and plotted on Graphpad Prism 8 and the p-value was determined using an unpaired two-tailed t-test, where a symbol with one (*), two (), three (*), and four (****) asterisks each represents p<0.05, p<0.01, p<0.001, and p<0.0001, respectively. The symbol ns stands for not significant. Data from the vehicle and the GM201-treated and the naive animals are shown from the males and the females combined in each cohort.

With continued reference to FIGS. 10A-G, body and liver weight were measured. Animals from all cohorts gained weight throughout the study. The mean terminal liver weights of the control group treated with a PBS vehicle were similar to the mean terminal liver weights of those treated with GM201 at a dosage of 5 mg/kg body weight and the difference was therefore not statistically significant. The liver-to-body weight ratio of the control animals measured at termination was similar and not statistically different from those of the GM201-treated groups.

Figure 10A:
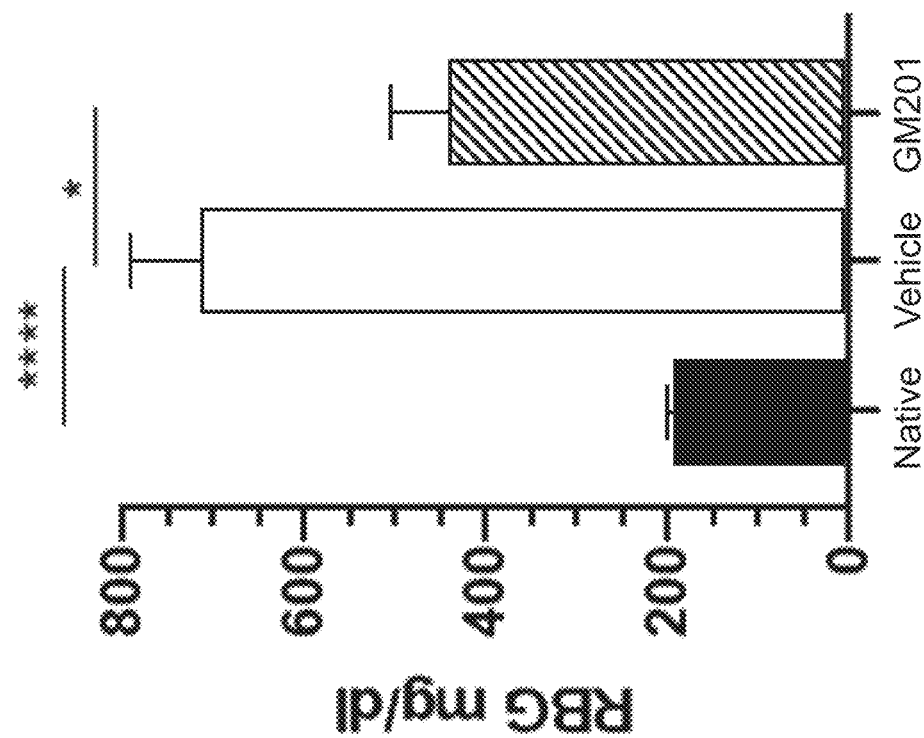
FIG. 10A is a chart with exemplary experimental data showing levels of terminal random blood glucose (RBG) in a streptozotocin followed by high fat diet (STZ-HFD) model.

With continued reference to FIGS. 10A-G, RBG levels were measured. For the purposes of this disclosure, a random blood glucose level or RBG level the blood glucose level measured at any given time, regardless of when the subject last ate. RBG level is used to assess glucose control in individuals, particularly in diagnosing diabetes or monitoring diabetic patients. RBG levels can fluctuate throughout the day depending on food intake, exercise, and insulin sensitivity. For non-diabetic individuals, RBG levels are typically between 70 and 140 mg/dL. Values above 200 mg/dL may indicate diabetes, prompting further testing for confirmation. Similarly, normal RBG levels for healthy mice are typically between 120 and 200 mg/dL. However, these levels may vary depending on factors including without limitation strain, diet, and/or the specific conditions of a study. RBG levels exceeding 250 mg/dl are generally considered hyperglycemic and may indicate the presence of diabetes or impaired glucose regulation in the mouse model. As expected, age-matched naive animals showed lower mean RBG levels throughout the study as compared to the other groups. For the purposes of this disclosure, a naive mouse model is a mouse that has not been exposed to any treatments, manipulations, or experimental interventions including without limitation drugs, pathogens, or vaccinations, among others. A naive mouse model is used as a control in experiments to establish a baseline or reference for normal biological responses. Naive mice have an intact, unaltered immune system and physiology, making them ideal for comparing the effects of experimental variables in biomedical research, including without limitation immunology, oncology, and pharmacology studies, among others. FIG. 10A is a chart with exemplary experimental data 1000a showing levels of terminal RBG in a STZ-HFD model. The mean terminal RBG of the control group administered with a PBS vehicle was almost four times higher than that of the naive animals. The terminal RBG level for the treatment group was significantly (p<0.05) lower compared to the control group.

With continued reference to FIGS. 10A-G, histological analyses and pathological scoring were performed. This step is performed by a board-certified veterinary pathologist. Specifically, blinded analyses such as without limitation hematoxylin and eosin (H&E) and picrosirius red staining for collagen deposition (primary endpoint) were performed on liver samples, and scoring was performed accordingly.

Figure 10B:
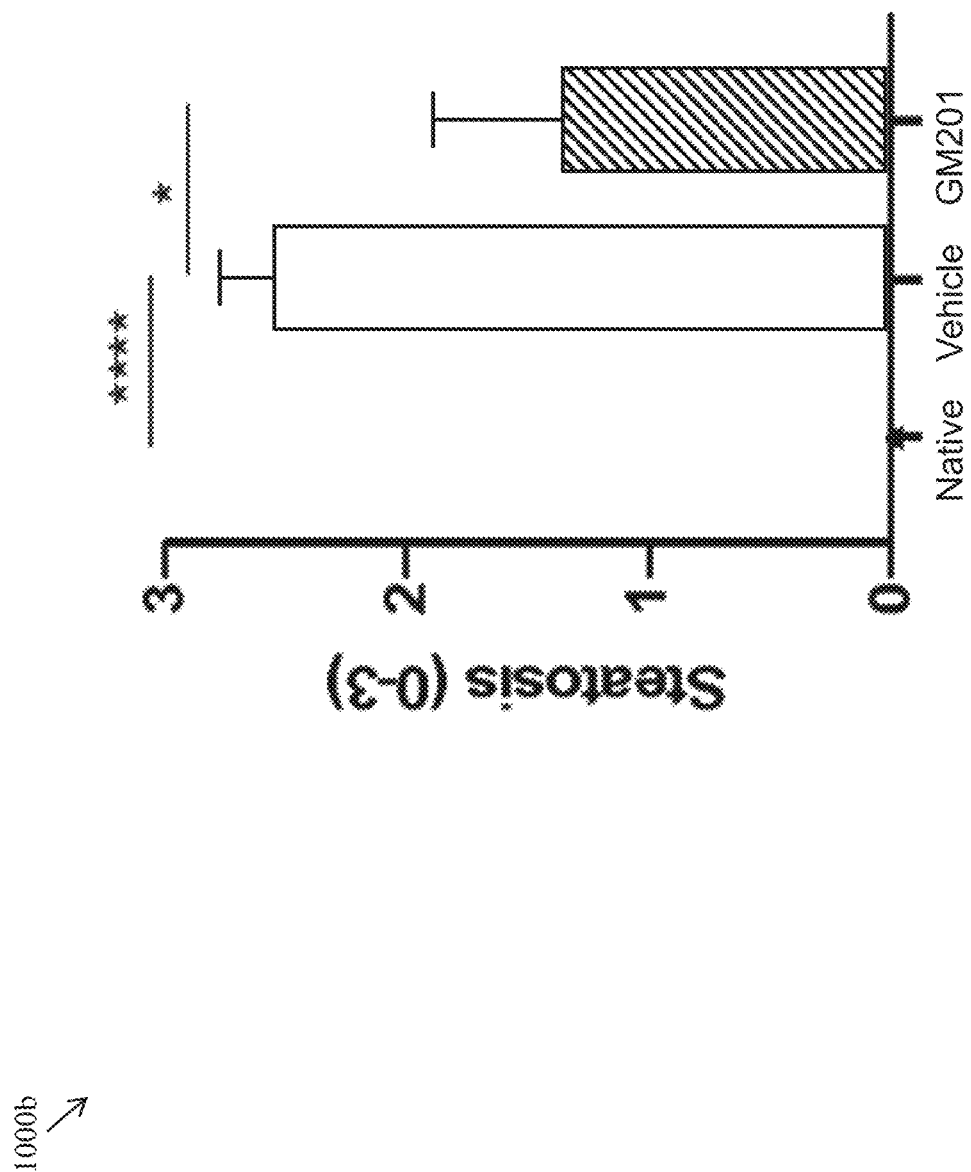
FIG. 10B is a chart with exemplary experimental data showing levels of steatosis in a STZ-HFD model.
Figure 10C:
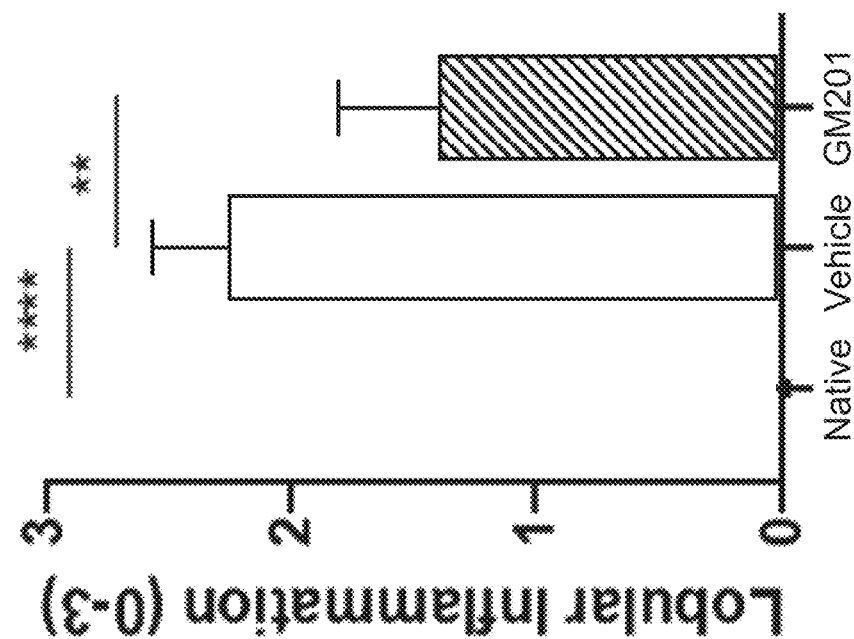
FIG. 10C is a chart with exemplary experimental data showing levels of lobular inflammation in a STZ-HFD model.
Figure 10D:
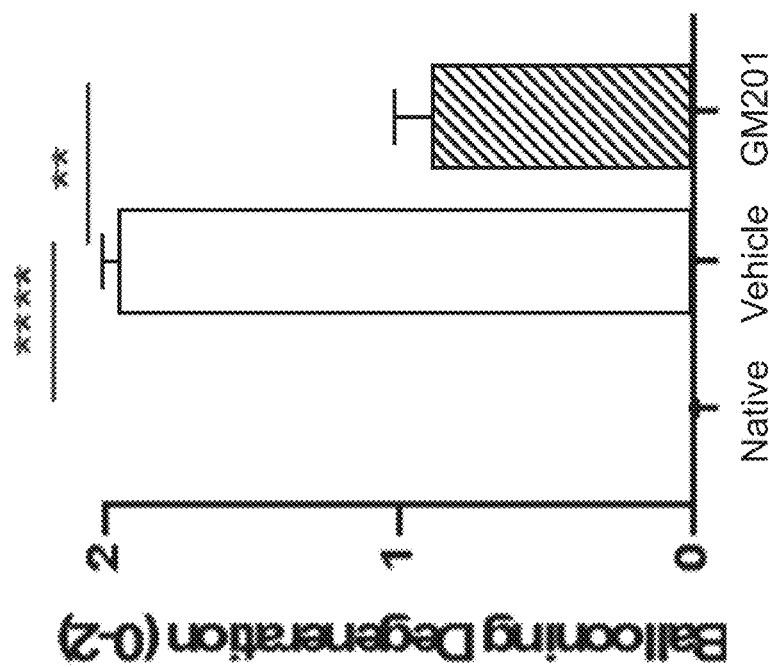
FIG. 10D is a chart with exemplary experimental data showing levels of ballooning degeneration in a STZ-HFD model.
Figure 10E:
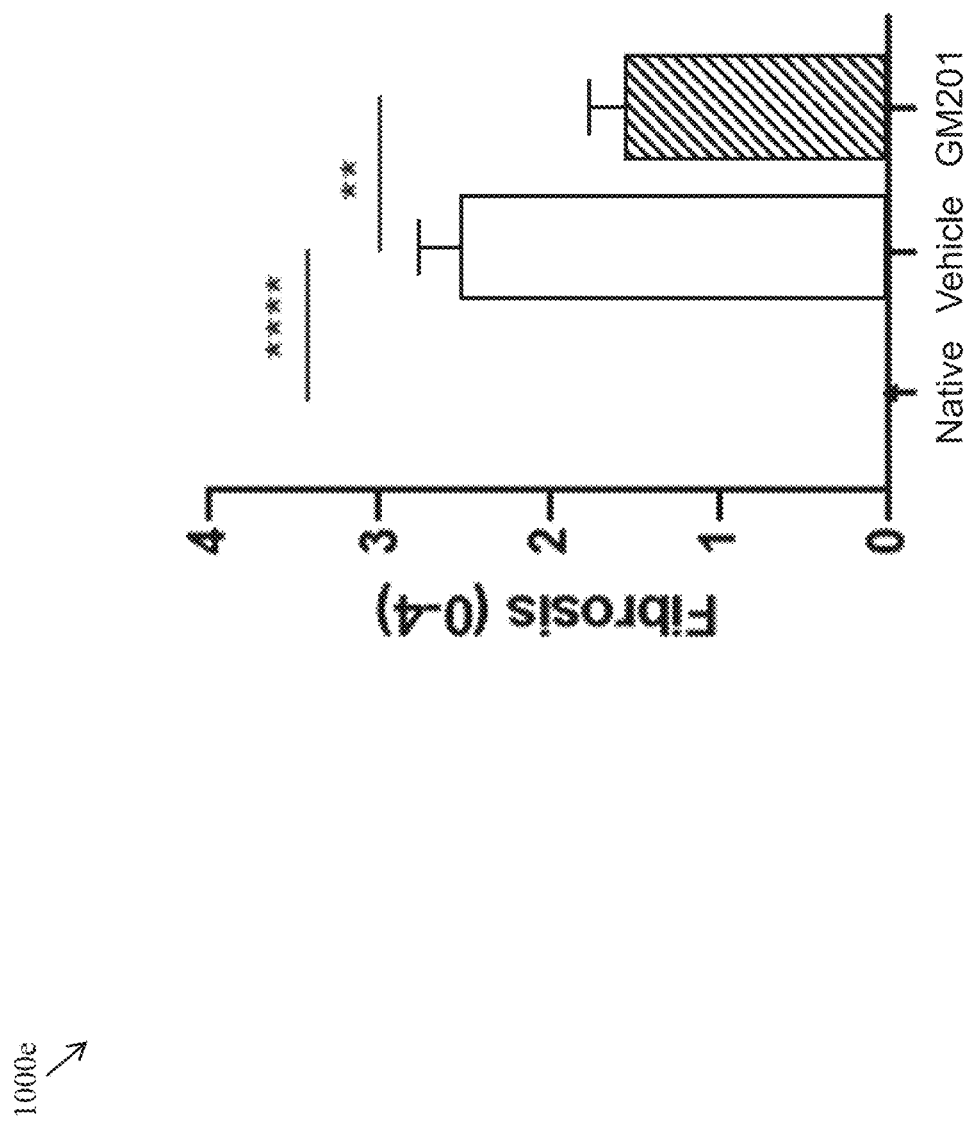
FIG. 10E is a chart with exemplary experimental data showing levels of fibrosis in a STZ-HFD model.

FIG. 10B is a chart with exemplary experimental data 1000b showing levels of steatosis in a STZ-HFD model. Steatosis was seen in all STZ-HFD groups, but not in naive animals. For the purposes of this disclosure, steatosis, also known as fatty liver, is a medical condition associated with an abnormal accumulation of fat in the liver cells. Steatosis occurs when fat makes up more than 5-10% of the liver's weight. It can be caused by various factors, including without limitation excessive alcohol consumption, obesity, insulin resistance, and certain medications, among others. Steatosis is often seen in conditions such as non-alcoholic fatty liver disease (NAFLD) and alcoholic liver disease. If left untreated, it may progress to more severe liver diseases, including without limitation NASH, fibrosis, or cirrhosis. The mean steatosis score of the treatment group was significantly (p<0.05) lower than those of the vehicle control group.

With continued reference to FIGS. 10A-G, FIG. 10C is a chart with exemplary experimental data 1000c showing levels of lobular inflammation in a STZ-HFD model. Lobular inflammation was seen in all groups, thus indicating a case of inflammatory cell infiltration. The experimental group treated with GM201 showed a significantly (p<0.05) lower lobular inflammation score compared to the control group treated with a PBS vehicle. For the purposes of this disclosure, lobular inflammation is a presence of inflammatory cells within the liver lobules, the functional units of the liver. This condition is typically seen in liver diseases such as MASH, alcoholic liver disease, or viral hepatitis. Such inflammation results from immune cell infiltration into the liver tissue and may lead to liver cell damage. Persistent lobular inflammation is associated with liver disease progression, which may result in fibrosis, cirrhosis, or liver failure if left untreated.

With continued reference to FIGS. 10A-G, FIG. 10D is a chart with exemplary experimental data 1000d showing levels of ballooning degeneration in a STZ-HFD model. Characteristic micro- and macro-vesicular fat deposits and ballooning degeneration were significantly (p<0.01) decreased in the experimental group compared to the control group (see FIG. 10D).

With continued reference to FIGS. 10A-G, FIG. 10E is a chart with exemplary experimental data 1000e showing levels of fibrosis in a STZ-HFD model. Fibrosis was observed across all groups, but not in naive animals. The mean fibrosis score for the experimental group was significantly (p<0.01) lower than those of the control group (see FIG. 10E).

Figure 10F:
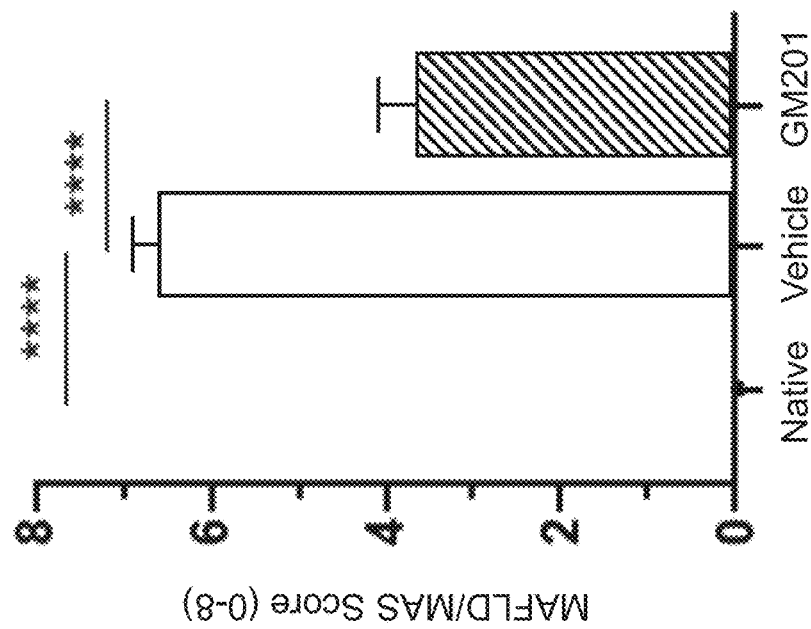
FIG. 10F is a chart with exemplary experimental data showing a metabolic dysfunction-associated fatty liver disease (MAFLD) activity score in a STZ-HFD model.

With continued reference to FIGS. 10A-G, a metabolic dysfunction-associated fatty liver disease (MAFLD) activity score (MAS) score was calculated. The MAFLD activity score, also known as the MAS score, includes three parameters—steatosis (0-3), lobular inflammation (0-3), and ballooning degeneration (0-2). FIG. 10F is a chart with exemplary experimental data 1000f showing a MAFLD activity score (MAS) in a STZ-HFD model. The MAFLD activity score for the experimental group was found to be significantly (p<0.0001) lower compared to the control group.

Figure 10G:
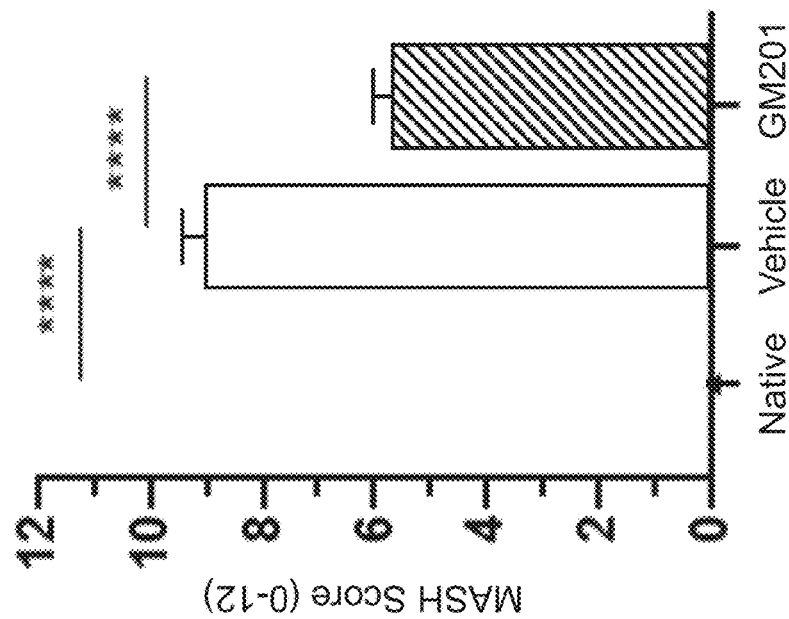
FIG. 10G is a chart with exemplary experimental data showing a MASH score in a STZ-HFD model.

With continued reference to FIGS. 10A-G, a NASH score was calculated. The MASH score includes a fibrosis score (0-4) and a MAS score. FIG. 10G is a chart with exemplary experimental data 1000g showing a MASH score in a STZ-HFD model. The MASH score for the experimental group was significantly (p<0.0001) lower compared to the control group.

Figure 11:
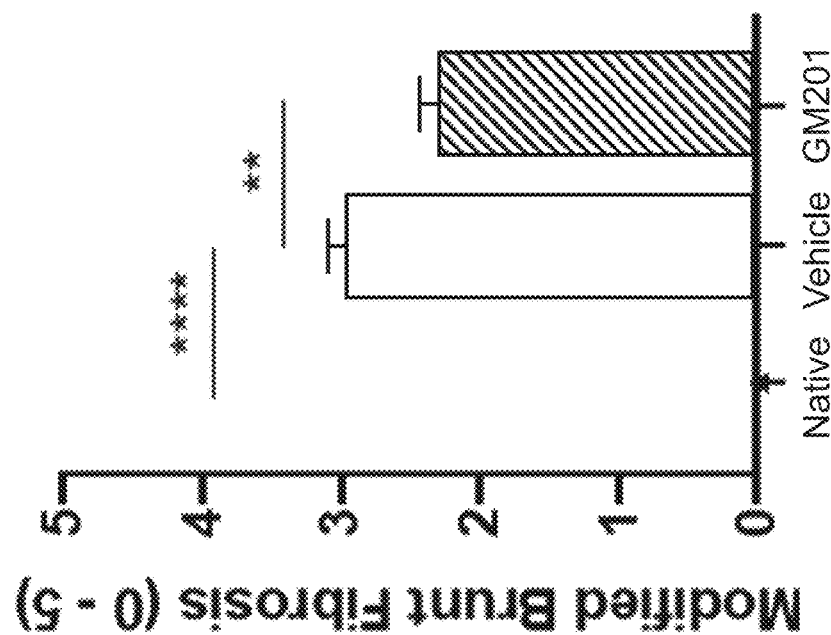
FIG. 11 is a chart with exemplary experimental data showing fibrosis score in a carbon tetrachloride ($CCl_4$) model.
Figure 12A:
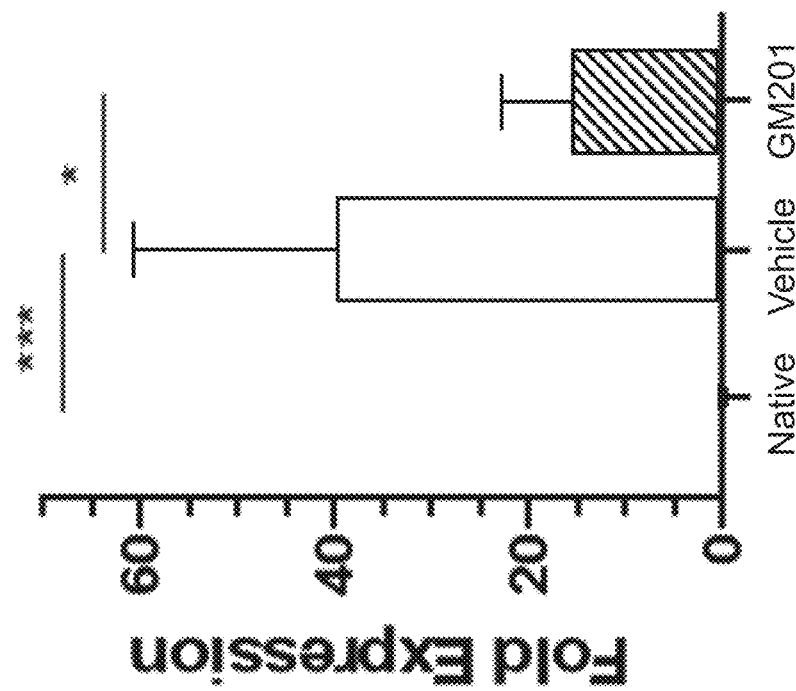
FIGS. 12A-D are charts with exemplary experimental data showing levels of gene expression in liver tissues from STZ-HFD animals.
Figure 12B:
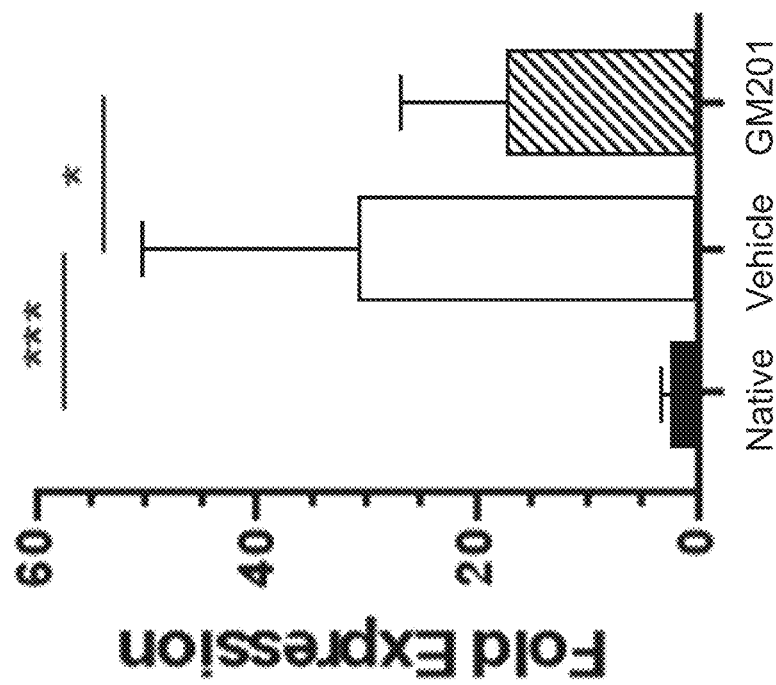
Figure 12C:
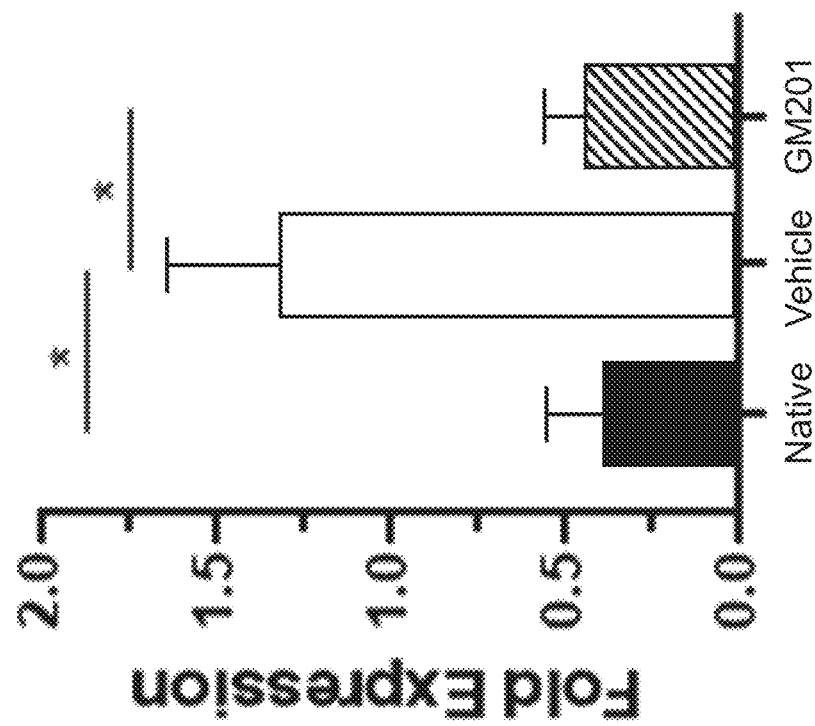
Figure 12D:
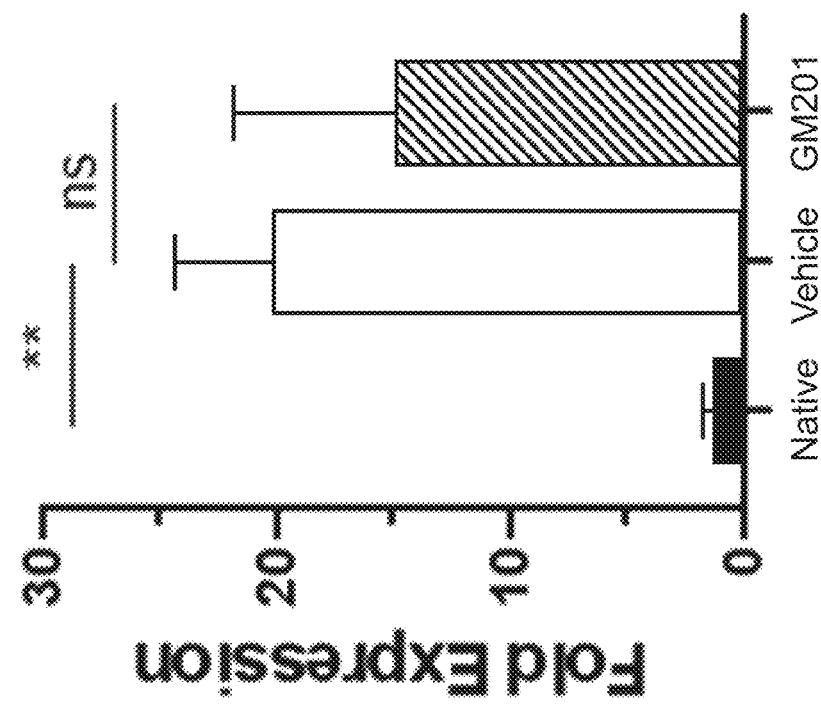

Referring now to FIG. 11, GM201's ability to treat liver fibrosis was evaluated. FIG. 11 is a chart with exemplary experimental data 1100 showing fibrosis scores in a carbon tetrachloride ($CCl_4$) model. For the purposes of this disclosure, a carbon tetrachloride model or a $CCl_4$ model is an animal model used to induce liver injury, particularly to study liver fibrosis and cirrhosis. Specifically, carbon tetrachloride ($CCl_4$) is administered to an animal, typically rodent such as without limitation a mouse, to cause oxidative stress and liver cell damage. Such oxidative stress and liver cell damage may further lead to inflammation, steatosis, and fibrosis. The $CCl_4$ model mimics the progression of human liver diseases and is commonly used to test the efficacy of antifibrotic or hepatoprotective drugs. In this study, histopathological analysis permitted the evaluation of portal fibrosis, a commonly observed fibrosis in a $CCl_4$ model, and pericellular fibrosis, which may represent a more severe and acute disease state. All animals gained weight during the study period. However, the liver-to-body weight ratio calculated at the termination of the study period was very similar across all groups. Blinded analyses were performed using picrosirius red-stained slides from the liver, and scoring was performed accordingly. The fibrosis score was significantly ($p<0.01$) lower in the GM201-treated experimental group compared to the PBS vehicle-treated control group.

Referring now to FIGS. 12A-D, changes in profibrotic factors after GM201 therapy were evaluated. FIGS. 12A-D are charts with exemplary experimental data 1200a-d showing levels of gene expression in liver tissues from STZ-HFD animals. Gene expression from liver tissues of MASH study was determined by quantitative reverse transcription polymerase chain reaction (qRT-PCR). Expression levels for Gal3 (see FIG. 12A), alpha-smooth muscle actin ($\alpha$-SMA, see FIG. 12B), TGFβ (see FIG. 12C), and issue inhibitor of metalloproteinase-1 (TIMP-1, see FIG. 12D) from the control group were found to be 6-36-fold upregulated compared to the naive animals. In contrast, the expression levels of Gal3, $\alpha$-SMA, TGFβ, and TIMP-1 from the GM201-treated experimental group were found to be significantly lower compared to the PBS vehicle-treated control group. For the purposes of this disclosure, alpha-smooth muscle actin or $\alpha$-SMA is a specific isoform of actin, a protein that plays a critical role in cellular structure and function. $\alpha$-SMA is commonly used as a marker to identify smooth muscle cells and myofibroblasts, which are cells involved in tissue repair, fibrosis, and wound healing. Myofibroblasts, in particular, express $\alpha$-SMA as they differentiate from fibroblasts during tissue injury and inflammation. The presence of $\alpha$-SMA may be associated with processes like scar formation, organ fibrosis (such as without limitation in the liver, lungs, or kidneys), and vascular contractility. Pathologically, the overexpression of $\alpha$-SMA may lead to fibrosis, where excessive connective tissue builds up, leading to impaired organ function. For the purposes of this disclosure, tissue inhibitor of metalloproteinases-1 or TIMP-1 is a protein biomarker that regulates the activity of matrix metalloproteinases (MMPs). Matrix metalloproteinases (MMPs) are enzymes responsible for degrading extracellular matrix components. TIMP-1 plays a crucial role in tissue remodeling, wound healing, and inflammation. In liver disease, elevated levels of TIMP-1 may be associated with liver fibrosis, as it inhibits MMPs that normally break down fibrotic tissue. Increased TIMP-1 levels may serve as an indicator of fibrotic progression in conditions such as without limitation MASH and cirrhosis.

Figure 13A:
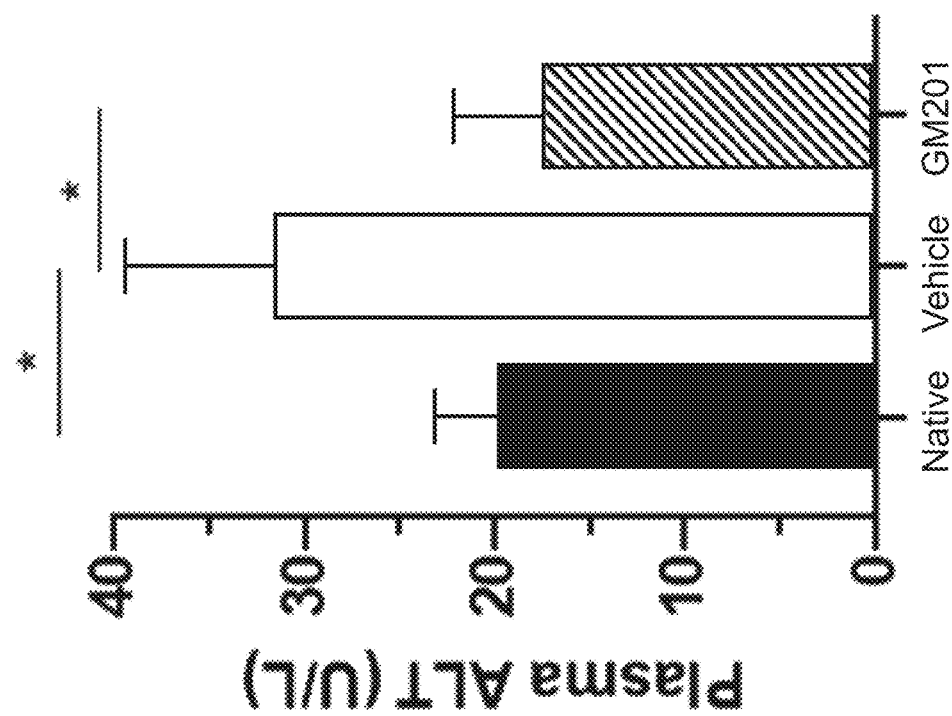
FIG. 13A is a chart with exemplary experimental data showing plasma alanine aminotransferase (ALT) levels in a $CCl_4$ model.
Figure 13B:
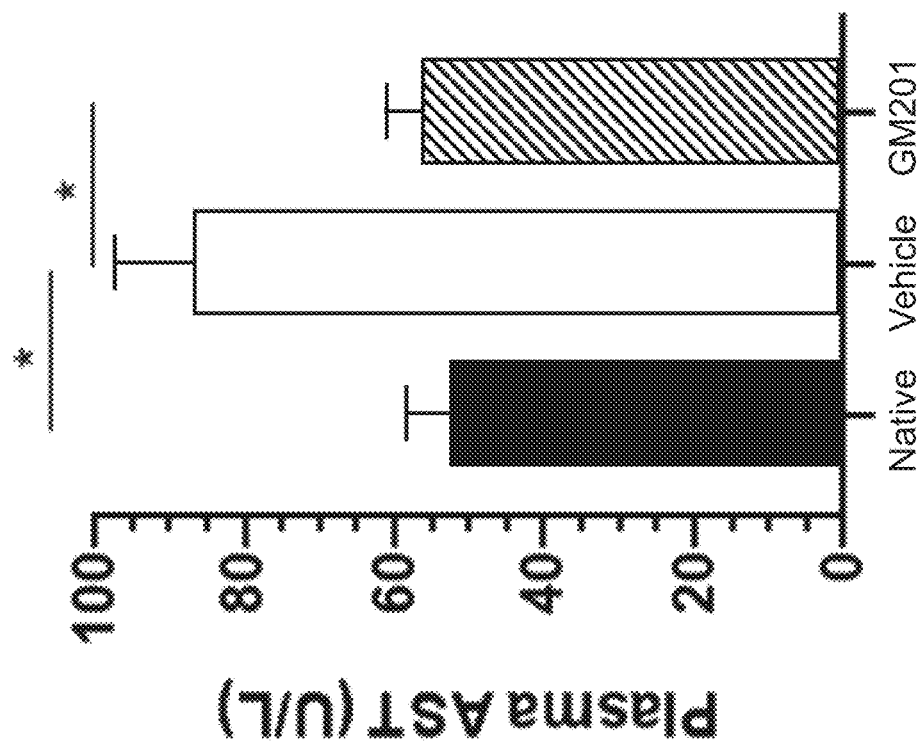
FIG. 13B is a chart with exemplary experimental data showing plasma aspartate aminotransferase (AST) levels in a $CCl_4$ model.
Figure 13C:
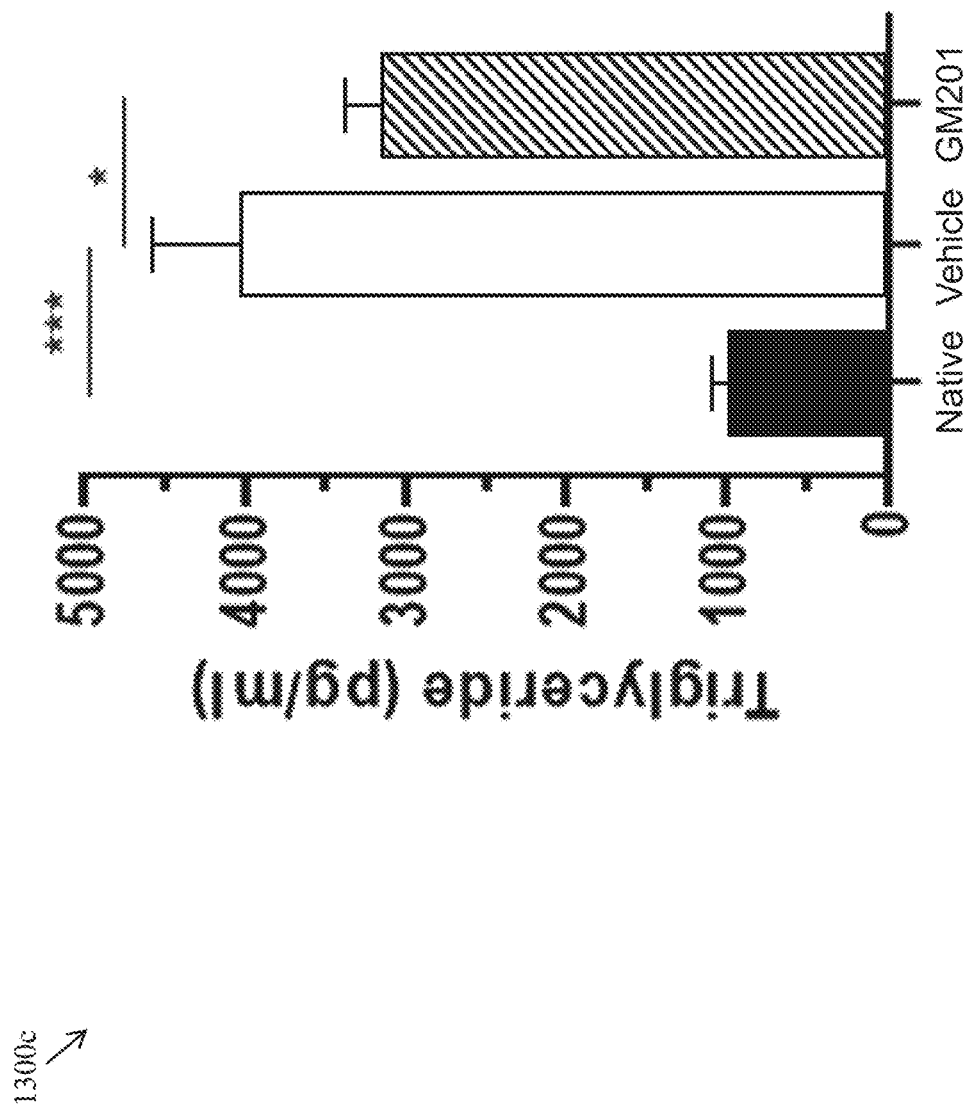
FIG. 13C is a chart with exemplary experimental data showing plasma triglyceride (Tg) levels in a STZ-HFD model.

Referring now to FIGS. 13A-C, changes in liver markers in response to GM201 therapy were evaluated. FIG. 13A is a chart with exemplary experimental data 1300a showing plasma alanine aminotransferase (ALT) levels in a $CCl_4$ model. For the purposes of this disclosure, alanine aminotransferase (ALT) is an enzyme primarily found in the liver. The levels of ALT in the blood may be a strong indicator of liver health. When liver cells are damaged or inflamed, ALT is released into the bloodstream, leading to elevated levels, which typically suggest liver injury or disease. Conditions including without limitation viral hepatitis, NAFLD, cirrhosis, alcohol abuse, and/or drug toxicity may cause elevated ALT. Since ALT is more specific to the liver than aspartate aminotransferase (AST), its elevation is a clearer marker of liver damage. However, ALT levels alone cannot determine the cause of liver injury, so they are often evaluated alongside other liver function tests to provide a more comprehensive understanding of liver health, as described in further detail below.

With continued reference to FIGS. 13A-C, FIG. 13B is a chart with exemplary experimental data 1300b showing plasma AST levels in a $CCl_4$ model. For the purposes of this disclosure, aspartate aminotransferase (AST) is an enzyme found in various tissues, including without limitation the liver, heart, muscles, and kidneys, and is commonly measured to assess liver health. Elevated AST levels may indicate liver damage, such as from acute liver injury, chronic conditions like cirrhosis, or liver toxicity due to medications or alcohol, though AST elevation may also result from heart or muscle injury. Since AST is not specific to the liver, it is typically interpreted alongside ALT, which is a more liver-specific biomarker, as described above. The AST/ALT ratio may provide additional insight, with a higher AST/ALT ratio potentially suggesting a case of alcohol-related liver disease or the like and a lower AST/ALT ratio potentially indicating conditions such as without limitation viral hepatitis or fatty liver disease. AST levels alone may not be sufficient to diagnose liver damage, but when used with other tests, they may offer valuable information about liver function.

With continued reference to FIGS. 13A-C, liver function markers such as without limitation ALT and AST were measured using serum samples. The average ALT and AST levels in the PBS vehicle-treated control group were 1.5- to 2.0-fold higher than the naive animals in both $CCl_4$ (see FIGS. 13A-B) and STZ-HFD (not shown) models. In contrast, the average ALT and AST levels in the GM201-treated experimental group were significantly ($p<0.05$) lower compared to the control group.

With continued reference to FIGS. 13A-C, FIG. 13C is a chart with exemplary experimental data 1300c showing plasma triglyceride (Tg) levels in a STZ-HFD model. Tg levels may provide useful information regarding liver function. Elevated Tg levels in the blood may be associated with liver conditions, particularly NAFLD, as described above. In addition, liver dysfunction may impair the body's ability to regulate lipid metabolism, which may also contribute to elevated triglyceride levels. However, triglyceride levels alone may not be specific indicators of liver health, so they are often considered alongside other markers such as without limitation ALT, AST, imaging studies, and/or the like, for a more complete picture of liver function. The mean Tg level in the PBS vehicle-treated control group of the STZ-HFD model was found to be approximately 4-fold higher than naive animals (see FIG. 13C). In contrast, the mean Tg level for the GM201-treated experimental group was observed to be significantly ($p<0.05$) lower compared to vehicle controls.

Figure 14A:
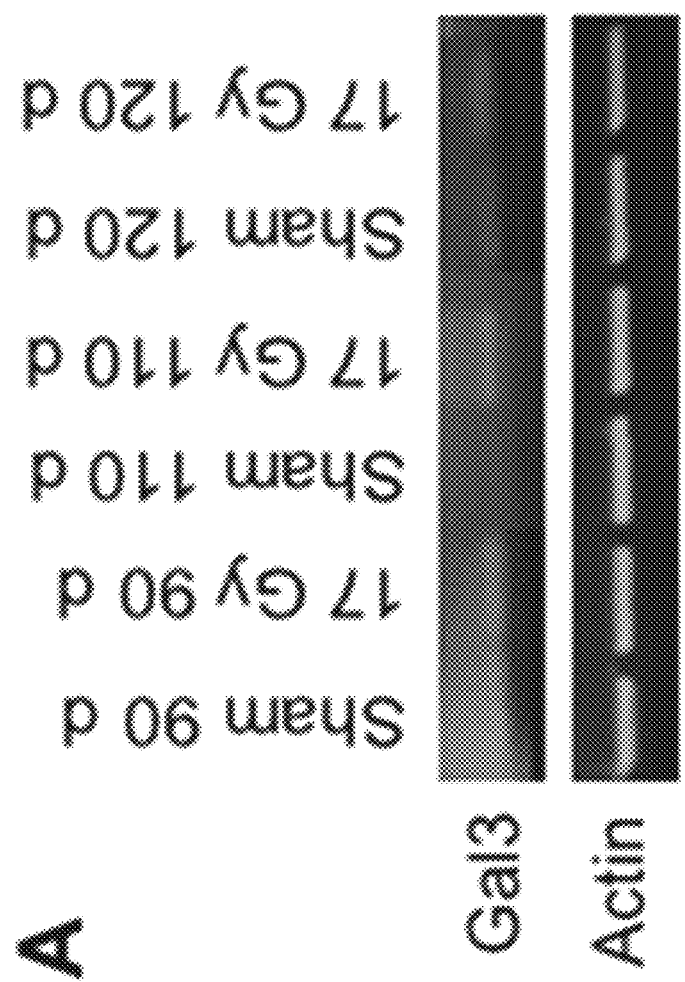
FIG. 14A includes exemplary experimental data collected using RT-PCT and depicting Gal3 levels of both sham and irradiated lung tissues at 90, 110, and 120 days post thoracic irradiation at 17 Gy.
Figures 14B, 14C:
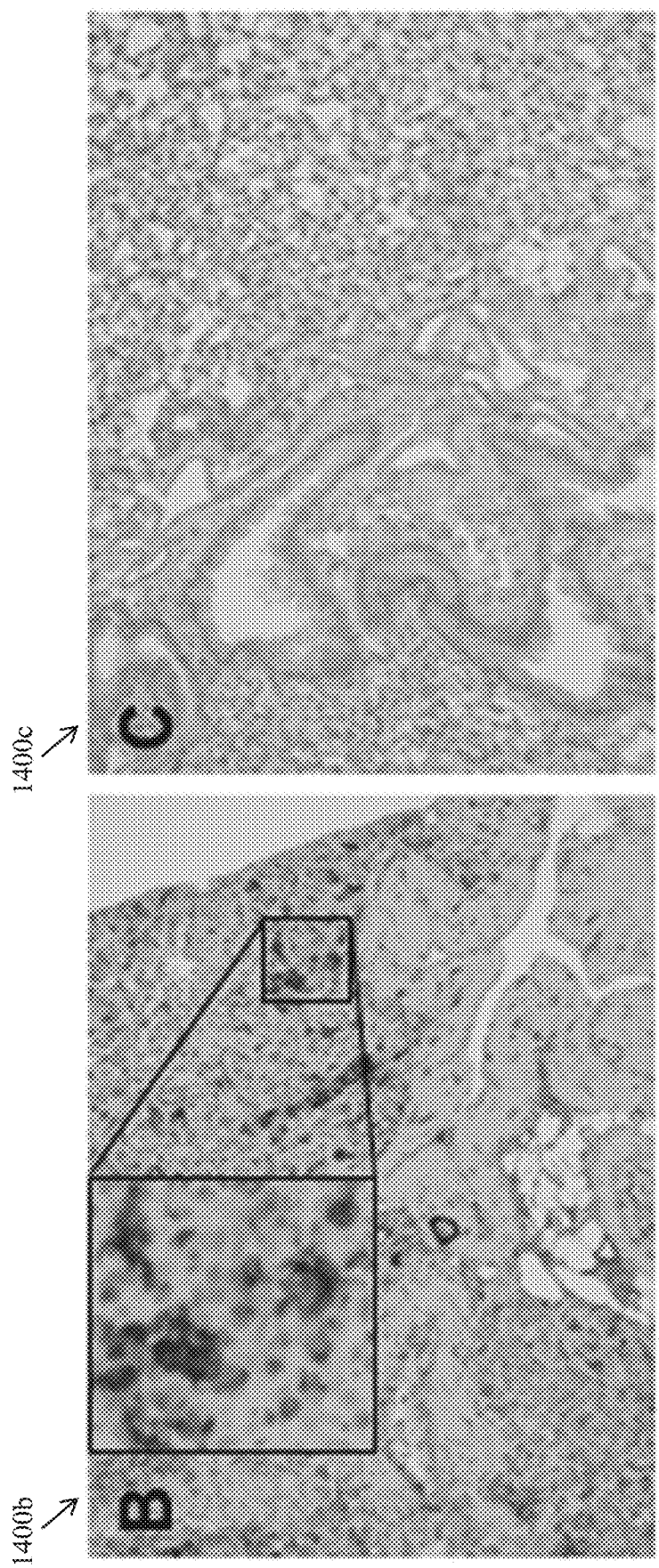
FIG. 14B includes, at a 100-fold magnification, exemplary immunostaining results of Gal3 in lung tissue from mice 110 days post-irradiation at 17 Gy.
FIG. 14C includes, at a 100-fold magnification, exemplary immunostaining images of Gal3 in lung tissue from non-irradiated mice.
Figure 15A:
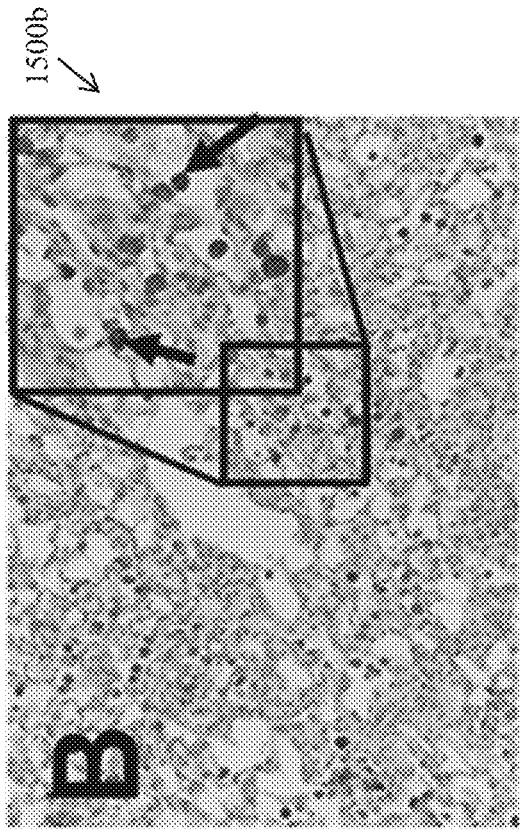
FIGS. 15A-D show, at a 100-fold magnification, immunostaining images including expression of Gal3 (indicated by arrows) in lungs of bleomycin-treated mice at (A) 10 days, (B) 16 days, (C) 34 days, and (D) 37 days post an administration of 25 mU bleomycin.
Figure 15B:
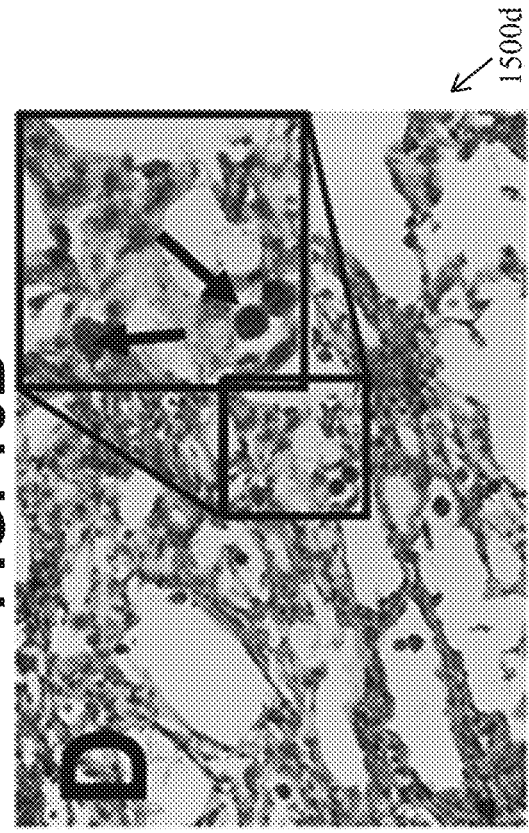
Figure 15C:
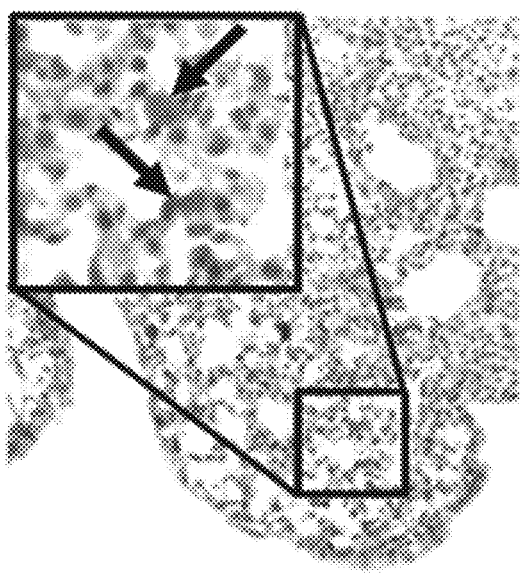
Figure 15D:
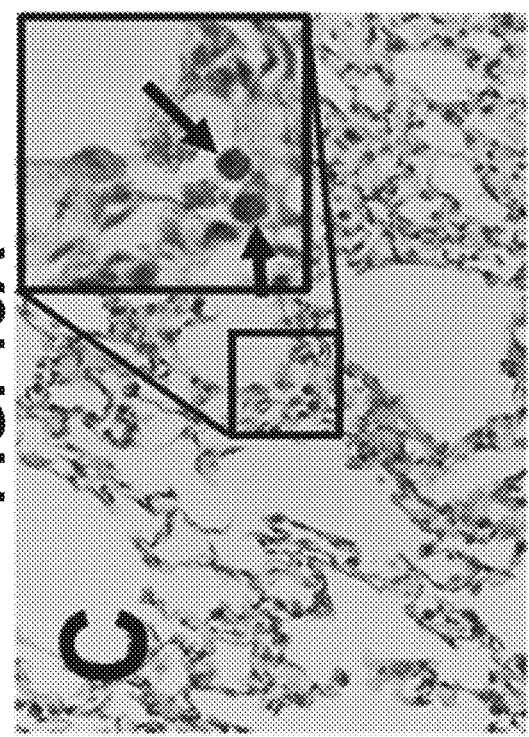
Figure 15E:
FIGS. 15E-H show, at a 100-fold magnification, immunostaining images of corresponding age-matched sham mice according to FIGS. 15A-D.
Figure 15F:
Figure 15G:
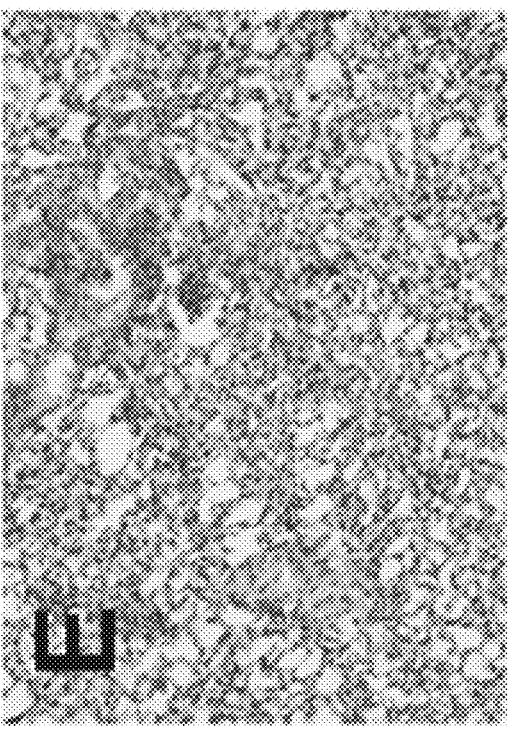
Figure 15H:
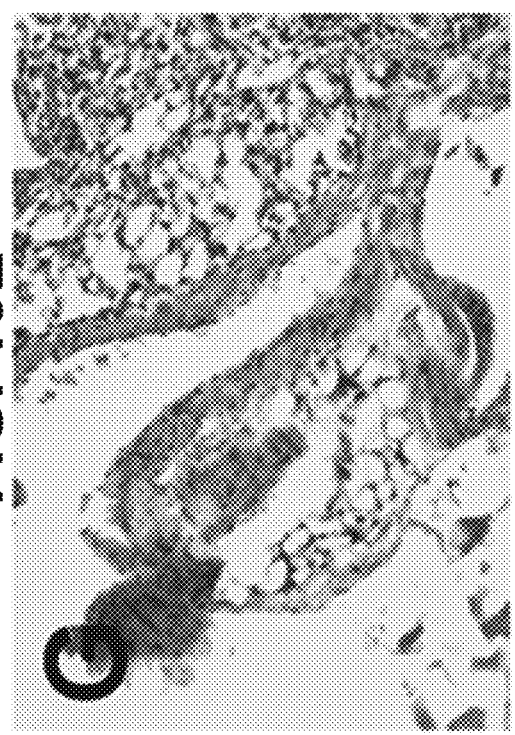

Referring now to FIGS. 14A-C, Gal3 may be targeted for therapy of idiopathic pulmonary fibrosis (IPF). For the purposes of this disclosure, idiopathic pulmonary fibrosis (IPF) is a chronic, progressive lung disease characterized by the scarring (fibrosis) of lung tissue for unknown reasons. Over time, this scarring may cause the lungs to become stiff, making it increasingly difficult to breathe and reducing the lungs' ability to efficiently transfer oxygen into the bloodstream. The exact cause of IPF is not yet well understood, but it is thought to involve abnormal healing responses to microscopic lung injuries. This may lead to the accumulation of fibrotic tissue, particularly in the lungs' interstitial spaces (the areas around the air sacs), which impairs lung function. Common symptoms include shortness of breath (especially during activity), persistent dry cough, fatigue, and sometimes chest discomfort. An increased expression of Gal3 was observed during the progression of IPF in murine models, particularly in alveolar macrophages and fibroblasts.

With continued reference to FIGS. 14A-C, GM201 selectively targets Gal3 with a picomolar affinity. This affinity is higher than the affinity between Gal3 and its natural ligands by a factor of 10-100. As a result, GM201 may readily outcompete Gal3's intrinsic ligands, such as without limitation TGFβ-RII, in binding Gal3. The interaction between Gal3 and TGFβ-RII was inhibited by GM201 (see FIGS. 8A-B above). Expression levels of Gal3 in radiation-induced pulmonary fibrosis were therefore measured to evaluate the impact of GM201 therapy.

With continued reference to FIGS. 14A-C, FIG. 14A includes exemplary experimental data 1400a collected using RT-PCT and depicting Gal3 levels of sham and irradiated lung tissues. Radiation is clinically relevant for the induction of pulmonary fibrosis and the C57BL/6 mouse radiation model is widely accepted as a suitable preclinical model of fibrosis. A higher expression level of Gal3 was observed at 90, 110, and 120 days post thoracic irradiation at 17 Gy. For the purposes of this disclosure, "sham" is a control procedure or group in animal studies that undergoes all the same steps as the experimental group, except for the key experimental intervention. A sham group may be designed to account for any effects that may arise from handling, anesthesia, surgical procedures, or other manipulations unrelated to the specific intervention being studied. As a nonlimiting example, in a study testing the effects of a surgical procedure, animals in the sham group might undergo anesthesia and have an incision made, but no further steps of the actual surgery (like organ manipulation or removal) would be performed. This may ensure that any observed effects in the experimental group can be attributed to the intervention itself, rather than to unrelated factors like the stress of surgery or anesthesia. thoracic irradiation. The expression level of actin was used as a reference. For the purposes of this disclosure, Gray or Gy is a unit used to measure the amount of radiation absorbed by a person or object, known as the absorbed dose. Gy is the SI unit for radiation dose and is expressed as the amount of energy absorbed per unit mass of tissue; in other words, one gray is equal to 1 joule per kilogram of body mass (J/kg).

With continued reference to FIGS. 14A-C, FIGS. 14B-C show, at a 100-fold magnification, exemplary immunostaining images 1400b-c of Gal3 in lung tissue from mice 110 days post-irradiation at 17 Gy (see FIG. 14B) and non-irradiated mice (see FIG. 14C). Expression of Gal3 was mostly found in the alveolar macrophages and fibroblasts.

Referring now to FIGS. 15A-H, expression levels of Gal3 in bleomycin-induced pulmonary fibrosis were assessed. In this model, after administration of bleomycin, an onset of an acute inflammatory response may occur and last up to 12-14 days, followed by IPF for up to 28-35 days. Mortality may begin within 35-40 days following the onset. FIGS. 15A-D show, at a 100-fold magnification, immunostaining images 1500a-d including expression of Gal3 (indicated by arrows) in lungs of bleomycin-treated mice at (A) 10 days, (B) 16 days, (C) 34 days, and (D) 37 days post an administration of 25 mU bleomycin. FIGS. 15E-H show, at a 100-fold magnification, immunostaining images 1500e-h of age-matched sham mice according to FIGS. 15A-D; Gal3 expression in bleomycin-induced IPF was high compared to age-matched normal mice and Gal3 staining was mostly in the cytoplasm of the alveolar macrophages (see FIGS. 15A-C).

With continued reference to FIGS. 15A-H, the bioavailability of intranasally (IN) administered GM201 was assessed. The bioavailability of IN administered GM201 in a target organ, e.g., lung, was found to be approximately 60% after 24 h, which was higher compared to other routes of administration. Analysis of Gal3 levels suggests that GM201 is capable of targeting Gal3. It is proposed that the pharmacologic inhibition of Gal3 with GM201 may suppress IPF by impeding pro-fibrotic/fibrotic factors, via extracellular matrix modification, and/or by arresting the loss of normal lung cells.

Figure 16:
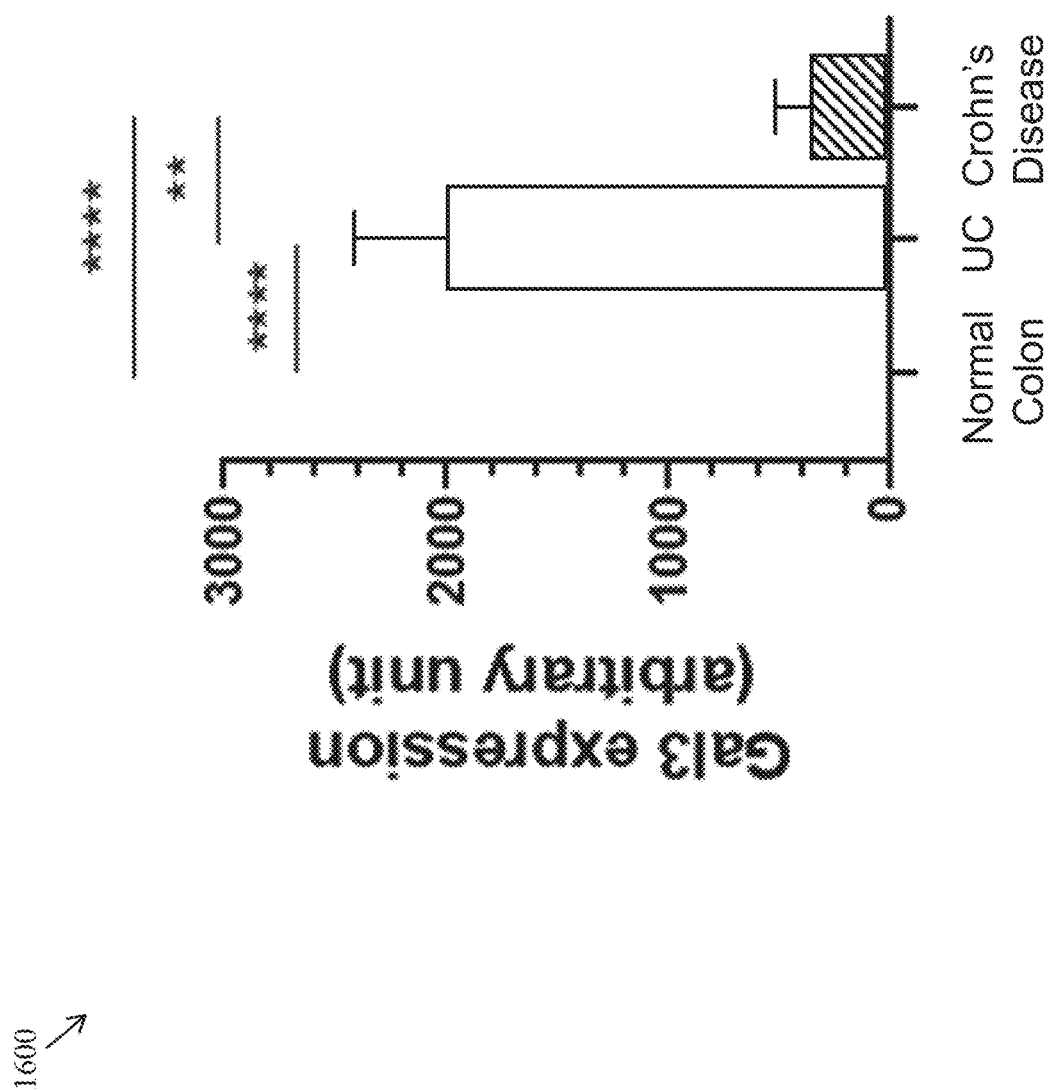
FIG. 16 is a chart with exemplary experimental data showing levels of Gal3 expression in human ulcerative colitis (UC) and Crohn's disease as observed by immunostaining.

Referring now to FIG. 16, Gal3 may be targeted for treating ulcerative colitis (UC). FIG. 16 is a chart with exemplary experimental data 1600 showing levels of Gal3 expression in human ulcerative colitis (UC) and Crohn's disease, as observed by immunostaining. For the purposes of this disclosure, ulcerative colitis (UC) is a chronic inflammatory bowel disease that causes inflammation and ulcers in the lining of the large intestine and rectum. Such inflammation typically starts in the rectum and may spread to other parts of the colon, leading to symptoms such as without limitation abdominal pain, cramping, diarrhea (often with blood or mucus), urgency to have a bowel movement, fatigue, and/or weight loss, among others. The exact cause of ulcerative colitis is not fully understood, but it is believed to result from an abnormal immune response, where the body's immune system mistakenly attacks the lining of the colon. For the purposes of this disclosure, Crohn's disease is a chronic inflammatory bowel disease that causes inflammation anywhere along the gastrointestinal tract. Such inflammation may extend through multiple layers of the gastrointestinal tract wall, leading to a range of symptoms including without limitation abdominal pain, diarrhea (sometimes with blood), weight loss, fatigue, and/or malnutrition, among others. The exact cause of Crohn's disease is not fully understood, but it is thought to involve an abnormal immune response, where the immune system attacks the body's own gastrointestinal tract. Genetic, environmental, and/or microbial factors are also believed to play a role in the development of UC and/or Crohn's disease. Both UC and Crohn's disease are characterized by periods of flare-ups, where symptoms are more severe, and periods of remission, where symptoms lessen or disappear. Unlike UC, which is limited to the colon and rectum, Crohn's disease may affect any part of the gastrointestinal tract, from the mouth to the anus. Crohn's disease most commonly affects the end of the small intestine and the beginning of the colon, and the inflammation is often patchy with healthy tissue located between areas of inflammation. Complications of Crohn's disease may include without limitation intestinal blockages, fistulas, abscesses, and/or malnutrition, among others. It is demonstrated that the expression of Gal3 is elevated in the colon of UC patients compared to healthy individuals. An upregulation of Gal3 was also observed in human UC tissue. Expression of Gal3 was investigated immunohistochemically on human UC and Chron's disease tissue microarray. Gal3 expression was significantly higher in UC tissues compared to a normal colon. Gal3 expression in the UC was also significantly higher (approximately 5.5-fold) compared to Crohn's disease tissues. The increased expression of Gal3 was also observed in an animal model of human UC. A high expression level of Gal3 in the UC tissue indicates that the pre-clinical efficacy of a Gal3-targeting drug (such as without limitation GM201) in an animal model of UC may be translatable to humans. It is proposed that Gal3 may be a master regulator of pro-inflammatory immunomodulation and specific inhibition of Gal3 with GM201 may ameliorate UC conditions.

Figure 17A:
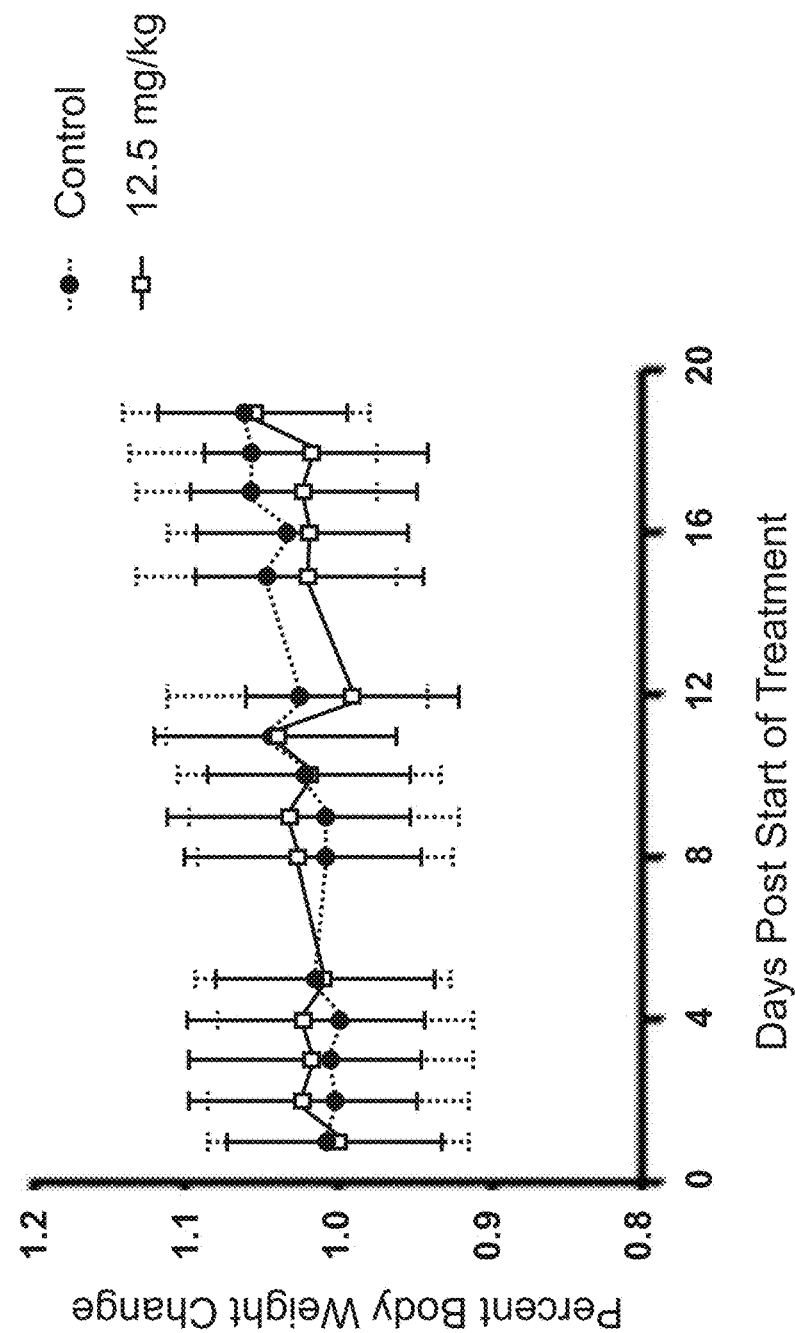
FIGS. 17A-B are charts with exemplary experimental data showing changes in body weight following intraperitoneal (IP) administration of GM201 at a dosage of (A) 12.5 mg/kg and (B) 25 mg/kg.
Figure 17B:
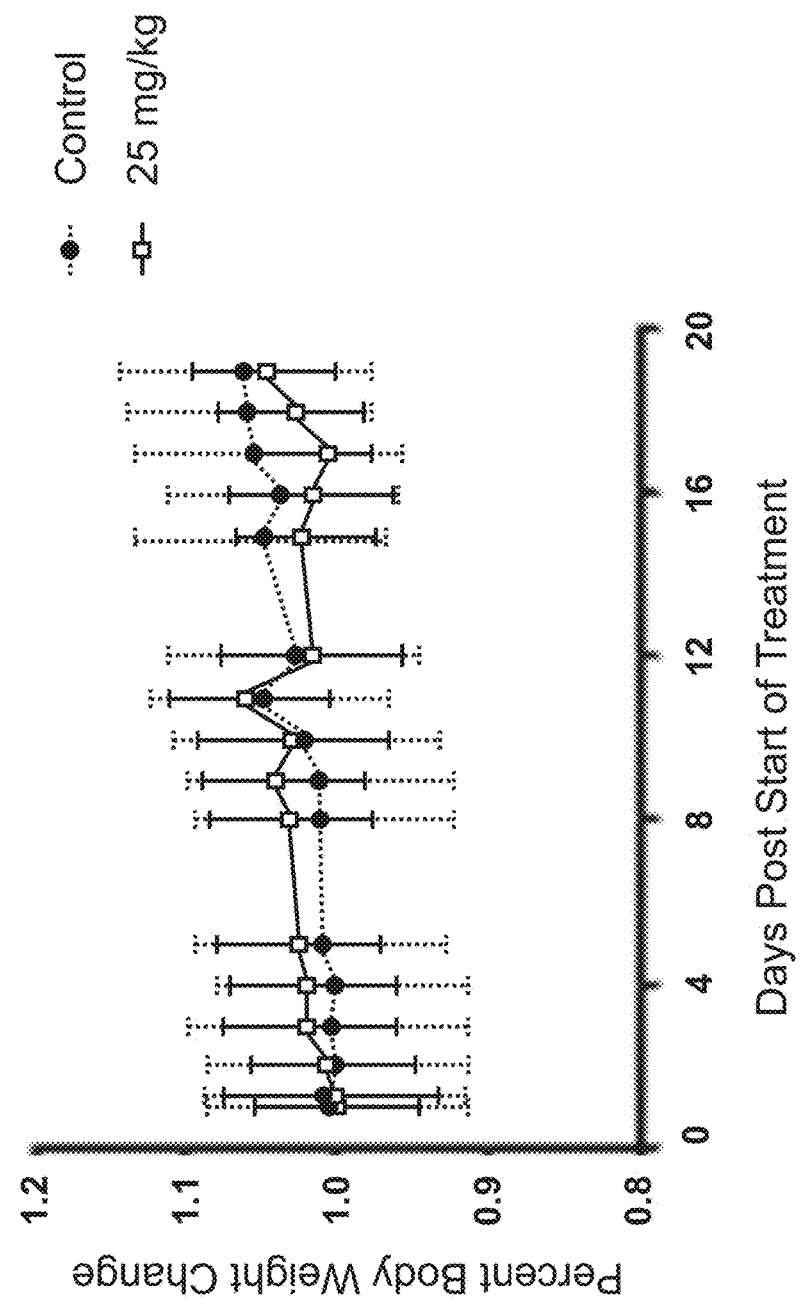

Referring now to FIGS. 17A-B, the maximum tolerated dose (MTD) of GM201 is evaluated by intraperitoneally administering GM201 twice per week to B6 mice. FIGS. 17A-B are charts with exemplary experimental data 1700*a-b* showing changes in body weight following intraperitoneal IP administration of GM201 at a dosage of (A) 12.5 mg/kg of body weight and (B) 25 mg/kg of body weight. Mice were monitored for adverse effects over two weeks after administration of GM201. Monitoring included without limitation weight measurement (e.g., thrice per week) and careful daily observation for signs of toxicity such as without limitation vocalizing or attacking (especially when handled or moved); cardiovascular and respiratory signs (for example and without limitation cyanosis, increased heart and respiratory rates, shallow breathing, pale mucous membranes, etc.); gastrointestinal signs (for example and without limitation vomiting, diarrhea, etc.); licking, biting, scratching, or shaking a painful area; abnormal behaviors (for example and without limitation lethargy, extreme aggression, seizures, paralysis, decreased socialization, agonal death, moribundity, restlessness, muscle contractions, etc.); abnormal posture (for example and without limitation hunched, lameness, recumbency, etc.); excessive salivation (for example and without limitation ptyalism, etc.). Mice were subjected to 2-fold dose-escalation up to 25 mg/kg body weight. No adverse outcomes were observed at either dosage. The change in body weight for all doses was within 0.2%. The MTD of the GM201 was therefore determined to be at least 25 mg/kg.

Figure 18A:
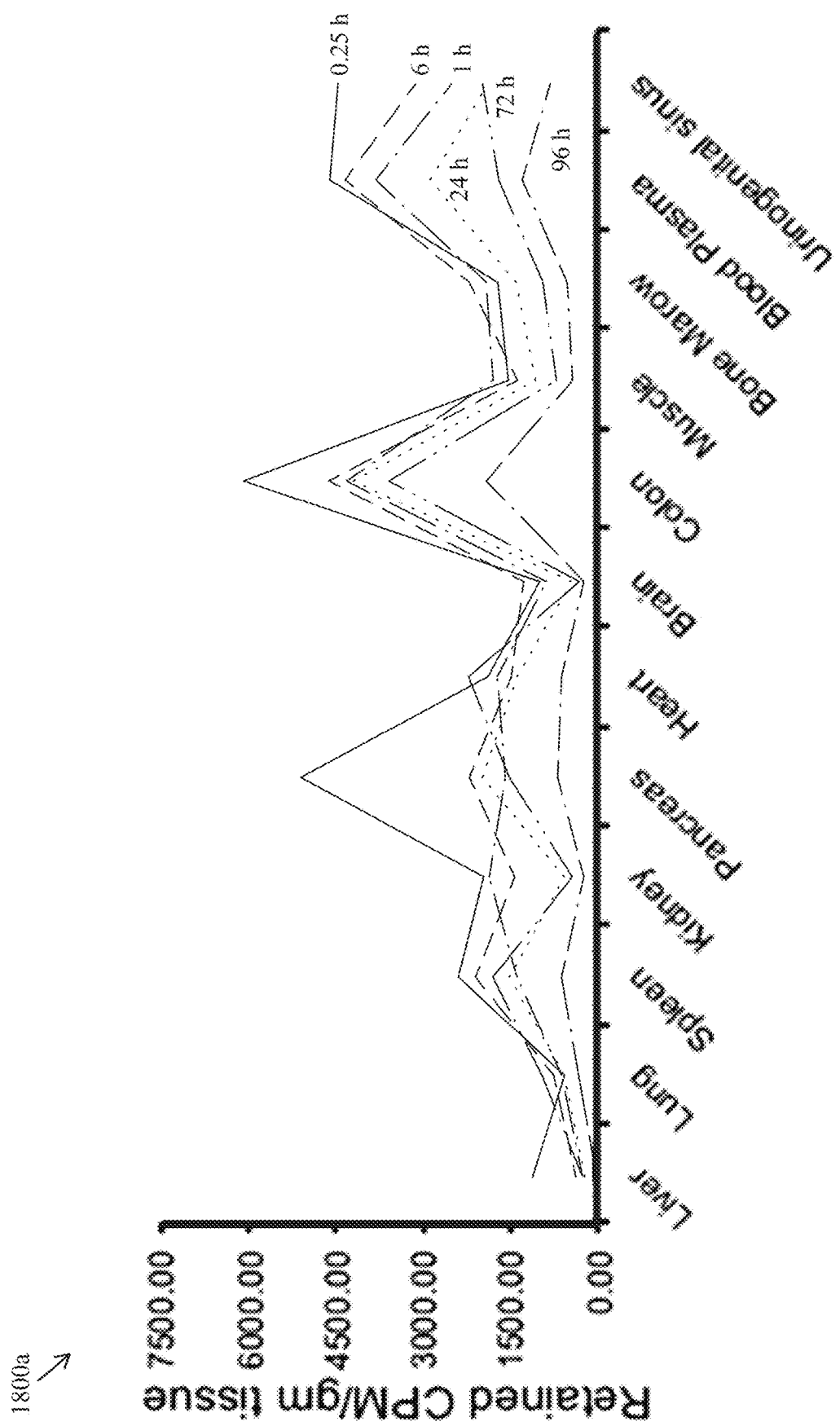
FIGS. 18A-B are charts with exemplary experimental data showing pharmacokinetics (PK) and biostability of GM201, including (A) counts per minute (CPM) of radioactivity retained per gram of organ, and (B) % CPM retained per gram of body weight compared to an average CPM per gram of body weight; error bars in FIG. 18A are omitted for clarity.
Figure 18B:
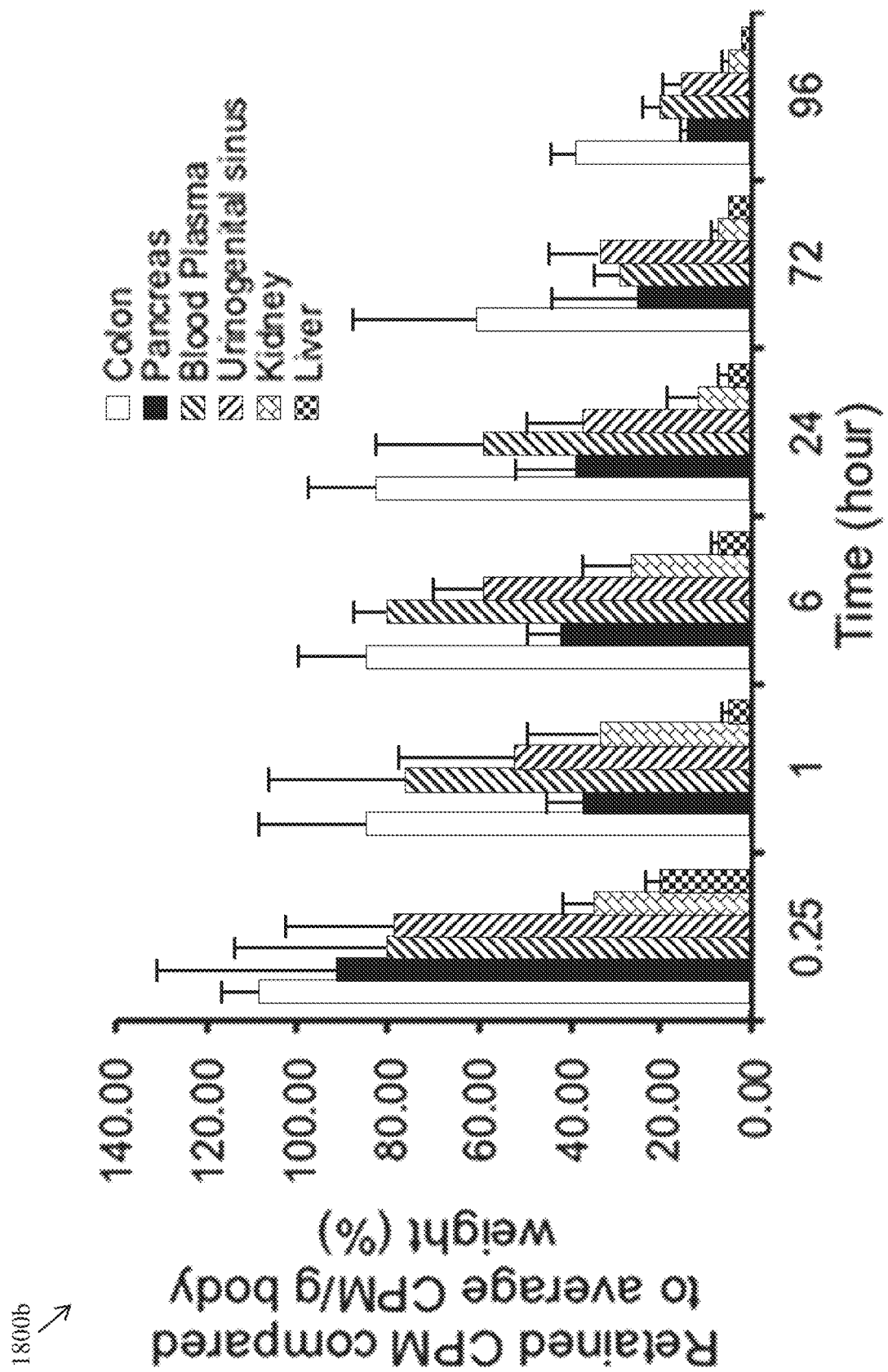

Referring now to FIGS. 18A-B, GM201's bioavailability and biostability were measured. FIGS. 18A-B are charts with exemplary experimental data 1800*a-b* showing pharmacokinetics (PK) and biostability of GM201, including (A) counts per minute (CPM) of radioactivity retained per gram of organ, and (B) % CPM retained per gram of body weight compared to an average CPM per gram of body weight. Purified GM201 was first deacetylated and then reacetylated with radioactive, [$^3$H]-labelled acetic anhydride (250 mCi/mL). The [$^3$H]-labeled GM201 ($2\times10^6$ CPM) was recovered on a desalting column and 100,000 CPM of [$^3$H]-labelled GM201 was administered (IP) into each wild-type mice C57BL/6. Following administration, mice were euthanized and terminally bled at various time points (3 mice per time point) at 15 min, 1 h, 6 h, 24 h, 72 h, and 96 h post-dose. Blood samples and various organs (liver, lung, spleen, kidney, pancreas, heart, brain, colon, muscle, femur, urogenital sinus) were collected, tissues were digested, and radioactivity was measured. The GM201 showed satisfactory biodistribution and stability in all organs examined, with high counts in the spleen, pancreas, colon, urogenital sinus (UGS) including prostate, and blood plasma (see FIG. 18A). Error bars in FIG. 18A are omitted for clarity. The target organ, e.g., liver (per gram) retained 5-7% CPM compared to the average CPM per gram of body weight from a period of 6 to 72 hours post drug administration (see FIG. 18B). Considering the size of the liver, which is much larger than most organs, such drug accumulation in the liver was moderate. However, the radioactive counts observed here may be from both the intact and the degraded GM201.

Figure 19:
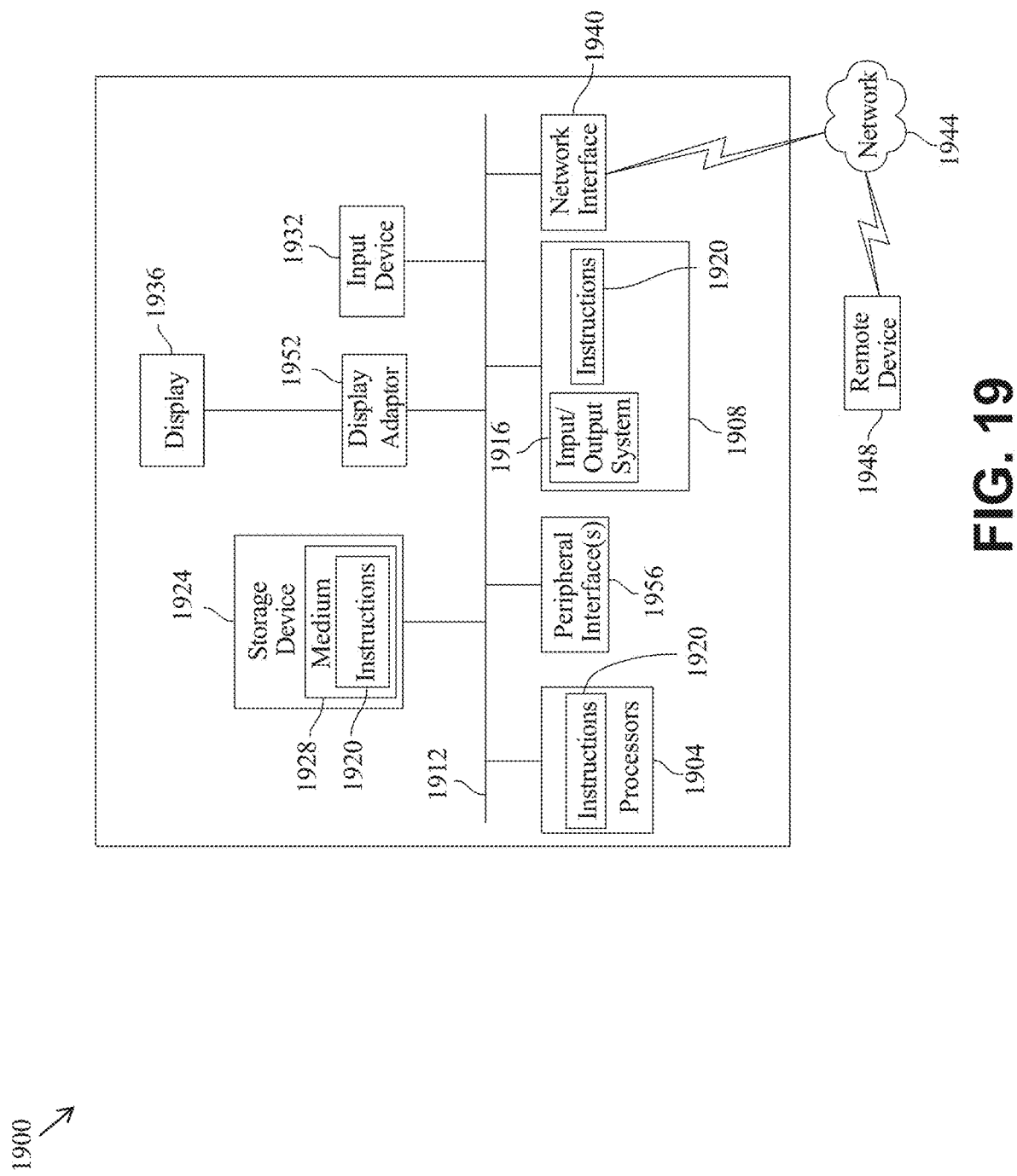
FIG. 19 is a block diagram of a computing system that can be used to implement any one or more of the methodologies disclosed herein and any one or more portions thereof.

Referring now to FIG. 19, it is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to one of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module. Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission. Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein. Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

With continued reference to FIG. 19, the figure shows a diagrammatic representation of one embodiment of a computing device in the exemplary form of a computing system 1900 within which a set of instructions for causing the computing system 1900 to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computing system 1900 may include a processor 1904 and a memory 1908 that communicate with each other, and with other components, via a bus 1912. Bus 1912 may include any of several types of bus structures including, but not limited to, a memory bus, a memory controller, a peripheral bus, a local bus, and any combinations thereof, using any of a variety of bus architectures. Processor 1904 may include any suitable processor, such as without limitation a processor incorporating logical circuitry for performing arithmetic and logical operations, such as an arithmetic and logic unit, which may be regulated with a state machine and directed by operational inputs from memory and/or sensors; processor 1904 may be organized according to Von Neumann and/or Harvard architecture as a nonlimiting example. Processor 1904 may include, incorporate, and/or be incorporated in, without limitation, a microcontroller, microprocessor, digital signal processor, field programmable gate array, complex programmable logic device, graphical processing unit, general-purpose graphical processing unit, tensor processing unit, analog or mixed signal processor, trusted platform module, a floating-point unit, and/or system on a chip.

With continued reference to FIG. 19, memory 1908 may include various components (e.g., machine-readable media) including, but not limited to, a random-access memory component, a read only component, and any combinations thereof. In one example, a basic input/output system 1916, including basic routines that help to transfer information between elements within computing system 1900, such as during start-up, may be stored in memory 1908. Memory 1908 (e.g., stored on one or more machine-readable media) may also include instructions (e.g., software) 1920 embodying any one or more of the aspects and/or methodologies of the present disclosure. In another example, memory 1908 may further include any number of program modules including, but not limited to, an operating system, one or more application programs, other program modules, program data, and any combinations thereof.

With continued reference to FIG. 19, computing system 1900 may also include a storage device 1924. Examples of a storage device (e.g., storage device 1924) include, but are not limited to, a hard disk drive, a magnetic disk drive, an optical disc drive in combination with an optical medium, a solid-state memory device, and any combinations thereof. Storage device 1924 may be connected to bus 1912 by an appropriate interface (not shown). Example interfaces include, but are not limited to, small computer system interface, advanced technology attachment, serial advanced technology attachment, universal serial bus, IEEE 1394 (FIREWIRE), and any combinations thereof. In one example, storage device 1924 (or one or more components thereof) may be removably interfaced with computing system 1900 (e.g., via an external port connector (not shown)). Particularly, storage device 1924 and an associated machine-readable medium 1928 may provide nonvolatile and/or volatile storage of machine-readable instructions, data structures, program modules, and/or other data for computing system 1900. In one example, software 1920 may reside, completely or partially, within machine-readable medium 1928. In another example, software 1920 may reside, completely or partially, within processor 1904.

With continued reference to FIG. 19, computing system 1900 may also include an input device 1932. In one example, a user of computing system 1900 may enter commands and/or other information into computing system 1900 via input device 1932. Examples of input device 1932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1932 may be interfaced to bus 1912 via any of a variety of interfaces (not shown) including, but not limited to, a serial interface, a parallel interface, a game port, a USB interface, a FIREWIRE interface, a direct interface to bus 1912, and any combinations thereof. Input device 1932 may include a touch screen interface that may be a part of or separate from display device 1936, discussed further below. Input device 1932 may be utilized as a user selection device for selecting one or more graphical representations in a graphical interface as described above.

With continued reference to FIG. 19, user may also input commands and/or other information to computing system 1900 via storage device 1924 (e.g., a removable disk drive, a flash drive, etc.) and/or network interface device 1940. A network interface device, such as network interface device 1940, may be utilized for connecting computing system 1900 to one or more of a variety of networks, such as network 1944, and one or more remote devices 1948 connected thereto. Examples of a network interface device include, but are not limited to, a network interface card (e.g., a mobile network interface card, a LAN card), a modem, and any combination thereof. Examples of a network include, but are not limited to, a wide-area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1944, may employ a wired and/or a wireless mode of communication. In general, any network topology may be used. Information (e.g., data, software 1920, etc.) may be communicated to and/or from computing system 1900 via network interface device 1940.

With continued reference to FIG. 19, computing system 1900 may further include a video display adapter 1952 for communicating a displayable image to a display device, such as display device 1936. Examples of a display device include, but are not limited to, a liquid crystal display (LCD), a cathode ray tube (CRT), a plasma display, a light emitting diode (LED) display, and any combinations thereof. Display adapter 1952 and display device 1936 may be utilized in combination with processor 1904 to provide graphical representations of aspects of the present disclosure. In addition to a display device, computing system 1900 may include one or more other peripheral output devices including, but not limited to, an audio speaker, a printer, and any combinations thereof. Such peripheral output devices may be connected to bus 1912 via a peripheral interface 1956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of treating a metabolic disorder, the method comprising:
   identifying a subject having a metabolic disorder; and
   administering to the subject a therapeutically effective amount of GM201 to treat the metabolic disorder, wherein the therapeutically effective amount is between 0.1 mg/kg and 500 mg/kg with respect to a body weight of the subject.

2. The method of claim 1, wherein the therapeutically effective amount of GM201 is between 5 mg/kg and 50 mg/kg with respect to the body weight of the subject.

3. The method of claim 1, wherein the therapeutically effective amount of GM201 is between 10 mg/kg and 30 mg/kg with respect to the body weight of the subject.

4. The method of claim 1, wherein GM201 comprises a molecular weight of approximately 84-88 kDa.

5. The method of claim 1, wherein GM201 comprises 120-132 copies of Thomsen-Friedenreich disaccharide.

6. The method of claim 1, wherein the therapeutically effective amount of GM201 is administered via one or more means selected from a group consisting of an edible formulation, a pharmaceutical formulation, an oral administration, a sublingual administration, an intranasal formulation, an intraocular formulation, a rectal administration, a transdermal administration, a mucosal administration, a pulmonary administration, a topical administration, and a parenteral administration including an intradermal administration, a subcutaneous (SC) administration, an intramuscular (IM) administration, an intravenous (IV) administration, an intraperitoneal (IP) administration, an intraarterial administration, an intramedullary administration, an intracardiac administration, an intraarticular administration, an intrasynovial administration, an intracranial administration, an intraspinal administration, and an intrathecal administration.

7. The method of claim 1, wherein the metabolic disorder comprises type 2 diabetes.

8. The method of claim 1, wherein the metabolic disorder comprises fibrosis.

9. The method of claim 8, wherein the fibrosis comprises liver fibrosis.

10. The method of claim 8, wherein the fibrosis comprises pulmonary fibrosis.

11. The method of claim 10, wherein the pulmonary fibrosis comprises idiopathic pulmonary fibrosis (IPF).

12. The method of claim 1, wherein the metabolic disorder comprises ulcerative colitis (UC).

13. The method of claim 1, further comprising administering to the subject a glucagon-like peptide 1 (GLP-1) receptor agonist.

14. The method of claim 13, wherein the GLP-1 receptor agonist includes one or more members selected from a group consisting of dulaglutide, exenatide, liraglutide, lixisenatide, and semaglutide.

15. A method of treating a subject with a metabolic disorder, the method comprising:
    administering to the subject a therapeutically effective amount of a pharmaceutical composition comprising GM201, wherein therapeutically effective amount includes between 0.1 mg/kg and 500 mg/kg of GM201 with respect to a body weight of the subject.

16. The method of claim 15, wherein the pharmaceutical composition is in a form of a solution comprising GM201.

17. The method of claim 15, wherein the pharmaceutical composition further comprises an excipient.

18. The method of claim 15, wherein the pharmaceutical composition is self-administered by subcutaneous injection using a prefilled cartridge comprising the pharmaceutical composition.

19. The method of claim 15, wherein the pharmaceutical composition further comprises a glucagon-like peptide 1 (GLP-1) receptor agonist.

20. The method of claim 15, further comprising expressing GM201 using Chinese hamster ovary (CHO) cells.

* * * * *